US010986505B2

(12) United States Patent
Cherian et al.

(10) Patent No.: US 10,986,505 B2
(45) Date of Patent: Apr. 20, 2021

(54) SPATIAL REUSE FOR WLAN NETWORKS

(71) Applicant: QUALCOMM Incorporated, San Diego, CA (US)

(72) Inventors: George Cherian, San Diego, CA (US); Alfred Asterjadhi, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 16/554,058

(22) Filed: Aug. 28, 2019

(65) Prior Publication Data

US 2020/0077273 A1  Mar. 5, 2020

Related U.S. Application Data

(60) Provisional application No. 62/724,533, filed on Aug. 29, 2018.

(51) Int. Cl.
*H04W 16/02* (2009.01)
*H04W 24/10* (2009.01)
(Continued)

(52) U.S. Cl.
CPC .......... *H04W 16/02* (2013.01); *H04W 24/10* (2013.01); *H04W 74/06* (2013.01); *H04W 84/12* (2013.01)

(58) Field of Classification Search
None
See application file for complete search history.

(56) References Cited

U.S. PATENT DOCUMENTS

2009/0279487 A1* 11/2009 Reumerman ......... H04W 40/24
370/329
2014/0056205 A1  2/2014 Aboul-Magd et al.
(Continued)

FOREIGN PATENT DOCUMENTS

EP         3026974 A1    6/2016
EP         3404955 A1   11/2018
WO   WO-2017133420 A1    8/2017

OTHER PUBLICATIONS

International Search Report and Written Opinion—PCT/US2019/048720—ISA/EPO—Nov. 18, 2019.

*Primary Examiner* — Jamaal Henson
(74) *Attorney, Agent, or Firm* — Holland & Hart LLP/Qualcomm

(57) ABSTRACT

Techniques for improved spatial reuse for wireless local area network (WLAN) networks are described. An access point (AP) may win a contention to a wireless medium and obtain a transmission opportunity (TXOP). The AP may perform a procedure to identify a group of un-managed APs for participation in spatial reuse opportunities for synchronous transmission over the TXOP. The AP may perform the procedure using over-the-air signaling. The AP may transmit a spatial reuse (SR) poll frame to one or more un-managed APs of the network, either sequentially or as part of a multiple-AP procedure. The AP may receive an SR response frame, or directly measure potential interference of a station (STA) serviced by one or more un-managed APs, and select a group of APs for coordinated reuse over the TXOP. The AP may select the group of APs based on one or more criteria for coordinated reuse.

47 Claims, 24 Drawing Sheets

(51) Int. Cl.
*H04W 74/06* (2009.01)
*H04W 84/12* (2009.01)

(56) References Cited

U.S. PATENT DOCUMENTS

| | | |
|---|---|---|
| 2015/0063327 A1 | 3/2015 | Barriac et al. |
| 2016/0066257 A1* | 3/2016 | Liu .................. H04W 74/0808 370/329 |
| 2016/0197655 A1* | 7/2016 | Lee ..................... H04B 7/0617 370/338 |
| 2016/0286499 A1 | 9/2016 | Lim et al. |
| 2017/0041798 A1* | 2/2017 | Li ..................... H04W 74/0816 |
| 2017/0078887 A1* | 3/2017 | Barriac ............... H04W 72/042 |
| 2017/0188368 A1* | 6/2017 | Cariou ............... H04L 61/6022 |
| 2018/0020460 A1* | 1/2018 | Hedayat ............... H04W 52/00 |
| 2018/0084554 A1* | 3/2018 | Chu .................. H04W 52/243 |
| 2018/0220456 A1* | 8/2018 | Kim ................. H04W 74/0808 |

* cited by examiner

SPATIAL REUSE FOR WLAN NETWORKS

CROSS REFERENCE

The present Application for Patent claims the benefit of U.S. Provisional Patent Application No. 62/724,533 by CHERIAN et al., entitled "IMPROVED SPATIAL REUSE FOR WLAN NETWORKS," filed Aug. 29, 2018, assigned to the assignee hereof, and which is expressly incorporated by reference in its entirety herein.

BACKGROUND

This disclosure relates generally to wireless communications, and more specifically to features for improved spatial reuse for wireless local area network (WLAN) networks.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the 802.11 family of standards is a Basic Service Set (BSS), which is managed by an AP. Each BSS is identified by a service set identifier (SSID) that is advertised by the AP. An AP periodically broadcasts beacon frames to enable any STAs within wireless range of the AP to establish or maintain a communication link with the WLAN.

In a typical WLAN, each STA may be associated with only one AP at a time. To identify an AP with which to associate, a STA is configured to perform scans on the wireless channels of each of one or more frequency bands (for example, the 2.4 GHz band or the 5 GHz band). As a result of the increasing ubiquity of wireless networks, a STA may have the opportunity to select one of many WLANs within range of the STA or select among multiple APs that together form an extended BSS. After association with an AP, a STA also may be configured to periodically scan its surroundings to find a more suitable AP with which to associate. For example, a STA that is moving relative to its associated AP may perform a "roaming" scan to find an AP having more desirable network characteristics such as a greater received signal strength indicator (RSSI).

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and space). The AP may be coupled to a network, such as the Internet, and may enable a station to communicate via the network including communicating with other devices coupled to the AP.

Some wireless devices in a WLAN (such as, APs or STAs) may be configured for extended high throughput (EHT) operations spanning an extended radio frequency (RF) channel bandwidth spectrum. The extended channel bandwidth spectrum may include portions of spectrum that include frequency bands traditionally used by Institute of Electrical and Electronics Engineers (IEEE) 802.11×Wi-Fi technology, such as the 5 GHz band, the 2.4 GHz band, the 60 GHz band, the 3.6 GHz band, the 900 MHz band, and others. The spectrum may also include other frequency bands (such as the 6 GHz band). The wireless connection between an AP and STA may be referred to as a channel or link. Each band (for example, the 5 GHz band) may contain multiple channels (such as, each spanning 20 MHz in frequency, 40 MHz in frequency, 80 MHz in frequency, and others), each of which may be usable by an AP or STA. Based on the enhanced functionality supported by EHT modes of operation at devices of the WLAN, supported flexibility and extension to existing fields, frames and structuring, signaling, and features associated with operability in utilizing wireless resources may be desired.

SUMMARY

The described techniques relate to improved methods, systems, devices, or apparatuses that support coordinated reuse in un-managed wireless local area network (WLAN) networks. Generally, the described techniques provide extensions to flexibility and support for access point (AP) coordination, including over-the-air signaling cooperation to coordinate and improve spatial-reuse opportunities for signaling over a transmission opportunity (TXOP). The AP coordination may support synchronous transmission by one or more APs that may be participating in a coordinated reuse process while reducing interference and improving system throughput over managed basic service sets (BSSs). An AP may be configured for enhanced operability (for example, extended high throughput (EHT)), and participate in coordinated reuse, including interference management and simultaneous uplink (UL) or downlink (DL) transmissions with one or more APs of a configured range.

The systems, methods and devices of this disclosure each have several innovative aspects, no single one of which is solely responsible for the desirable attributes disclosed herein.

A method of wireless communication at a first access point is described. The method may include transmitting, after winning contention for a wireless medium, a first poll including a first message to a STA served by the first access point, receiving, from the STA, a first response to the first poll based on transmitting the first poll, receiving, from a second access point of a set of access points, a second response including a measured signal strength indication of the first response based on transmitting the first poll, and selecting the second access point for coordinated reuse based on receiving the second response.

An apparatus for wireless communication at a first access point is described. The apparatus may include a processor, memory in electronic communication with the processor, and instructions stored in the memory. The instructions may be executable by the processor to cause the apparatus to transmit, after winning contention for a wireless medium, a first poll including a first message to a STA served by the first access point, receive, from the STA, a first response to the first poll based on transmitting the first poll, receive, from a second access point of a set of access points, a second response including a measured signal strength indication of the first response based on transmitting the first poll, and select the second access point for coordinated reuse based on receiving the second response.

Another apparatus for wireless communication at a first access point is described. The apparatus may include means for transmitting, after winning contention for a wireless medium, a first poll including a first message to a STA served by the first access point, receiving, from the STA, a first response to the first poll based on transmitting the first poll, receiving, from a second access point of a set of access points, a second response including a measured signal strength indication of the first response based on transmitting the first poll, and selecting the second access point for coordinated reuse based on receiving the second response.

A non-transitory computer-readable medium storing code for wireless communication at a first access point is described. The code may include instructions executable by a processor to transmit, after winning contention for a wireless medium, a first poll including a first message to a STA served by the first access point, receive, from the STA, a first response to the first poll based on transmitting the first poll, receive, from a second access point of a set of access points, a second response including a measured signal strength indication of the first response based on transmitting the first poll, and select the second access point for coordinated reuse based on receiving the second response.

Some implementations of the method, apparatuses, and non-transitory computer-readable medium described herein may further include operations, features, means, or instructions for performing synchronous DL signaling over a TXOP based on selecting the second access point.

In some implementations of the method, apparatuses, and non-transitory computer-readable medium described herein, performing synchronous DL signaling over the TXOP may include operations, features, means, or instructions for transmitting an indication for the second access point of the set of access points to perform the synchronous DL signaling.

In some implementations of the method, apparatuses, and non-transitory computer-readable medium described herein, the indication includes an SR start frame and an indication of maximum allowed transmission power for performing DL signaling over the TXOP.

Some implementations of the method, apparatuses, and non-transitory computer-readable medium described herein may further include operations, features, means, or instructions for transmitting, to the second access point, a second poll after receiving the first response from the STA, in which receiving the second response may be based on transmitting the second poll.

Some implementations of the method, apparatuses, and non-transitory computer-readable medium described herein may further include operations, features, means, or instructions for determining a criterion for coordinated reuse over a TXOP with the second access point based on one or more of the second poll or the second response, in which selecting the second access point may be based on determining the criterion.

Some implementations of the method, apparatuses, and non-transitory computer-readable medium described herein may further include operations, features, means, or instructions for determining that the second access point satisfies the criterion for coordinated reuse, in which selecting the second access point may be based on determining that the second access point satisfies the criterion.

In some implementations of the method, apparatuses, and non-transitory computer-readable medium described herein, the criterion for coordinated reuse includes a maximum allowed transmit power for the set of access points and may be based on a signal-to-interference (SIR) of the first access point to serve the STA at a modulation and coding scheme (MCS).

Some implementations of the method, apparatuses, and non-transitory computer-readable medium described herein may further include operations, features, means, or instructions for identifying a quantity of the set of access points and determining a calculation for a back-off adjustment to the criterion based on identifying the quantity, in which determining the criterion may be based on the determining the calculation.

Some implementations of the method, apparatuses, and non-transitory computer-readable medium described herein may further include operations, features, means, or instructions for determining a first criterion for coordinated reuse associated with a first sub-channel of the wireless medium based on at least one of a transmit power requirement of the first sub-channel or a tolerance level associated with the first sub-channel and determining a second criterion for coordinated reuse associated with a second sub-channel of the wireless medium based on at least one of a transmit power requirement of the second sub-channel or a tolerance level associated with the second sub-channel, in which determining the criterion may be based on determining the first criterion for the first sub-channel and the second criterion for the second sub-channel.

Some implementations of the method, apparatuses, and non-transitory computer-readable medium described herein may further include operations, features, means, or instructions for transmitting the second poll and receiving the second response may be part of a polling procedure for the set of access points initiated by the first access point.

In some implementations of the method, apparatuses, and non-transitory computer-readable medium described herein, transmitting the second poll to the second access point further may include operations, features, means, or instructions for transmitting the second poll to one or more access points of the set of access points different than the second access point, the method further including.

Some implementations of the method, apparatuses, and non-transitory computer-readable medium described herein may further include operations, features, means, or instructions for determining, based on determining the criterion, that the one or more access points do not satisfy the criterion for coordinated reuse over the TXOP, in which transmitting the second poll to the second access point may be based on determining that the one or more access points do not satisfy the criterion for coordinated reuse over the TXOP.

In some implementations of the method, apparatuses, and non-transitory computer-readable medium described herein, transmitting the second poll to the second access point may include operations, features, means, or instructions for transmitting the second poll to a set of access points of the set of access points.

Some implementations of the method, apparatuses, and non-transitory computer-readable medium described herein may further include operations, features, means, or instructions for receiving, from a third access point of the set of access points, a response based on transmitting the second poll and selecting the third access point for coordinated reuse based on the receiving the response from the third access point.

In some implementations of the method, apparatuses, and non-transitory computer-readable medium described herein, the second poll includes a spatial reuse (SR) poll frame.

In some implementations of the method, apparatuses, and non-transitory computer-readable medium described herein, the SR poll frame includes a trigger frame.

In some implementations of the method, apparatuses, and non-transitory computer-readable medium described herein, the SR poll frame includes one or more of schedule information for a TXOP or DL reuse information.

In some implementations of the method, apparatuses, and non-transitory computer-readable medium described herein, the schedule information includes DL slot sizes and durations for one or more DL slots of the TXOP.

In some implementations of the method, apparatuses, and non-transitory computer-readable medium described herein, the DL reuse information includes one or more of a maximum allowed interference for the first access point or basic service set (BSS) identifiers (BSSIDs) of the set of access points.

Some implementations of the method, apparatuses, and non-transitory computer-readable medium described herein may further include operations, features, means, or instructions for transmitting, to a third access point of the set of access points, the second poll after receiving the first response from the STA, receiving, from the third access point, a response based on transmitting the second poll to the third access point and selecting the third access point for coordinated reuse based on the receiving the response from the third access point.

Some implementations of the method, apparatuses, and non-transitory computer-readable medium described herein may further include operations, features, means, or instructions for performing synchronous DL signaling over a TXOP with the second access point and the third access point based on selecting the second access point for coordinated reuse and selecting the third access point for coordinated reuse.

In some implementations of the method, apparatuses, and non-transitory computer-readable medium described herein, performing synchronous DL signaling over the TXOP may include operations, features, means, or instructions for multiplexing DL signaling of the second access point and DL signaling of the third access point over the TXOP, and in which the multiplexing includes one or more of time division multiplexing (TDM) or frequency division multiplexing (FDM) on slots or sub-bands of the TXOP.

In some implementations of the method, apparatuses, and non-transitory computer-readable medium described herein, the second response includes an SR response frame.

In some implementations of the method, apparatuses, and non-transitory computer-readable medium described herein, the SR response frame of the second response includes one or more of a received signal strength indicator (RSSI) measurement of the first response by the STA served by the first access point, a minimum DL transmit power to service one or more additional STAs by the second access point, buffer status report (BSR) information, or bandwidth query report (BQR) information.

In some implementations of the method, apparatuses, and non-transitory computer-readable medium described herein, the SR response frame of the second response may be included in a high efficiency (HE) trigger-based (TB) physical layer protocol data unit (PPDU).

In some implementations of the method, apparatuses, and non-transitory computer-readable medium described herein, transmitting the first poll further may include operations, features, means, or instructions for transmitting a second message to the set of access points and receiving, from the set of access points, a response to the first poll, in which the response may be received after receiving the first response to the first poll by the STA.

Some implementations of the method, apparatuses, and non-transitory computer-readable medium described herein may further include operations, features, means, or instructions for receiving, from one or more access points of the set of access points, a response to the first poll, in which the response may be based on an indication within the first response to provide reuse-feedback by one or more of the set of access points.

In some implementations of the method, apparatuses, and non-transitory computer-readable medium described herein, the indication may be at least part of a preamble of the first response.

Some implementations of the method, apparatuses, and non-transitory computer-readable medium described herein may further include operations, features, means, or instructions for performing a request-to-send (RTS) clear-to-send (CTS) procedure with the STA served by the first access point, in which the first poll may be a multi-user RTS (MU-RTS) frame.

In some implementations of the method, apparatuses, and non-transitory computer-readable medium described herein, the MU-RTS frame of the first poll includes one or more of information for the STA served by the first access point or information on one or more BSSIDs of the set of access points.

In some implementations of the method, apparatuses, and non-transitory computer-readable medium described herein, the first response includes an enhanced CTS (e-CTS) frame.

In some implementations of the method, apparatuses, and non-transitory computer-readable medium described herein, the e-CTS frame of the first poll includes a HE preamble and one or more HE-SIG fields.

In some implementations of the method, apparatuses, and non-transitory computer-readable medium described herein, the HE-SIG fields of the e-CTS frame include an indication for identifying one or more access points of the set of access points for providing an RSSI measurement of the e-CTS frame of the first poll.

A method of wireless communication at a first access point is described. The method may include transmitting, after winning contention to a wireless medium, a first poll to a second access point of a set of access points, measuring a signal strength indication sent by one or more STAs served by the second access point based on transmitting the first poll, and selecting the second access point for coordinated reuse based on measuring the signal strength indication.

An apparatus for wireless communication at a first access point is described. The apparatus may include a processor, memory in electronic communication with the processor, and instructions stored in the memory. The instructions may be executable by the processor to cause the apparatus to transmit, after winning contention to a wireless medium, a first poll to a second access point of a set of access points, measure a signal strength indication sent by one or more STAs served by the second access point based on transmitting the first poll, and select the second access point for coordinated reuse based on measuring the signal strength indication.

Another apparatus for wireless communication at a first access point is described. The apparatus may include means for transmitting, after winning contention to a wireless medium, a first poll to a second access point of a set of access points, measuring a signal strength indication sent by one or more STAs served by the second access point based on transmitting the first poll, and selecting the second access point for coordinated reuse based on measuring the signal strength indication.

A non-transitory computer-readable medium storing code for wireless communication at a first access point is described. The code may include instructions executable by a processor to transmit, after winning contention to a wireless medium, a first poll to a second access point of a set of access points, measure a signal strength indication sent by one or more STAs served by the second access point based on transmitting the first poll, and select the second access point for coordinated reuse based on measuring the signal strength indication.

Some implementations of the method, apparatuses, and non-transitory computer-readable medium described herein may further include operations, features, means, or instructions for determining a criterion for coordinated reuse over a TXOP with the second access point based at least in part the measuring, in which selecting the second access point may be based on determining the criterion.

Some implementations of the method, apparatuses, and non-transitory computer-readable medium described herein may further include operations, features, means, or instructions for determining that the second access point satisfies the criterion for coordinated reuse, in which selecting the second access point may be based on determining that the second access point satisfies the criterion.

In some implementations of the method, apparatuses, and non-transitory computer-readable medium described herein, the criterion for coordinated reuse includes a maximum allowed transmit power for the set of access points and may be based on a signal-to-interference ratio (SIR) of the first access point to serve a STA at a modulation and coding scheme (MCS).

Some implementations of the method, apparatuses, and non-transitory computer-readable medium described herein may further include operations, features, means, or instructions for performing synchronous UL signaling over a TXOP with the second access point based on selecting the second access point.

In some implementations of the method, apparatuses, and non-transitory computer-readable medium described herein, performing synchronous UL signaling over the TXOP may include operations, features, means, or instructions for transmitting an indication for the second access point of the set of access points to participate in the synchronous UL signaling.

In some implementations of the method, apparatuses, and non-transitory computer-readable medium described herein, the indication includes an SR start frame and an indication of maximum allowed transmission power for performing UL signaling over the TXOP.

Some implementations of the method, apparatuses, and non-transitory computer-readable medium described herein may further include operations, features, means, or instructions for transmitting the first poll and measuring the signal strength indication may be part of a polling procedure for the set of access points initiated by the first access point.

In some implementations of the method, apparatuses, and non-transitory computer-readable medium described herein, transmitting the first poll to the second access point may include operations, features, means, or instructions for transmitting the first poll to one or more access points of the set of access points, the method further including.

Some implementations of the method, apparatuses, and non-transitory computer-readable medium described herein may further include operations, features, means, or instructions for determining, based on determining the criterion, that the one or more access points do not satisfy the criterion for coordinated reuse over the TXOP, in which transmitting the first poll to the second access point may be based on determining that the one or more access points do not satisfy the criterion for coordinated reuse over the TXOP.

Some implementations of the method, apparatuses, and non-transitory computer-readable medium described herein may further include operations, features, means, or instructions for transmitting, to a third access point of the set of access points, the first poll, measuring a signal strength indication sent by one or more STAs served by the third access point based on the transmitting and selecting the third access point for coordinated reuse based on the measuring.

Some implementations of the method, apparatuses, and non-transitory computer-readable medium described herein may further include operations, features, means, or instructions for performing synchronous UL signaling over a TXOP with the second access point and the third access point based on selecting the second access point and the third access point for coordinated reuse.

In some implementations of the method, apparatuses, and non-transitory computer-readable medium described herein, performing synchronous UL signaling over the TXOP may include operations, features, means, or instructions for allocating a first sub-band of the TXOP for UL signaling associated for the second access point and a second sub-band of the TXOP for UL signaling associated for the third access point.

In some implementations of the method, apparatuses, and non-transitory computer-readable medium described herein, transmitting the SR poll frame to the second access point may include operations, features, means, or instructions for allocating resources of the first poll for a set of access points of the set of access points and transmitting the first poll to the set of access points based on allocating the resources of the SR poll frame.

Some implementations of the method, apparatuses, and non-transitory computer-readable medium described herein may further include operations, features, means, or instructions for measuring a signal strength indication sent by one or more STAs served by a third access point of the set of access points and selecting the third access point for coordinated reuse based on measuring the signal strength indication.

Some implementations of the method, apparatuses, and non-transitory computer-readable medium described herein may further include operations, features, means, or instructions for performing synchronous UL signaling over a TXOP with the second access point and the third access point based on selecting the second access point and the third access point for coordinated reuse.

Some implementations of the method, apparatuses, and non-transitory computer-readable medium described herein may further include operations, features, means, or instructions for determining contents of a preamble for a second poll by one or more access points of the set of access points based on the transmitting, in which measuring the signal strength indication may be based on the contents of the preamble.

In some implementations of the method, apparatuses, and non-transitory computer-readable medium described herein, the second poll includes a null packet trigger frame.

In some implementations of the method, apparatuses, and non-transitory computer-readable medium described herein, the null packet trigger frame includes one or more broadcast resource units (RUs) containing a BSS color mapping, in which the BSS color mapping of the one or more broadcast RUs may be based on a bit indication in a field of the null packet trigger frame.

In some implementations of the method, apparatuses, and non-transitory computer-readable medium described herein, the first poll includes an SR poll frame.

In some implementations of the method, apparatuses, and non-transitory computer-readable medium described herein, the SR poll frame includes one or more of schedule information for a TXOP or UL reuse information.

In some implementations of the method, apparatuses, and non-transitory computer-readable medium described herein, the schedule information includes UL slot sizes and durations for one or more UL slots of the TXOP.

In some implementations of the method, apparatuses, and non-transitory computer-readable medium described herein, the UL reuse information includes one or more of a maximum allowed interference for the first access point or BSSIDs of the set of access points.

In some implementations of the method, apparatuses, and non-transitory computer-readable medium described herein, the SR poll frame of the first poll includes a trigger frame.

A method of wireless communication at a first access point is described. The method may include measuring a signal strength indication of a first response sent by a STA to a second access point serving the STA, in which the first response is based on a first poll transmitted by the second access point, identifying an indication to report the measuring of the signal strength indication of the first response sent by the STA based on the measuring, and transmitting a second response to the second access point based on identifying the indication to report the measuring of the signal strength indication of the first response.

An apparatus for wireless communication at a first access point is described. The apparatus may include a processor, memory in electronic communication with the processor, and instructions stored in the memory. The instructions may be executable by the processor to cause the apparatus to measure a signal strength indication of a first response sent by a STA to a second access point serving the STA, in which the first response is based on a first poll transmitted by the second access point, identify an indication to report the measuring of the signal strength indication of the first response sent by the STA based on the measuring, and transmit a second response to the second access point based on identifying the indication to report the measuring of the signal strength indication of the first response.

Another apparatus for wireless communication at a first access point is described. The apparatus may include means for measuring a signal strength indication of a first response sent by a STA to a second access point serving the STA, in which the first response is based on a first poll transmitted by the second access point, identifying an indication to report the measuring of the signal strength indication of the first response sent by the STA based on the measuring, and transmitting a second response to the second access point based on identifying the indication to report the measuring of the signal strength indication of the first response.

A non-transitory computer-readable medium storing code for wireless communication at a first access point is described. The code may include instructions executable by a processor to measure a signal strength indication of a first response sent by a STA to a second access point serving the STA, in which the first response is based on a first poll transmitted by the second access point, identify an indication to report the measuring of the signal strength indication of the first response sent by the STA based on the measuring, and transmit a second response to the second access point based on identifying the indication to report the measuring of the signal strength indication of the first response.

Some implementations of the method, apparatuses, and non-transitory computer-readable medium described herein may further include operations, features, means, or instructions for receiving, from the second access point, a second poll that may be transmitted after receiving the first response from the STA served by the first access point.

Some implementations of the method, apparatuses, and non-transitory computer-readable medium described herein may further include operations, features, means, or instructions for receiving the second poll may be based on one or more access points of the set of access points not satisfying a criterion for coordinated reuse over a TXOP.

In some implementations of the method, apparatuses, and non-transitory computer-readable medium described herein, the second poll includes an SR poll frame.

Some implementations of the method, apparatuses, and non-transitory computer-readable medium described herein may further include operations, features, means, or instructions for receiving an indication from the second access point to participate in coordinated reuse over a TXOP based on transmitting the second response and performing synchronous DL signaling over the TXOP with the second access point based on receiving the indication from the second access point to participate in coordinated reuse over the TXOP.

In some implementations of the method, apparatuses, and non-transitory computer-readable medium described herein, the first poll includes a MU-RTS frame.

In some implementations of the method, apparatuses, and non-transitory computer-readable medium described herein, the first response includes a CTS frame.

In some implementations of the method, apparatuses, and non-transitory computer-readable medium described herein, the second response includes an SR response frame.

Some implementations of the method, apparatuses, and non-transitory computer-readable medium described herein may further include operations, features, means, or instructions for determining one or more measurement values including one or more of an RSSI measurement of the first response by the STA served by the first access point, a minimum DL transmit power to service one or more additional STAs by the second access point, buffer status report (BSR) information, or bandwidth query report (BQR) information, in which transmitting the SR response frame of the second response may be based on determining the one or more measurement values.

A method of wireless communication at a first access point is described. The method may include receiving, from a second access point of a set of access points, a first poll, transmitting, to one or more STAs served by the first access point, a second poll based on receiving the first poll, and receiving an indication from the second access point to participate in coordinated reuse over a TXOP based on transmitting the second poll.

An apparatus for wireless communication at a first access point is described. The apparatus may include a processor, memory in electronic communication with the processor, and instructions stored in the memory. The instructions may be executable by the processor to cause the apparatus to receive, from a second access point of a set of access points, a first poll, transmit, to one or more STAs served by the first access point, a second poll based on receiving the first poll, and receive an indication from the second access point to participate in coordinated reuse over a TXOP based on transmitting the second poll.

Another apparatus for wireless communication at a first access point is described. The apparatus may include means for receiving, from a second access point of a set of access points, a first poll, transmitting, to one or more STAs served by the first access point, a second poll based on receiving the first poll, and receiving an indication from the second access point to participate in coordinated reuse over a TXOP based on transmitting the second poll.

A non-transitory computer-readable medium storing code for wireless communication at a first access point is described. The code may include instructions executable by a processor to receive, from a second access point of a set of access points, a first poll, transmit, to one or more STAs served by the first access point, a second poll based on receiving the first poll, and receive an indication from the second access point to participate in coordinated reuse over a TXOP based on transmitting the second poll.

Some implementations of the method, apparatuses, and non-transitory computer-readable medium described herein may further include operations, features, means, or instructions for performing synchronous UL signaling over the TXOP with the second access point based on receiving the indication from the second access point to participate in coordinated reuse over the TXOP.

In some implementations of the method, apparatuses, and non-transitory computer-readable medium described herein, receiving the first poll may include operations, features, means, or instructions for receiving an indication of a resource allocation within the first poll for a set of access points of the set of access points, in which transmitting the second poll may be based on the indication of the resource allocation.

In some implementations of the method, apparatuses, and non-transitory computer-readable medium described herein, the first poll includes an SR poll frame.

In some implementations of the method, apparatuses, and non-transitory computer-readable medium described herein, transmitting the second poll may include operations, features, means, or instructions for transmitting a null packet trigger frame to the one or more STAs served by the first access point.

In some implementations of the method, apparatuses, and non-transitory computer-readable medium described herein, the null packet trigger frame includes one or more broadcast resource units (RUs) containing a BSS color mapping that may be based on a bit indication in a field of the null packet trigger frame.

In some implementations of the method, apparatuses, and non-transitory computer-readable medium described herein, transmitting the null packet trigger frame may include operations, features, means, or instructions for transmitting the null packet trigger frame in a high efficiency (HE) multi-user (MU) PPDU.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
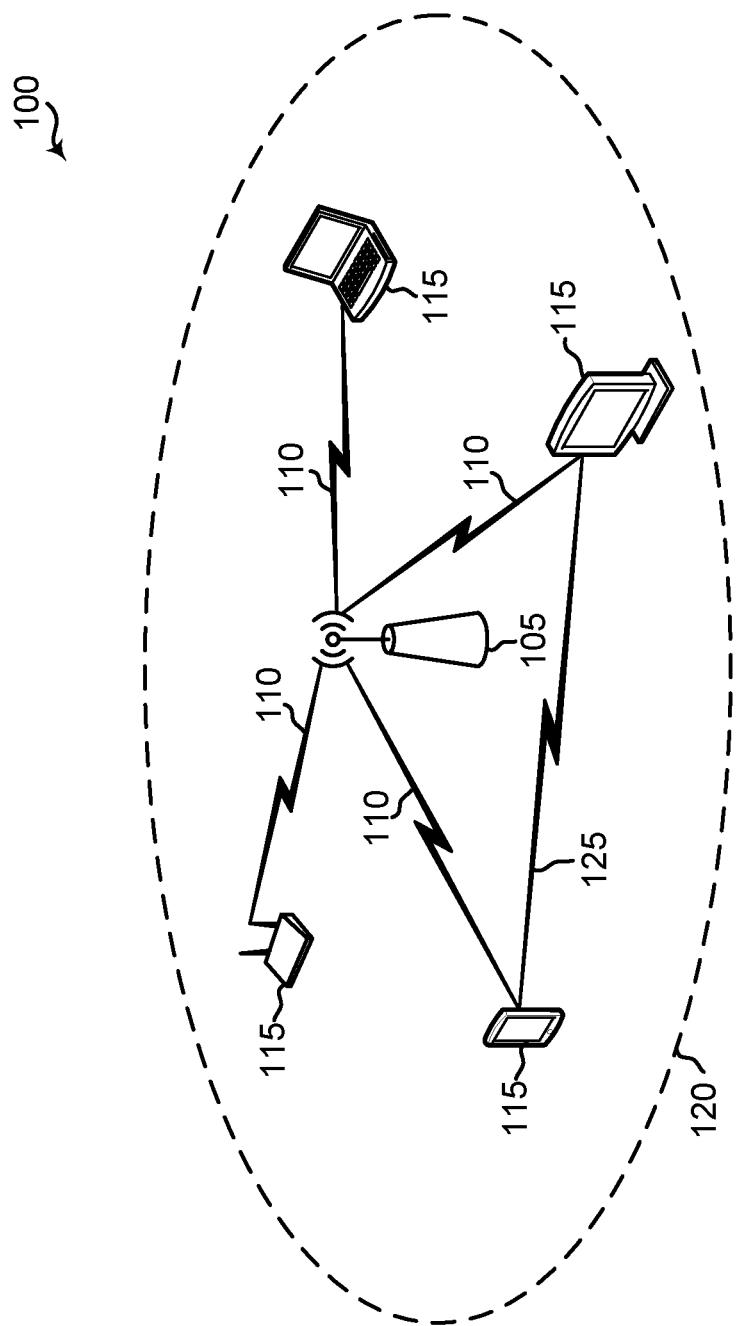
FIG. 1 illustrates an example of a wireless communications system that supports improved spatial reuse for WLAN networks in accordance with aspects of the present disclosure.

The following description is directed to implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to any of the Institute of Electrical and Electronics Engineers (IEEE) 802.11 standards, or the Bluetooth® standards.

The described implementations also can be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, including wireless local area networks (WLANs), extended high throughput (EHT) environments may provide additional capabilities for coordinated functionality between access points (APs) of one or more basic service sets (BSSs) of the network. The APs may operate independently as part of an un-managed network, supported by diverse vendors or operators without backhaul connectivity between APs. In accordance with the configured EHT capabilities, the set of un-managed APs may support coordination according to over-the-air signaling cooperation, to identify improved spatial reuse opportunities within a transmission opportunity (TXOP) on a wireless medium. Such coordination for spatial reuse may also be referred to as coordinated reuse. Coordinated reuse may include synchronized uplink (UL) or downlink (DL) transmissions by the group of un-managed APs over the TXOP. In some examples, the implementation of coordinated reuse may improve interference management of traffic corresponding to the one or more supported BSSs of the group of APs, and may improve system throughput associated with UL or DL transmissions to managed stations (STAs) of the supported BSSs.

Techniques for identifying spatial reuse opportunities for participation in coordinated reuse are described. The described techniques may include AP coordination through one or more of polling procedures or a measured signal strength indication, and include enablement of TXOP operation with the AP coordination. A group of APs may coordinate to determine one or more reuse criteria for performing spatial reuse over a TXOP. The group may be selected on a transient basis to participate in synchronous transmission according to the participation in coordinated reuse and enhance the reuse opportunities on resources of the medium.

As described, an AP may contend for resources of a wireless medium and may identify a TXOP for signaling based on winning contention for access. The AP may be referred to as an AP owner (or in some examples, a TXOP leader or AP leader). The AP (for example, the AP owner, the TXOP leader, the AP leader) may initiate a procedure for selecting an un-managed AP based on receiving the measured signal strength indicator. The AP (for example, the AP owner, the TXOP leader, the AP leader) may also determine one or more reuse criteria associated with participation in coordinated reuse over a TXOP. The AP owner may perform polling of a set of un-managed APs that support coordinated reuse, including the transmission of one or more spatial reuse poll frames, as part of determining the one or more reuse criteria. In some examples, the AP owner may perform the polling and may individually (for example, sequentially) transmit the spatial reuse poll frames to one or more APs within the set of APs. In other examples, the AP owner may transmit each of one or more spatial reuse poll frames to multiple APs. In some examples, the one or more spatial reuse poll frames may be or include trigger frames.

Based on the polling, the AP owner may receive a response indication from one or more APs of the set of un-managed APs, or directly measure potential interference of a service supported (for example, UL transmission) at one or more APs of the set of un-managed APs, and determine a group of APs for coordinated reuse over the TXOP. The AP owner may determine the group of APs on a transient basis, such as a TXOP by TXOP basis, based on satisfaction of the one or more reuse criteria. The determined group of APs may then be allocated resources during the TXOP as part of spatial reuse for synchronous transmission over the TXOP. The spatial reuse of resources during the TXOP may reduce interference and improve data throughput associated with coordinated UL or DL transmissions during the TXOP. Techniques described herein may further provide for increased access priority for the AP owner, for example, based on one or more of the number of included overlapping BSS (OBSS) APs participating in coordinated reuse over the TXOP, the capability for multiple APs across multiple slots of the obtained TXOP, or the inclusion of one or more multiple reuse criteria for allocations (such as, sub-bands) during the TXOP.

FIG. 1 illustrates an example of a wireless communications system 100 that supports improved spatial reuse for WLAN networks. According to some aspects, the wireless communications system 100 can be an example of a WLAN (and will hereinafter be referred to as WLAN 100). For example, the WLAN 100 can be a network implementing at least one of the IEEE 802.11 family of standards. The WLAN 100 may include numerous wireless devices such as an AP 105 and multiple associated STAs 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

Each of the STAs 115 may associate and communicate with the AP 105 via a communication link 110. The various STAs 115 in the network are able to communicate with one another through the AP 105. A single AP 105 and an associated set of STAs 115 may be referred to as a BSS. FIG. 1 additionally shows an example coverage area 120 of the AP 105, which may represent a basic service area (BSA) of the WLAN 100. While only one AP 105 is shown, the WLAN 100 can include multiple APs 105. An extended service set (ESS) may include a set of connected BSSs. An extended network station associated with the WLAN 100 may be connected to a wired or wireless distribution system that may allow multiple APs 105 to be connected in such an ESS. As such, a STA 115 can be covered by more than one AP 105 and can associate with different APs 105 at different times for different transmissions.

STAs 115 may function and communicate (via the respective communication links 110) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, and 802.11ba. These standards define the WLAN radio and baseband protocols for the physical layer and medium access control (MAC) layer. The wireless devices in the WLAN 100 may communicate over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. The unlicensed spectrum may also include other frequency bands, such as the emerging 6 GHz band. The wireless devices in the WLAN 100 also can be configured to communicate over other frequency bands such as shared licensed frequency bands, in which multiple operators may have a license to operate in the same or overlapping frequency band or bands.

In some examples, STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some examples, ad hoc networks may be implemented within a larger wireless network such as the WLAN 100. In such implementations, while the STAs 115 may be capable of communicating with each other through the AP 105 using communication links 110, STAs 115 also can communicate directly with each other via direct wireless communication links 125. Additionally, two STAs 115 may communicate via a direct communication link 125 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless communication links 125 include Wi-Fi Direct connections, connections established by using a Wi-Fi Tunneled Direct Link Setup (TDLS) link, and other peer-to-peer (P2P) group connections.

In some examples, some types of STAs 115 or APs 105 may be configured for EHT operations and may have supported functionality on a dynamic channel bandwidth spectrum. The dynamic channel bandwidth spectrum may be a portion of the frequency spectrum that includes frequency bands above the radio frequency (RF) spectrum, including frequency bands traditionally used for Wi-Fi technology or the emerging 6 GHz band. Each band (for example, the 5 GHz band) may contain multiple channels (for example, each channel may span 20 MHz in frequency, 40 MHz in frequency, 80 MHz in frequency), each of which may be usable by configured STAs 115 or APs 105. Based on the enhanced functionality supported by EHT modes of operation, supported extensions to available channel bandwidth spectrum (for example, 320 MHz, 160+160 MHz) may be possible.

Some types of STAs 115 may provide for automated communication. Automated wireless devices may include those implementing internet-of-things (IoT) communication, Machine-to-Machine (M2M) communication, or machine type communication (MTC). IoT, M2M or MTC may refer to data communication technologies that allow devices to communicate without human intervention. For example, IoT, M2M or MTC may refer to communications from STAs 115 that integrate sensors or meters to measure or capture information and relay that information to a central server or application program that can make use of the information or present the information to humans interacting with the program or application.

Some types of APs 105 may provide for AP coordination using over-the-air signaling. Different levels of coordination may be supported by the APs 105, with associated synchronization for the different levels. For example, in some examples, one or more APs 105 may support coordination without synchronization (in some examples, known as level-1 synchronization) in which the APs 105 may coordinate to share load information, user-management, admission control, and BSS transition management, such as handover. In some examples, one or more APs 105 may support coordination with loose synchronization (in some examples, known as level-2 synchronization) in which APs 105 may coordinate for interference management and simultaneous transmission on a TXOP by TXOP basis. In some examples, one or more APs 105 may support coordination with tight (for example, symbol level) synchronization (in some examples, known as level-3 synchronization) in which APs 105 may perform coordinated beamforming and transmit null packets to STAs 115 served on other BSSs, to reduce interference. In other cases, one or more APs 105 may support coordination with tight (for example, sub-symbol level) synchronization (in some examples, known as level-4 synchronization) in which APs 105 may coordinate for a joint multiple-input, multiple-output (MIMO) wireless systems transmission, in which a STA 115 may be served by multiple APs 105.

Some of STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

WLAN 100 may support beamformed transmissions. As an example, the AP 105 may use multiple antennas or antenna arrays to conduct beamforming operations for directional communications with a STA 115. Beamforming (which may also be referred to as spatial filtering or directional transmission) is a signal processing technique that may be used at a transmitter (for example, the AP 105) to shape or steer an overall antenna beam in the direction of a target receiver (for example, a STA 115). Beamforming may be achieved by combining elements in an antenna array in such a way that transmitted signals at particular angles experience constructive interference while others experience destructive interference. In some examples, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (for example, or antenna port) such that the desired beamforming effects are achieved. In some examples, these weights may be determined before beamforming can be employed. For example, the transmitter (for example, the AP 105) may transmit one or more sounding packets to the receiver in order to determine CSI.

WLAN 100 may further support MIMO wireless systems. Such systems may use a transmission scheme between a transmitter (for example, the AP 105) and a receiver (for example, a STA 115), in which both transmitter and receiver are equipped with multiple antennas. For example, the AP 105 may have an antenna array with a number of rows and columns of antenna ports that the AP 105 may use for beamforming in its communication with a STA 115. Signals may be transmitted multiple times in different directions (for example, each transmission may be beamformed differently). The receiver (for example, STA 115) may try multiple beams (for example, antenna subarrays) while receiving the signals.

WLAN PDUs may be transmitted over a radio frequency spectrum band, which in some examples may include multiple sub-bands or frequency channels. In some examples, the radio frequency spectrum band may have a bandwidth of 80 MHz, and each of the sub-bands or channels may have a bandwidth of 20 MHz. Transmissions to and from STAs 115 and APs 105 typically include control information within a header that is transmitted prior to data transmissions. The information provided in a header is used by a receiver to decode the subsequent data. A legacy WLAN preamble may include legacy short training field (STF) (L-STF) information, legacy long training field (L-LTF) information, and legacy signaling (L-SIG) information. The legacy preamble may be used for packet detection, automatic gain control and channel estimation, among other uses. The legacy preamble may also be used to maintain compatibility with legacy devices.

Figure 2:
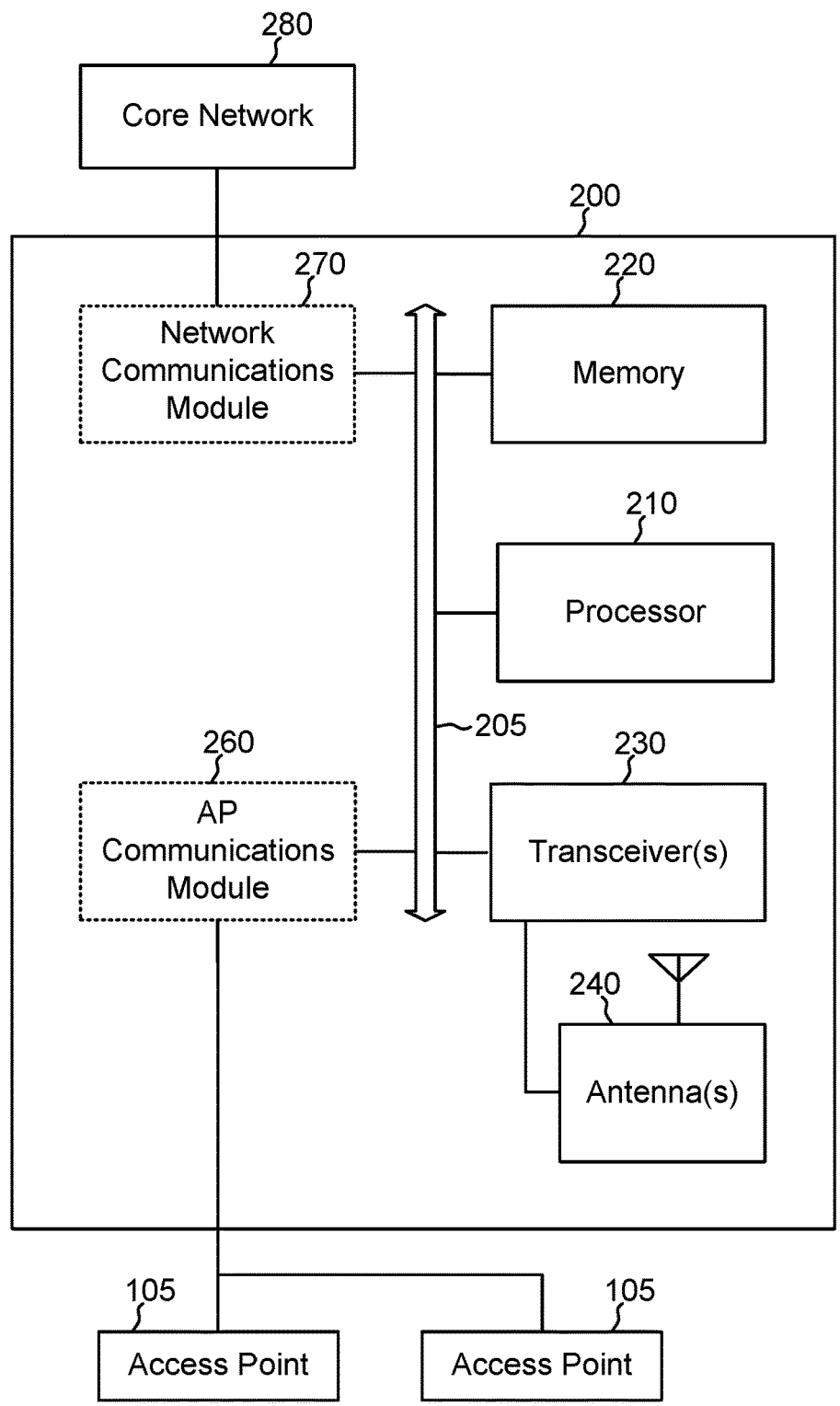
FIG. 2 shows a block diagram of an example AP that supports improved spatial reuse for WLAN networks in accordance with aspects of the present disclosure.

FIG. 2 shows a block diagram of an example AP 200 that supports improved spatial reuse for WLAN networks. For example, the AP 200 may be an example of aspects of the AP 105 described with reference to FIG. 1. The AP 200 can be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The AP 200 includes a processor 210, a memory 220, at least one transceiver 230 and at least one antenna 240. In some implementations, the AP 200 also includes one or both of an AP communications module 260 and a network communications module 270. Each of the components (or "modules") described with reference to FIG. 2 can communicate with one another, directly or indirectly, over at least one bus 205.

The memory 220 can include random access memory (RAM) and read-only memory (ROM). The memory 220 also can store processor- or computer-executable software code 225 containing instructions that, when executed by the processor 210, cause the processor to perform various functions described herein for wireless communication, including generation and transmission of a DL frame and reception of an UL frame.

The processor 210 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 210 processes information received through the transceiver 230, the AP communications module 260, and the network communications module 270. The processor 210 also can process information to be sent to the transceiver 230 for transmission through the antenna 240, information to be sent to the AP communications module 260, and information to be sent to the network communications module 270. The processor 210 can generally be configured to perform various operations related to generating and transmitting a DL frame and receiving an UL frame.

The transceiver 230 can include a modem to modulate packets and provide the modulated packets to the antenna 240 for transmission, as well as to demodulate packets received from the antenna 240. The transceiver 230 can be implemented as at least one radio frequency (RF) transmitter and at least one separate RF receiver. The transceiver 230 can communicate bi-directionally, via the antenna 240, with at least one STA 115 as, for example, shown with reference to FIG. 1. Although only one transceiver 230 and one antenna 240 are shown with reference to FIG. 2, the AP 200 can typically include multiple transceivers 220 and antennas 240. For example, in some AP implementations, the AP 200 can include multiple transmit antennas (each with a corresponding transmit chain) and multiple receive antennas (each with a corresponding receive chain). The AP 200 may communicate with a core network 280 through the network communications module 270. The system also may communicate with other APs, such as APs 105, using the AP communications module 260.

Figure 3:
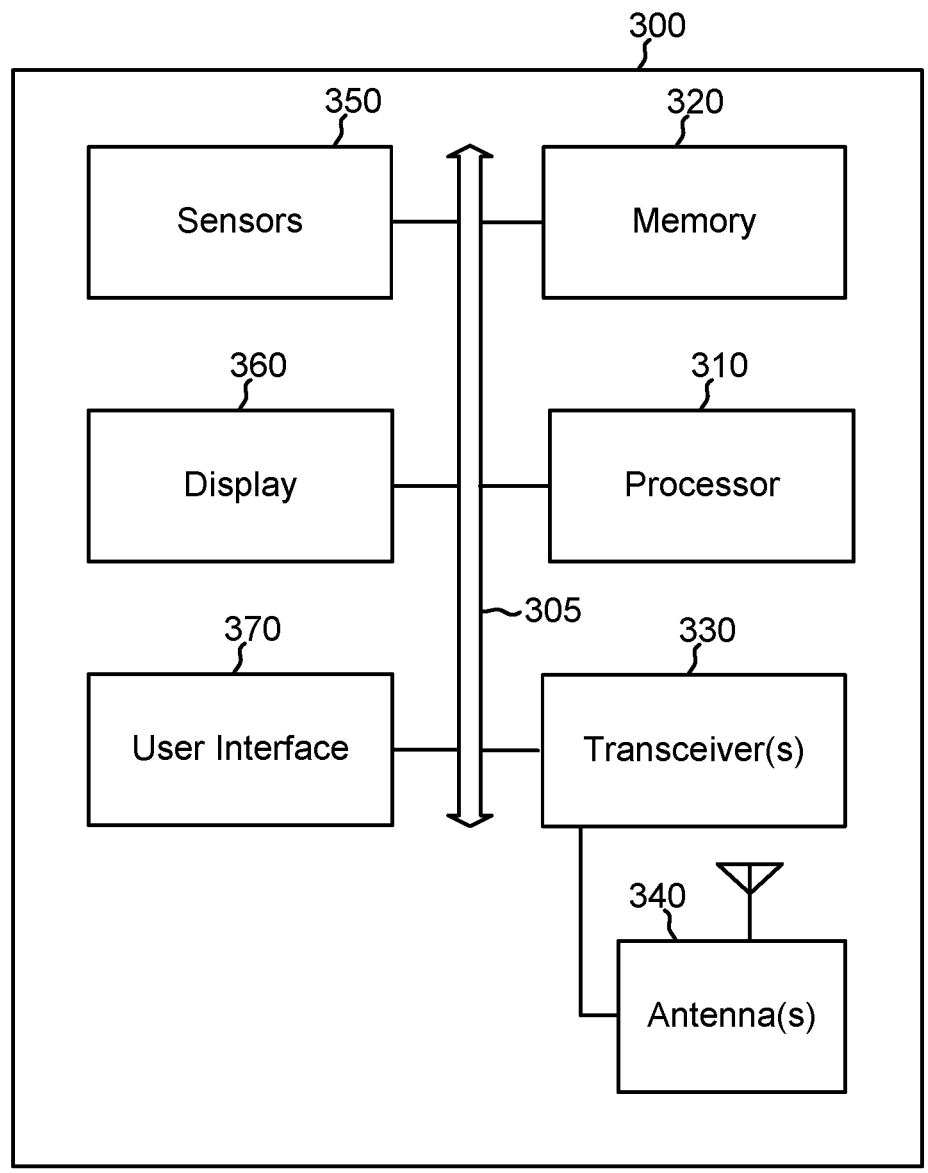
FIG. 3 shows a block diagram of an example STA that supports improved spatial reuse for WLAN networks in accordance with aspects of the present disclosure.

FIG. 3 shows a block diagram of an example STA 300 supports improved spatial reuse for WLAN networks. For example, the STA 300 may be an example of aspects of the STA 115 described with reference to FIG. 1. The STA 300 can be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The STA 300 includes a processor 310, a memory 320, at least one transceiver 330 and at least one antenna 340. In some implementations, the STA 300 additionally includes one or more of sensors 350, a display 360 and a user interface (UI) 370 (such as a touchscreen or keypad). Each of the components (or "modules") described with reference to FIG. 3 can communicate with one another, directly or indirectly, over at least one bus 305.

The memory 320 can include RAM and ROM. The memory 320 also can store processor- or computer-executable software code 325 containing instructions that, when executed, cause the processor 310 to perform various functions described herein for wireless communication, including reception of a DL frame and generation and transmission of an UL frame.

The processor 310 includes an intelligent hardware device such as, for example, a CPU, a microcontroller, an ASIC or a PLD such as an FPGA, among other possibilities. The processor 310 processes information received through the transceiver 330 as well as information to be sent to the transceiver 330 for transmission through the antenna 340. The processor 310 can be configured to perform various operations related to receiving a DL frame and generating and transmitting an UL frame.

The transceiver 330 can include a modem to modulate packets and provide the modulated packets to the antenna 340 for transmission, as well as to demodulate packets received from the antenna 340. The transceiver 330 can be implemented as at least one RF transmitter and at least one separate RF receiver. The transceiver 330 can communicate bi-directionally, via the antenna 340, with at least one AP 105 as, for example, shown with reference to FIG. 1. Although only one transceiver 330 and one antenna 340 are shown with reference to FIG. 3, the STA 300 can include two or more antennas. For example, in some STA implementations, the STA 300 can include multiple transmit antennas (each with a corresponding transmit chain) and multiple receive antennas (each with a corresponding receive chain).

Figure 4:
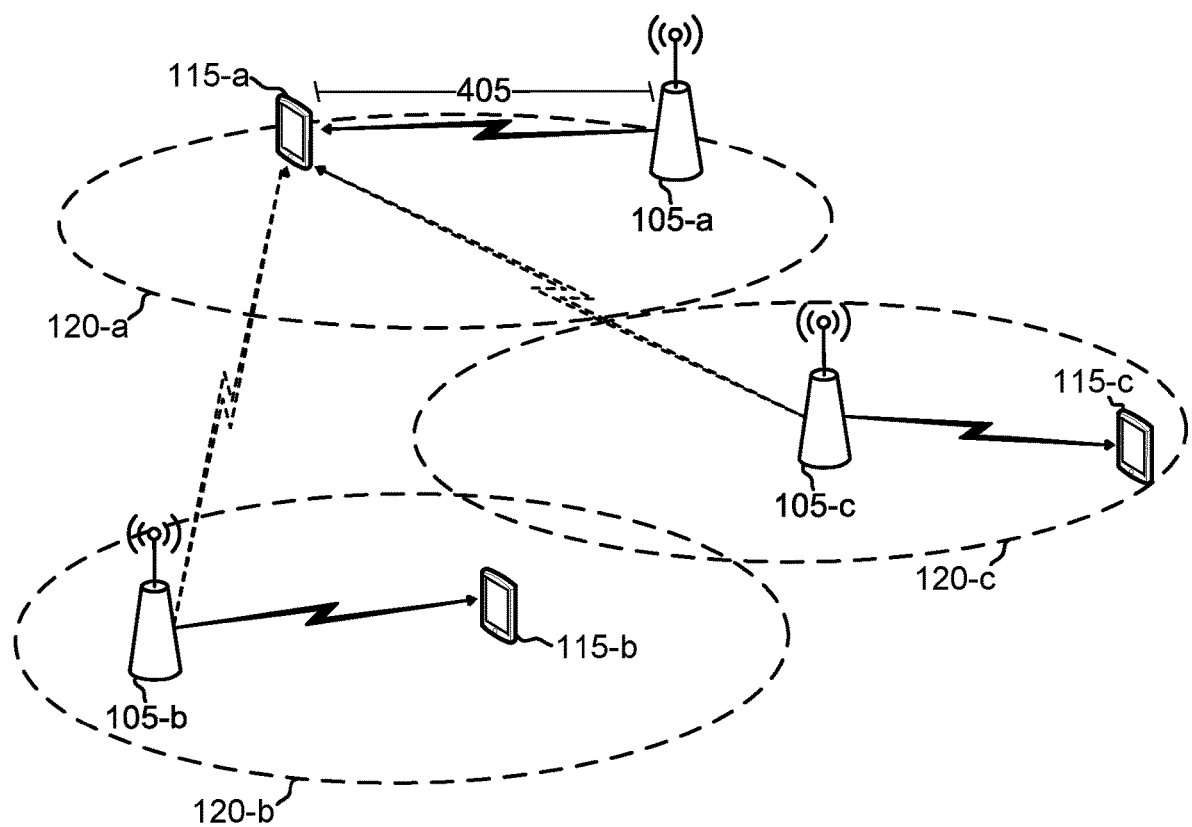
FIG. 4 illustrates an example of a wireless communications system that supports improved spatial reuse for WLAN networks in accordance with aspects of the present disclosure.

FIG. 4 illustrates an example of a wireless communications system 400 that supports features for improved spatial reuse for WLAN networks. Wireless communications system 400 may be an example of a WLAN, as described with reference to FIG. 1. Wireless communications system 400 may include numerous APs 105 serving one or more associated STAs 115 over a coverage area 120 (for example, the coverage areas 120-a, 120-b, 120-c). An AP 105 may associate and communicate with the one or more associated STAs 115 via the communication link 110, as described with reference to FIG. 1. A single AP 105 and the associated STAs 115 served by the AP 105 (for example, the STA 115-a served by the AP 105-a) may be referred to as a BSS.

Wireless communications system 400 may be an unmanaged wireless network, with limited over-the-air cooperation between the APs 105 of the network. Each of the APs 105-a, 105-b, or 105-c may operate independently as part of the un-managed network, which may not support backhaul connectivity or centralized control. For example, each of the APs 105-a, 105-b, or 105-c may be supported by diverse vendors or operators with limited over-the-air cooperation. As described, each of the APs 105-a, 105-b, or 105-c may be configured for EHT operability on the wireless communications system 400 and may be configured for coordinated reuse within a configured range (for example, within a configured distance between the APs 105 and averting natural reuse implementation). Based on the supported EHT operability, the un-managed APs 105 may support enhanced operability for spatial reuse parameter supported reuse.

In some examples, the enhanced operability may include coordination of the APs 105, according to over-the-air signaling cooperation, to identify improved spatial reuse opportunities within a TXOP on a wireless medium. The coordination may include loose synchronization of signaling between the BSSs of the un-managed network (for example, level-2 coordination) over the TXOP. The synchronization may be associated with concurrent UL or DL transmissions by the group of the un-managed APs 105, on a TXOP by TXOP basis, to improve interference management of traffic corresponding to the BSSs and to improve system throughput of the transmissions.

A first un-managed AP 105-a may contend with one or more additional un-managed APs 105 for a resource medium of the network. The AP 105-a may win the contention and as a result, identify and obtain a TXOP for data transmission (for example, DL or UL transmission). Based on the identifying, the AP 105-a may perform a polling procedure for determining a group of un-managed APs 105 for coordinated reuse of resources during the obtained TXOP. The polling procedure may include transmissions to one or more devices of the network. In some examples, the polling procedure may include the transmission of a first message to the served STAs 115 (for example, the STA 115-a) of the supported BSS of the AP 105-a. Additionally or alternatively, the polling procedure may include the transmission of a second message to the un-managed APs of the network, such as the APs 105-b or 105-c.

In the case of a DL TXOP, the AP 105-a may transmit control signaling to an intended STA 115-a. The STA 115-a may be one of a number of STAs 115 included in the BSS associated with the AP 105-a. In addition, the transmitted control signaling may include one or more indications including reuse feedback for the un-managed APs 105 that are configured for coordinated reuse on the un-managed network (for example, APs 105-b or 105-c). In some examples, the AP 105-a may transmit an enhanced or modified request-to-send (RTS) frame, such as a multi-user RTS (MU-RTS) frame, to the STA 115-a as part of an RTS clear-to-send (CTS) procedure. The MU-RTS frame may alert APs 105-b and 105-c to measure the CTS message provided by STA 115-a in response to the RTS frame transmission. For example, the MU-RTS frame may include a user information field directed to the STA 115-a for use in providing a CTS response to the MU-RTS frame. Additionally, the MU-RTS frame may include one or more additional user information fields addressed to other APs of the set of APs, including the APs 105-b and 105-c. Each of the one or more additional user information fields may include an indication to sense and measure the received signal strength indicator (RSSI) of the CTS response by STA 115-a and report the measured RSSI based on the sensing. In providing an indication to at least the APs 105-b and 105-c via the user information field of the MU-RTS frame, the AP 105-a may format the MU-RTS frame according to a modified field format.

Following the control signaling, the AP 105-a may transmit a spatial reuse poll frame to the one or more un-managed APs 105. The spatial reuse poll frame may include one or more of schedule information for the obtained TXOP or DL reuse information over the TXOP. In response to the transmission of the spatial reuse poll frame, the one or more un-managed APs 105 may transmit a spatial reuse response to the AP 105-a. The spatial reuse response may be a frame that includes one or more of measured reuse feedback information (for example, a measured power level for the CTS associated with the RTS CTS procedure initiated by the AP 105-a), an expected minimum transmit power for serving the supported STAs 115 (such as the STAs 115-b, 115-c) for DL reuse transmission, or additional feedback information.

Based on the polling procedure, the AP 105-a may determine one or more reuse criteria for the selection of the un-managed APs 105 for coordinated DL reuse over the obtained TXOP. That is, the AP 105-a may set one or more reuse criteria for determining if the DL signaling of the AP 105-b or the AP 105-c may be supported for DL reuse. The one or more reuse criteria may correspond to a transmit power threshold for acceptable interference between the BSS associated with the AP 105-a and the BSSs associated with the un-managed APs 105. The AP 105-a may be configured with a signal-to-interference ratio (SIR) to serve the STAs 115 (for example, STA 115-a) of the BSS associated with the AP 105-a using a desired modulation and coding scheme (MCS). Based on the configured SIR value, the AP 105-a may determine the maximum allowed transmit power for each of the un-managed APs 105 included in the polling procedure. For example, the AP 105-a may determine a maximum allowed transmit power for AP 105-b according to Equation (1) below.

$$T_2 = (T_1 - SIR) + (PL_2 - PL_1) \quad (1)$$

In Equation (1), $T_1$ may be the DL signal transmit power of the AP 105-a to the supported STA 115-a, SIR may be the configured SIR of AP 105-a, as detailed above, and $PL_1$ and $PL_2$ may be measured path loss values for AP 105-a and AP 105-b, respectively, to STA 115-a. As illustrated, path loss $PL_1$ may be associated with attenuation 405 over the spatial displacement between the AP 105-a and the STA 115-a for DL transmission over a communication link. Similarly, path loss $PL_2$ may be associated with attenuation over the spatial distance of the AP 105-b to the STA 115-a supported by the AP 105-b. In other cases, the AP-105-a may determine a maximum allowed transmit power for the AP 105-b based on the measured receive power of the CTS provided by the STA 115-a as part of an RTS CTS procedure of the control signaling, for example, according to Equation (2) below.

$$T_2 = (T_1 - SIR) + (C_1 - C_2) \quad (2)$$

In Equation (2), $C_1$ may be the receive power of the CTS sent by the STA 115-a, as measured, and $C_2$ may be the receive power of the CTS sent by the STA 115-a, in which the AP 105-b may transmit the measured receive power to the AP 105-a as part of the spatial reuse response frame. The calculated values of Equations (1) and (2) may be equivalent due to a relation between the path loss and CTS measurement values, for example, according to Equation (3) below.

$$(C_1 - C_2) = (T_C - PL_1) - (T_C - PL_2) = PL_1 - PL_2 \quad (3)$$

In Equation (3), $T_C$ is representative of the total transmit power of the CTS frame transmission by the STA 115-a.

Further, as described, the AP 105-*a* may perform a similar procedure for determining a maximum allowed transmit power for additional un-managed APs 105 (for example, the AP 105-*c*) based on the one or more determined measurement values.

The AP 105-*a* may evaluate the expected minimum transmit power of the one or more un-managed APs 105 that reported, as received in the spatial reuse response frame, and determine if the reported transmit power satisfies the determined maximum allowed transmit power, as indicated above. Based on the determination, the AP 105-*a* may then select from the one or more un-managed APs 105 for synchronous DL transmission in the TXOP. For example, the AP 105-*a* may determine that the reported minimum transmit power of the AP 105-*b* to service at least the STA 115-*b* exceeds the calculated maximum transmit power for acceptable interference. The AP 105-*a* may then not select the AP 105-*b* for coordinated reuse. Alternatively, the AP 105-*a* may determine that the reported minimum transmit power of the AP 105-*c* to service at least the STA 115-*c* of the associated BSS satisfies (falls below) the calculated maximum transmit power for acceptable interference. The AP 105-*a* may then select the AP 105-*c* for synchronous DL transmission in the TXOP.

Based on the selection, the AP 105-*a* may provide an indication to the one or more un-managed APs 105 (for example, AP 105-*c*) that were selected for synchronous DL transmission over the TXOP. In some examples, the indication may be provided as a spatial reuse start frame directed to the one or more un-managed (for example, selected) APs 105. Following the indication, the AP 105-*a* and the one or more un-managed APs 105 that were selected may perform synchronous DL transmission in DL slots of the TXOP as part of the coordinated reuse procedure.

Figure 5:
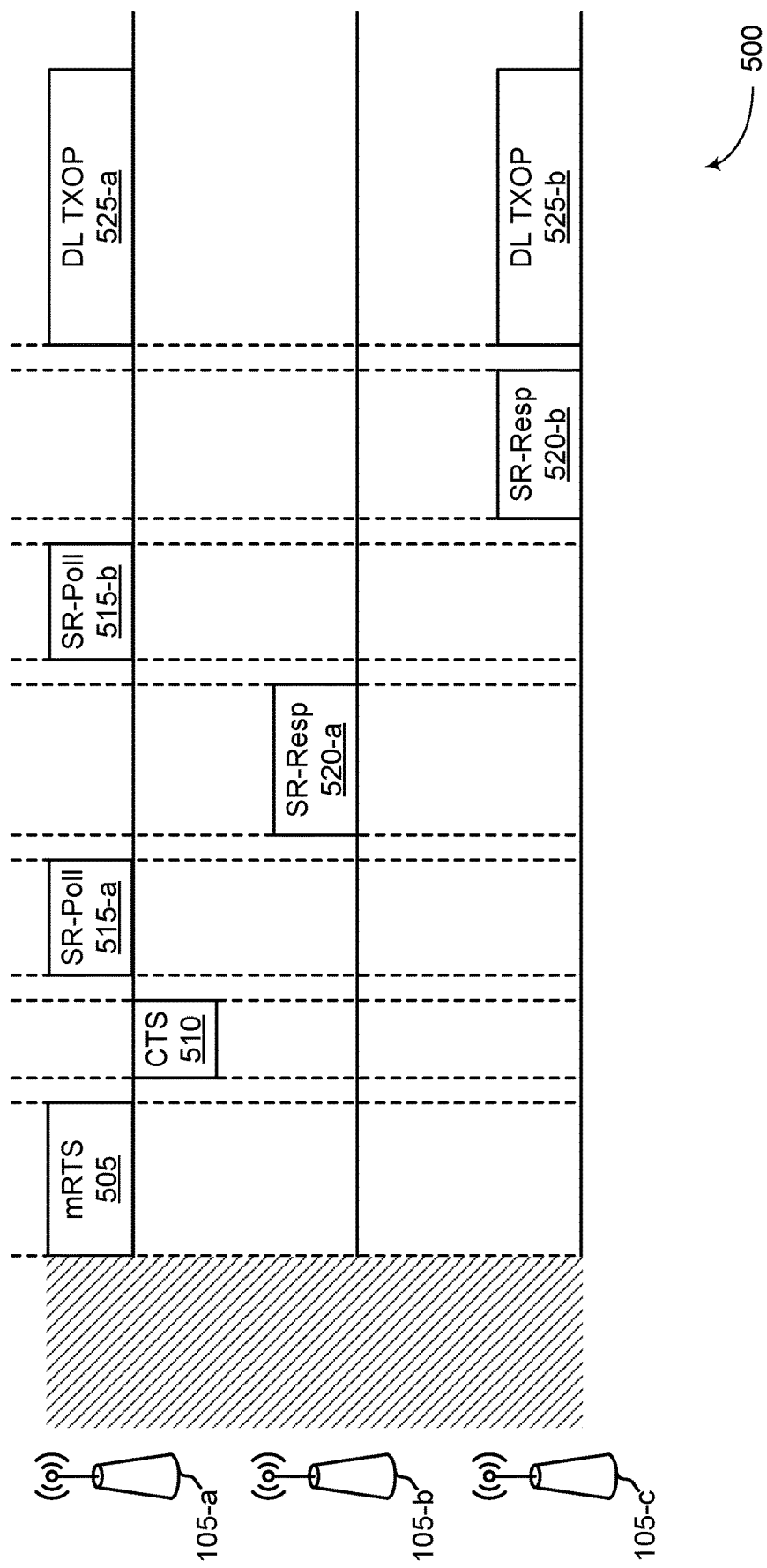
FIG. 5 illustrates an example of a call flow that supports improved spatial reuse for WLAN networks in accordance with aspects of the present disclosure.

FIG. 5 illustrates an example of a call flow 500 that supports features for improved spatial reuse for WLAN networks. The features of call flow 500 correspond to operations performed by un-managed APs 105-*a*, 105-*b*, and 105-*c*, as described with reference to FIG. 4. Each of the un-managed APs 105-*a*, 105-*b*, and 105-*c* may be independent and may serve the STAs 115 associated with their respective BSSs, as further described with reference to FIG. 4. The call flow 500, as described, may be an example of a sequential polling procedure for determining participation for coordinated reuse over a TXOP. Such a sequential polling procedure may include the transmission of reuse poll frames to individual APs and may include the reception of spatial reuse response frames from the individual APs.

The APs 105-*a*, 105-*b*, and 105-*c* may countdown selected timer values of a contention window range for access contention to a resource medium of the network. The AP 105-*a* may win the contention, and identify and obtain a TXOP for DL data transmission over the wireless medium. Based on the identifying, the AP 105-*a* may transmit a control frame, MU-RTS 505, to the one or more served STAs 115 of the AP 105-*a* as part of an RTS CTS procedure. In some examples, the AP 105-*a* may be configured for transmitting a multiple-user (MU) transmission over different DL slots. As such, the MU-RTS 505 may be a derivative of an MU-RTS indication in accordance with IEEE 802.11ax standards protocols. In addition, the MU-RTS 505 may include one or more indications including reuse feedback signaling for the one or more additional un-managed APs 105 that are configured for coordinated reuse on the un-managed network (such as, AP 105-*b* or 105-*c*). For example, the MU-RTS 505 may carry information on neighboring BSS identifiers (BSSIDs) from which the AP 105-*a* requests reuse feedback. The indications of reuse feedback signaling may include at least an indication for the un-managed APs 105 to measure a CTS frame transmission 510 by each of the one or more of the STAs 115 served by AP 105-*a*, in response to the MU-RTS control frame. Each of the STAs 115 served by the AP 105-*a* may transmit a CTS response (for example CTS frame 510) to the AP 105-*a*, and at least the APs 105-*a*, 105-*b*, and 105-*c* may measure an RSSI of the CTS frame 510.

Following the control signaling (for example, the CTS RTS procedure), the AP 105-*a* may perform a sequential polling procedure for the one or more un-managed APs 105 for which the indication included reuse feedback signaling (for example, APs 105-*b* or 105-*c*). In some examples, the AP 105-*a* may transmit a first spatial reuse poll frame 515-*a* directed to un-managed AP 105-*b*. The spatial reuse poll frame 515-*a* may include schedule information for the obtained TXOP, including DL slot sizes and durations, as well as DL reuse information, such as the BSSIDs of the un-managed APs 105 capable of coordinated reuse. The spatial reuse poll frame 515-*a* may further include a request to report the RSSI of CTS frame 510 as measured at the AP 105-*b*.

In response to the spatial reuse poll frame 515-*a*, the un-managed AP 105-*b* may transmit a spatial reuse response frame 520-*a* to the AP 105-*a*. The spatial reuse response frame 520-*a* may include the measured CTS response of each of the one or more STAs 115 that are served by the AP 105-*a*. The spatial reuse response frame 520-*a* may further include a minimum DL transmit power to serve the one or more STAs 115 that are served by the un-managed AP 105-*b* as part of a BSS. Further, in some examples, the spatial reuse response frame 520-*a* may include BSR or BQR information.

The AP 105-*a* may receive the spatial reuse response frame 520-*a* and process the included measurement values. Based on the information provided in spatial reuse response frame 520-*a*, the AP 105-*a* may determine one or more reuse criteria, including a maximum transmit power of the AP 105-*b* to support coordinated reuse with acceptable interference between BSSs of the AP 105-*a* and the AP 105-*b*, as detailed with reference to Equations (1) and (2). In some examples, the AP 105-*a* may determine that the minimum transmit power indicated by the un-managed AP 105-*b* as part of the spatial reuse response frame 520-*a* exceeds the one or more reuse criteria for participating in coordinated reuse over the TXOP. As a result, the AP 105-*a* may not select the AP 105-*b* for coordinated reuse and proceed with the polling procedure for the next un-managed AP (for example, AP 105-*c*). As such, the polling procedure may further include the transmission of the spatial reuse polling frame to the un-managed AP 105-*c* and the reception of the spatial reuse response frame from the unmanaged AP 105-*c*.

As described, the AP 105-*a* may transmit the spatial reuse poll frame 515-*b* to the AP 105-*c*. The spatial reuse poll frame 515-*b* may include one or more of schedule information or DL reuse information values of spatial reuse poll frame 515-*a*. The un-managed AP 105-*c* may receive spatial reuse poll frame 515-*b* and, in response, transmit a spatial reuse response frame 520-*b* to AP 105-*a*. The spatial reuse response frame 520-*b* may include the measured CTS response of each of one or more of the STAs 115 served by the AP 105-*a*. The spatial reuse response frame 520-*b* may further include a minimum DL transmit power to serve the one or more STAs 115 that are served by the un-managed AP 105-*c* as part of a BSS. Further, in some examples, the spatial reuse response frame 520-*b* may include BSR or BQR information.

The AP 105-*a* may receive the spatial reuse response frame 520-*b* and determine one or more reuse criteria, including a maximum transmit power to support coordinated reuse with acceptable interference, based on the information provided in the spatial reuse response frame 520-*c*. In some examples, the AP 105-*a* may determine that the included minimum transmit power indicated by the un-managed AP 105-*c* satisfies the calculated reuse criteria for participating in coordinated reuse over the TXOP. The AP 105-*a* may then select the AP 105-*c* for synchronized DL transmission over the obtained TXOP as part of a coordinated reuse procedure.

The AP 105-*a* and the one or more selected un-managed APs 105, including at least the AP 105-*c*, may transmit DL signaling 525 (for example, 525-*a*, 525-*b*) over the TXOP based on satisfaction of the one or more criteria for coordinated reuse. In some examples in which multiple APs 105 are selected for coordinated reuse, the AP 105-*a* may multiplex the multiple APs 105 on different slots or sub-bands of the obtained TXOP. By performing spatial reuse of resources during the TXOP and promoting the synchronous DL transmission by the un-managed APs 105, the AP 105-*a* may reduce interference between BSSs of the network and may improve total data throughput associated with the DL transmission to the served STAs 115. Additionally, in some examples, the AP 105-*a* may obtain a longer TXOP or increased access priority for resources of the wireless medium based on the number of un-managed APs of OBSSs selected for coordinated reuse.

Figure 6:
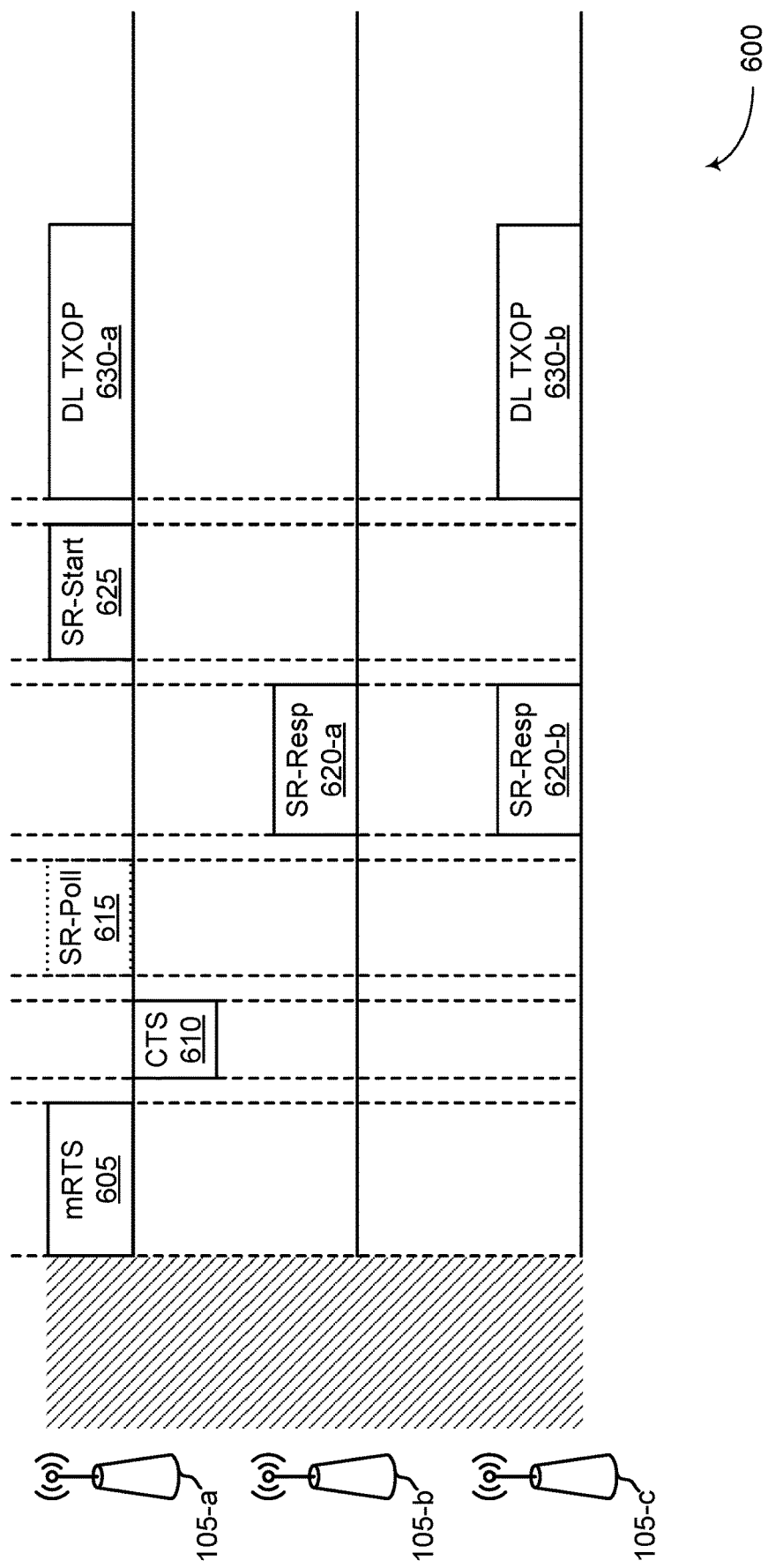
FIG. 6 illustrates an example of a call flow that supports improved spatial reuse for WLAN networks in accordance with aspects of the present disclosure.

FIG. 6 illustrates an example of a call flow 600 that supports features for improved spatial reuse for WLAN networks. The features of call flow 600 correspond to operations performed by the un-managed APs 105-*a*, 105-*b*, and 105-*c*, as described with reference to FIGS. 4 and 5. Each of the un-managed APs 105-*a*, 105-*b*, and 105-*c* may be independent and may serve associated STAs 115 of a respective BSS, as further described with reference to FIGS. 4 and 5. The call flow 600, as described, may be an example of a polling procedure for multiple APs. Such a polling procedure may include the transmission of spatial reuse poll frames, which may be examples of trigger frames, to multiple APs and the reception of spatial reuse response frames via a high efficiency (HE) trigger-based (TB) physical layer protocol data unit (PPDU), and may be used for determining participation for coordinated reuse over a TXOP.

The APs 105-*a*, 105-*b*, and 105-*c* may countdown selected timer values of a contention window range for access contention to a resource medium of the network. The AP 105-*a* may win the contention and identify and obtain a TXOP for DL data transmission over the wireless medium. Based on the identifying, the AP 105-*a* may transmit a control frame MU-RTS 605 to the one or more served STAs 115 of the AP 105-*a* as part of an RTS CTS procedure. In addition, the control frame may include one or more indications of reuse-feedback signaling for the one or more additional un-managed APs 105 configured for coordinated reuse on the un-managed network (such as the APs 105-*b* or 105-*c*). The indications of reuse-feedback may include at least an indication for the un-managed APs 105 to measure a CTS frame transmission 610 by each of the STAs 115 served by the AP 105-*a* in response to the MU-RTS control frame. Each of the STAs 115 served by the AP 105-*a* may transmit a CTS response (for example CTS frame 610) to AP 105-*a*, and at least the APs 105-*a*, 105-*b*. The STA 105-*c* may measure an RSSI indication of the CTS frame 610.

In some examples, the AP 105-*a* may perform the multiple-AP polling procedure and provide the functionality of spatial reuse poll frame 615 in the MU-RTS frame 605 (for example, MU-RTS-TF) directed to at least the STA 115-*a* of the supported BSS associated with the AP 105-*a*. The MU-RTS frame 605 may have a trigger frame structure and support EHT operations on the wireless medium. For example, MU-RTS frame 605 may include a first field of user info for multiple-access point RTS operation, including soliciting a CTS response 610. Additionally, MU-RTS frame 605 may further include one or more additional fields of user info encoded to include one or more BSSIDs to solicit an SR response frame from the set of un-managed APs 105, including at least the APs 105-*b* and 105-*c*. In some examples, a single field of user info of the MU-RTS frame 605 may contain the BSSIDs for the set of un-managed APs. In other cases, a field of user info may be allocated for each BSSID of the set of un-managed APs. In providing the transmission of spatial reuse poll frames as part of the MU-RTS 605, the AP 105-*a* may reduce message overhead for performing the polling procedure associated with the participation selection for coordinated reuse.

In some examples, the AP 105-*a* may perform the polling procedure for multiple AP and provide the functionality of the spatial reuse poll frame 615 in the CTS frame 610 (for example, e-CTS) provided by the served STAs 115 (for example, STA 115-*a*) of the AP 105-*a* in response to the MU-RTS 605. The CTS frame 610 may include a HE preamble and support EHT operations on the wireless medium (for example, a structure similar to a HE TB PPDU). In some examples, HE-SIG fields within CTS frame 610 may provide an identification indication for the set of un-managed APs 105 monitoring the CTS frame 610 as indicated in MU-RTS frame 605. For example, a HE-SIG-A field of the CTS frame 610 may include 25+1 total available candidate bits for providing identification indication for the set of un-managed APs 105. The available candidate bits may correspond to 16 (4×4) candidate bits for SR in supplement to the available 9 bits (for example, bits 7-15) plus 1 bit (for example, bit 23) within the CTS frame 610. The candidate bits of the CTS frame 610 may further support an encoding for a BSS coloring indication (for example, 6-bits of each BSS) for addressing medium contention overhead (such as, due to OBSS spatial reuse). In transmitting the spatial reuse poll frames as part of the CTS frame 610, the AP 105-*a* may reduce message overhead for performing the polling procedure associated with the participation selection for coordinated reuse.

In other cases, following the control signaling (for example, the CTS RTS procedure), the AP 105-*a* may perform the multiple-AP polling procedure and transmit spatial reuse poll frame 615 to at least un-managed APs 105-*b* and 105-*c* as a trigger frame. The spatial reuse poll frame 615 may include schedule information for the obtained TXOP, including DL slot sizes and durations as well as DL reuse information such as the BSSIDs of the un-managed APs 105 capable of coordinated reuse. The spatial reuse poll frame 615 may further include a request to report the measured RSSI of CTS frame 610.

In response to the transmission of the spatial reuse poll frame by at least one of the MU-RTS 605, the CTS frame 610, or the distinct SR poll frame 615, the un-managed APs 105-*b* and 105-*c* may transmit the spatial reuse response frames 620-*a* and 620-*b*, respectively, to the AP 105-*a*. In the case of the transmission of the spatial reuse poll frame as part of the MU-RTS 605 or the CTS frame 610, the APs 105-*b* and 105-*c* may transmit the spatial reuse response frame 620-a and 620-b following a short interframe space (SIFs) duration. Each of the spatial reuse response frames 620-a and 620-b may be carried in a HE TB PPDU format. For example, the spatial reuse response frames 620-a and 620-b may be carried as part of a subfield encoding of a signal (SIG) field, such as the HE-SIG-A or HE-SIG-B fields of the HE TB PPDU. The spatial reuse response frames 620 may include the measured CTS response of each of the STAs 115 served by AP 105-a. The spatial reuse response frame 620-a may include a minimum DL transmit power to serve the one or more STAs 115 that are served by the AP 105-b. Similarly, the spatial reuse response frame 620-b may include a minimum DL transmit power. Further, in some examples, the spatial reuse response frames 620 may include BSR or BQR information.

The AP 105-a may receive the spatial reuse response frames (for example, as part of the received HE TB PPDU) for the set of un-managed APs 105 included in the polling procedure, including at least the spatial reuse response frames 620-a and 620-b, and determine one or more reuse criteria. In some examples, the criteria may include an allowable maximum transmit power to support coordinated reuse with the AP 105-a over the TXOP with acceptable interference for the AP 105-a, as detailed with reference to equations (1) and (2). In some examples, the AP 105-a may determine that the included minimum transmit power indicated by the un-managed AP 105-b exceeds the calculated reuse criterion for participating in coordinated reuse over the TXOP. Additionally or alternatively, the AP 105-a may determine that the included minimum transmit power indicated by the un-managed AP 105-c satisfies the calculated reuse criterion for participating in coordinated reuse over the TXOP. The AP 105-a may then select the AP 105-c for coordinated reuse over the TXOP while not selecting the AP 105-b based on the one or more calculated reuse criteria.

The AP 105-a may determine to provide a reuse opportunity for synchronous DL signaling over the obtained TXOP for a group of un-managed APs 105, including the AP 105-c, according to the selection. As part of the determination, the AP 105-a may transmit an indication for identifying the group of un-managed APs 105 of the selection. For example, the AP 105-a may transmit a spatial reuse start frame 625 to the un-managed APs 105, including an indication for identifying the determined group of un-managed APs 105 for participating in synchronous DL signaling over the obtained TXOP. The spatial reuse start frame 625 may further include an indication for the maximum allowed transmit power supported for DL reuse transmission over the TXOP.

The AP 105-a and one or more of the un-managed APs 105 of the selection, including at least the AP 105-c, may transmit DL signaling 630 (for example, 630-a, 630-b) over the TXOP following spatial reuse start frame 625. In some examples, the AP 105-a may multiplex the multiple APs 105 on different slots or sub-bands of the obtained TXOP for the selection of multiple APs 105 for coordinated reuse. Additionally or alternatively, the DL slots of the TXOP may be repeated to amortize the overhead of one or more reuse criteria, and may be determined by the AP 105-a. By performing spatial reuse of resources during the TXOP and promoting synchronous DL transmission by the un-managed APs 105, the AP 105-a may reduce interference between BSSs of the network and improve total data throughput associated with DL transmission to the served STAs 115. Additionally, in some examples, the AP 105-a may obtain a longer TXOP or increased access priority for resources of the wireless medium based on the number of un-managed APs of OBSSs selected for coordinated reuse.

Figure 7:
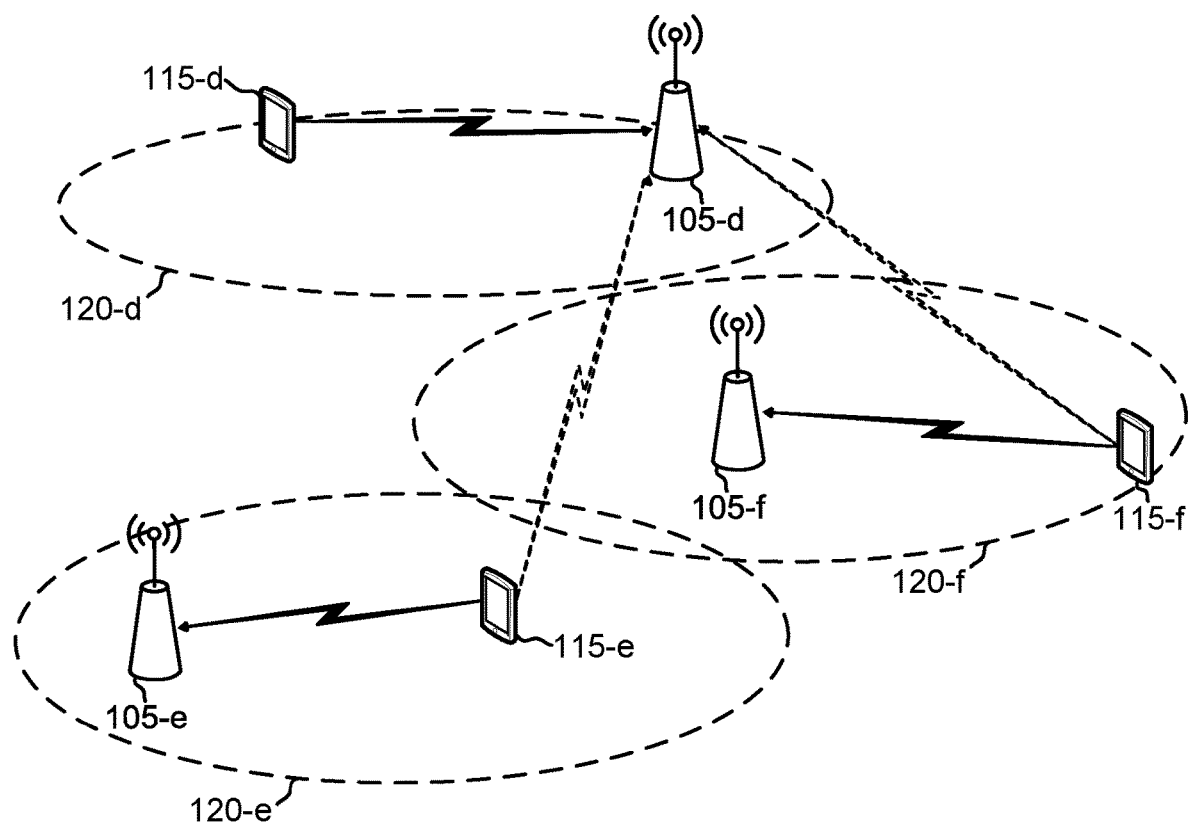
FIG. 7 illustrates an example of a wireless communications system that supports improved spatial reuse for WLAN networks in accordance with aspects of the present disclosure.

FIG. 7 illustrates an example of a wireless communications system 700 that supports features for improved spatial reuse for WLAN networks. Wireless communications system 700 may be an example of a WLAN, as described with reference to FIGS. 1 and 4. Wireless communications system 700 may include numerous APs 105 serving one or more associated STAs 115 over a coverage area 120 (for example, coverage areas 120-d, 120-e, and 120-f). An AP 105 may associate with and communicate with each of the one or more associated STAs 115 via a communication link 110, as described with reference to FIGS. 1 and 4. A single AP 105 and associated STAs 115 that are served by the AP 105 (for example, STA 115-d served by AP 105-d) may be referred to as a BSS.

Wireless communications system 700 may be an un-managed wireless network, with limited over-the-air cooperation between the APs 105 of the network. Each of the APs 105-d, 105-e, or 105-f may operate independently as part of the un-managed network without backhaul connectivity or centralized control. For example, each of the APs 105-d, 105-e, or 105-f may be supported by diverse vendors or operators with limited over-the-air cooperation. As described, each of the APs 105-d, 105-e, or 105-f may be configured for EHT operability on the wireless communications system 700 and may be configured for coordinated reuse within a configured range (for example, within a configured distance between the APs 105 and averting natural reuse implementation). Based on the supported EHT operability, the un-managed APs 105 may support enhanced operability for the spatial reuse parameter supported reuse.

In some examples, the enhanced operability may include coordination of the APs 105, according to over-the-air signaling cooperation, to identify improved spatial reuse opportunities within a TXOP on a wireless medium. The coordination may include loose synchronization of signaling between BSSs of the un-managed network (for example, level-2 coordination) over the TXOP. The synchronization may be associated with concurrent UL or DL transmissions by the group of un-managed APs 105, on a TXOP by TXOP basis, to improve interference management of traffic corresponding to the BSSs and improve system throughput of the transmissions.

A first un-managed AP 105-d may contend with one or more additional un-managed APs 105 for a resource medium of the network. AP 105-d may win the contention and as a result may identify and obtain a TXOP for data transmission (for example, DL or UL transmission). Based on the identifying, the AP 105-d may perform the procedure for determining a group of un-managed APs 105 for coordinated reuse on the resources of the obtained TXOP.

In the case of a UL TXOP, the AP 105-d may perform the polling procedure for the one or more un-managed APs 105 (for example, the APs 105-e or 105-f). The polling procedure may include the AP 105-d transmitting a spatial reuse poll frame to the one or more un-managed APs 105. The spatial reuse poll frame may include one or more of schedule information for the obtained TXOP, or UL reuse information over the TXOP. The one or more un-managed APs 105 may receive the spatial reuse poll frame and transmit a null packet trigger frame to the STAs 115 of a managed BSS based on the reception. For example, at least one of the AP 105-e or the AP 105-f may receive the transmission of the spatial reuse poll frame from the AP 105-d and may transmit a null packet trigger frame to the supported STAs (for example, STAs 115-e or 115-f) of the managed BSSs. A null packet trigger frame may include an indication of a resource allocation for the one or more un-managed APs 105 of the network (for example, as part of a common preamble encoding determined by the AP 105-*d*). The AP 105-*d* may determine the common preamble encoding and may provide an indication of the preamble contents to the one or more un-managed APs 105. In some examples, the null packet trigger frame may further include one or more resource units (for example, a broadcast resource unit) containing a BSS coloring indication for addressing medium contention overhead (such as, due to OBSS spatial reuse).

In response to the null packet trigger frame transmission, the managed STAs 115 (for example, the STAs 115-*e* or 115-*f*) may perform null packet transmission to the respective serving AP 105. For example, the STA 115-*e* may receive the null packet trigger frame from the AP 105-*e* and transmit the null packet to the AP 105-*e* based on the reception of the trigger frame. Similarly, the STA 115-*f* may receive the null packet trigger frame from the AP 105-*f* and may transmit the null packet to the AP 105-*f*. In some examples, an un-managed AP 105 may service multiple STAs 115 as part of a BSS. The null packet may be transmitted by the multiple STAs (for example, in a HE TB PPDU format) and the un-managed AP 105 may receive the combined interference of the UL null packet transmissions.

The AP 105-*d* may directly measure interference associated with the null packet transmissions of the served STAs 115 by the set of one or more un-managed APs 105, including the APs 105-*e* and 105-*f*. The AP 105-*d* may measure the interference to determine whether UL signaling associated with the STAs 115-*e* and 115-*f* may be supported for participation in coordinated reuse with APs 105-*e* or 105-*f* over the TXOP. The one or more reuse criteria may correspond to a transmit power threshold for acceptable interference between the BSS associated with the AP 105-*d* and the associated BSSs of the un-managed APs 105. The AP 105-*d* may be configured with an SIR to serve the STAs 115 (for example, the STA 115-*d*) of the BSS associated with the AP 105-*d*, at a desired MCS. Based on the configured SIR value, the AP 105-*d* may determine if the measured interference at the BSSs of APs 105-*e* or 105-*f* satisfies the one or more reuse criteria over the obtained TXOP.

In some examples, described features may further include one or more variations to the one or more configured reuse criteria for the AP 105-*d* for sub-channels of the TXOP. Different reuse criteria may be supported for different sub-channels of the TXOP and may be based on the disparate sub-channels having different transmit powers. Additionally or alternatively, disparate sub-channels of the TXOP may target different receivers with different tolerance levels. In some examples, the AP 105-*d* may determine one or more reuse criteria based on the most constrained sub-band across the different sub-bands of the TXOP. In other cases, the AP 105-*d* may determine multiple reuse criteria for the associated sub-bands.

Based on the measurement and determination for the one or more un-managed APs 105, the AP 105-*d* may then select an AP from the one or more un-managed APs 105 for synchronous UL transmission during the TXOP. For example, the AP 105-*d* may determine that the measured UL traffic of the BSS served by the AP 105-*e* exceeds the maximum transmit power for acceptable interference. The AP 105-*d* may then not select the AP 105-*e* for coordinated reuse. Alternatively, the AP 105-*d* may determine that the measured transmission interference of at least the STA 115-*f*, which is serviced over the BSS associated with the AP 105-*f*, satisfies (falls below) the calculated maximum transmit power for acceptable interference. The AP 105-*d* may then select the AP 105-*f* for synchronous UL transmission in the TXOP.

Based on the selection, the AP 105-*d* may provide an indication to the one or more un-managed APs 105 of the selection (for example, the AP 105-*f*) for synchronous UL transmission over the TXOP. In some examples, the indication may be provided as a spatial reuse trigger frame directed to the one or more un-managed APs 105 that were selected. Following the indication, the AP 105-*d* and the one or more un-managed APs 105 that were selected may transmit synchronous UL transmissions on the UL slots of the TXOP as part of coordinated reuse.

Figure 8:
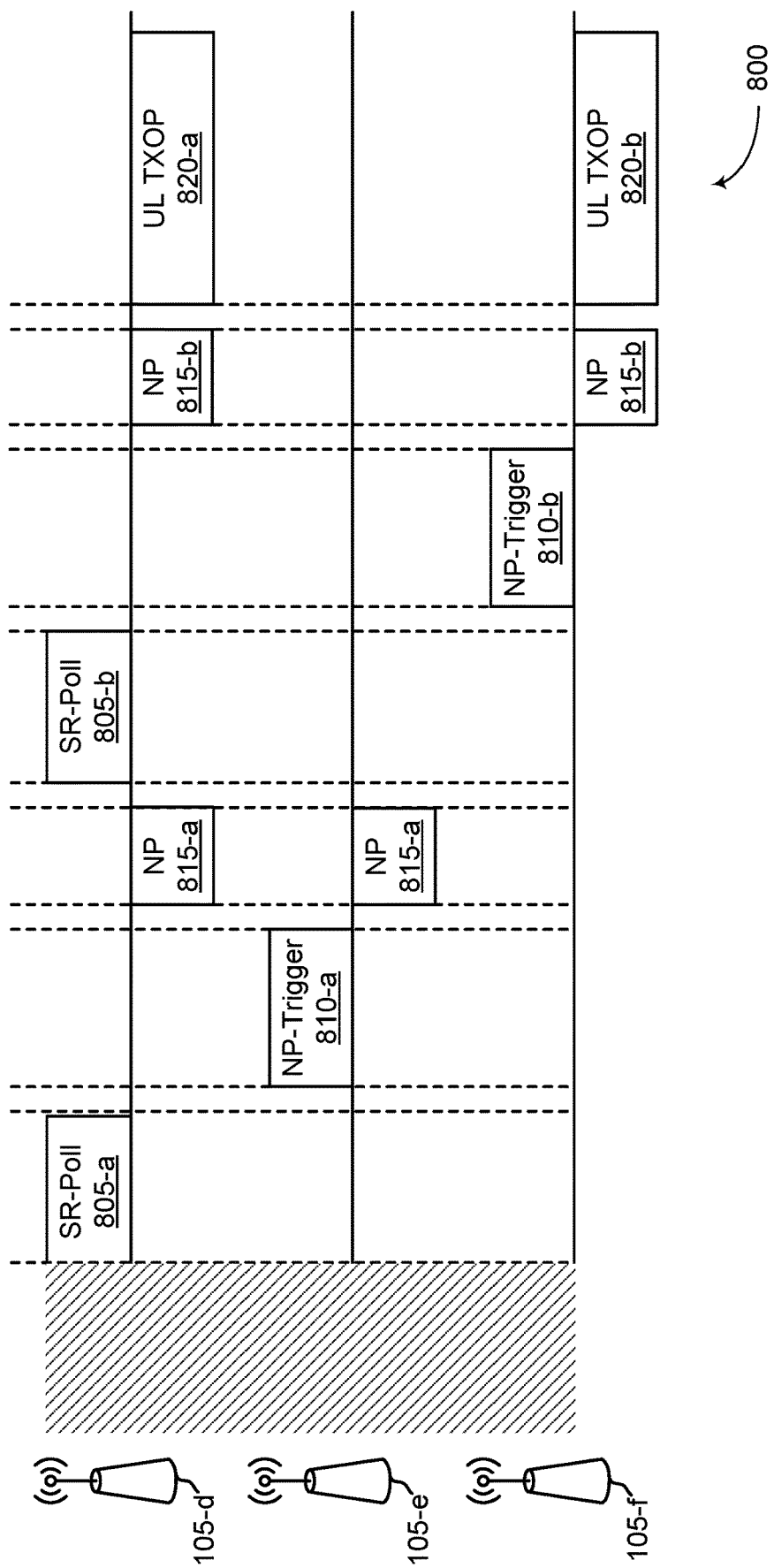
FIG. 8 illustrates an example of a call flow that supports improved spatial reuse for WLAN networks in accordance with aspects of the present disclosure.

FIG. 8 illustrates an example of a call flow 800 that supports features for improved spatial reuse for WLAN networks. The features of call flow 800 correspond to operations performed by the un-managed APs 105-*d*, 105-*e*, and 105-*f*, as described with reference to FIG. 7. Each of the un-managed APs 105-*d*, 105-*e*, and 105-*f* may be independent and may serve the STAs 115 associated with the respective BSSs, as further described with reference to FIG. 7. The call flow 800, as described, may be an example of a sequential polling procedure for determining participation in coordinated reuse over a TXOP. Such a polling procedure may include the transmission of spatial reuse poll frames to individual APs and may include the reception of spatial reuse response frame.

The APs 105-*d*, 105-*e*, and 105-*f* may countdown selected timer values of a contention window range for access contention to a resource medium of the network. The AP 105-*d* may win the contention, and identify and obtain a TXOP for UL data transmission over the wireless medium. Based on the identifying, the AP 105-*d* may perform the sequential polling procedure for the one or more un-managed APs 105 that support coordinated reuse on the wireless medium (for example, APs 105-*e* or 105-*f*). In some examples, the AP 105-*d* may transmit a first spatial reuse poll frame 805-*a* that may be directed to the un-managed AP 105-*e*. The spatial reuse poll frame 805-*a* may include the schedule information for the obtained TXOP including UL slot sizes and durations as well as UL reuse information. The UL reuse information may include the BSSIDs of the un-managed APs 105 capable of coordinated reuse and an indication of a maximum allowed interference.

The AP 105-*e* may receive the spatial reuse poll frame 805-*a* and transmit a null packet trigger frame 810-*a* to the STAs 115 (for example, the STA 115-*e*) of the BSS supported by the AP 105-*e*. In some examples, the null packet trigger frame 810-*a* may include an indication of a resource allocation for the null packet exchange by the STAs serviced by the AP 105-*e* (for example, within a common preamble encoding of the null packet trigger frame 810-*a* that may be determined by the AP 105-*d* for multiple-AP coordinated reuse). In some examples, null packet trigger frame 810-*a* may further include one or more resource units (for example, a broadcast resource unit) containing a BSS coloring indication for the supported BSS of the AP 105-*e* (for example, to address medium contention overhead due to OBSS spatial reuse).

In response to the transmission of the null packet trigger frame 810-*a*, the managed STAs 115 of the AP 105-*e*, including STA 115-*e*, may perform UL null packet transmission 815-*a* to the AP 105-*e*. In the case of multiple supported STAs over the BSS associated with the AP 105-*e*, the null packet transmission may be carried as part of a HE TB PPDU format. The AP 105-*d* may directly measure interference associated with null packet transmission 815-*a*.

The AP 105-*d* may then determine, based on the measurement, whether the interference associated with UL transmission on the BSS of the AP 105-*e* satisfies the one or more configured criteria of the AP 105-*d* for coordinated reuse. That is, the AP 105-*d* may determine whether the measured interference of UL data traffic on the BSS of the AP 105-*e* satisfies a configured transmit power threshold for acceptable interference between the BSS associated with the AP 105-*d* and the BSS associated with the AP 105-*e*. In some examples, the AP 105-*d* may determine the measured interference of null packet transmission 815-*a* exceeds the one or more configured reuse criteria for participating in coordinated reuse over the TXOP. As a result, the AP 105-*d* may not select the AP 105-*e* for coordinated reuse and proceed with the polling procedure, including the transmission of the spatial reuse polling frame to the next un-managed the AP 105-*f*.

As described, the AP 105-*d* may transmit the spatial reuse poll frame 805-*b* to the AP 105-*f*. The spatial reuse poll frame 805-*b* may include one or more of schedule information or UL reuse information values of spatial reuse poll frame 805-*a*. The un-managed AP 105-*f* may receive the spatial reuse poll frame 805-*a*, and in response, may transmit a null packet trigger frame 810-*b* to the STAs 115 (for example, STA 115-*f*) of the BSS supported by the AP 105-*f*. In some examples, the null packet trigger frame 810-*b* may include the indication of a resource allocation for the null packet exchange by the STAs serviced by the AP 105-*f*. In some examples, null packet trigger frame 810-*a* may further include one or more resource units (for example, a broadcast resource unit) containing a BSS coloring indication for the supported BSS of the AP 105-*f*.

In response to the transmission of the null packet trigger frame 810-*b*, the managed STAs 115 of the AP 105-*f*, including the STA 115-*f*, may transmit the UL null packet transmission 815-*b* to the AP 105-*f*. In the case of multiple supported STAs 115 over the BSS associated with the AP 105-*f*, the null packet transmission 815-*b* may be carried as part of a HE TB PPDU format. The AP 105-*d* may directly measure the interference associated with the null packet transmission 815-*b*. The AP 105-*d* may then determine, based on the measurement, whether the interference associated with UL transmission on the BSS of the AP 105-*f* satisfies the one or more configured reuse criteria of the AP 105-*d* for coordinated reuse. In some examples, the AP 105-*d* may determine the measured interference of the null packet transmission 815-*b* satisfies the one or more configured reuse criteria for participating in coordinated reuse over the TXOP. The AP 105-*d* may then select the AP 105-*f* for synchronized UL transmission over the obtained TXOP.

AP 105-*d* and one or more selected un-managed APs 105, including at least the AP 105-*f*, may transmit DL signaling 820 (for example, 820-*a*, 820-*b*) over the TXOP based on satisfaction of the criteria for coordinated reuse. By performing the spatial reuse of resources during the TXOP and promoting synchronous UL transmission by un-managed APs 105, the AP 105-*d* may reduce interference between BSSs of the network and may improve the total data throughput associated with the UL transmission to the served STAs 115. Additionally, in some examples, the AP 105-*d* may obtain a longer TXOP or increased access priority for the resources of the wireless medium based on the number of un-managed APs of the OBSSs selected for coordinated reuse.

Figure 9:
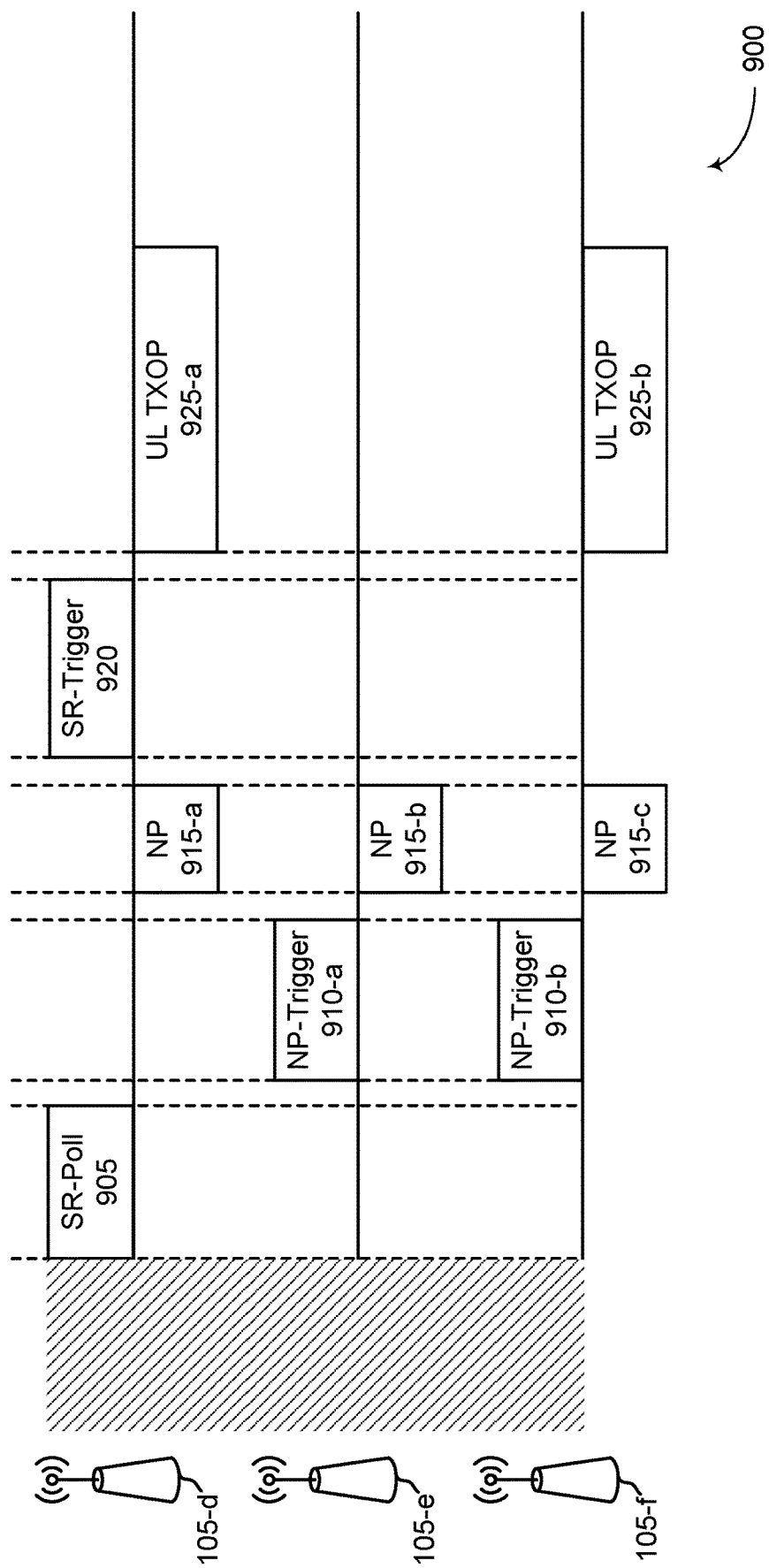
FIG. 9 illustrates an example of a call flow that supports improved spatial reuse for WLAN networks in accordance with aspects of the present disclosure.

FIG. 9 illustrates an example of a call flow 900 that supports features for improved spatial reuse for WLAN networks. The features of call flow 900 correspond to operations performed by the un-managed APs 105-*d*, 105-*e*, and 105-*f*, as described with reference to FIGS. 7 and 8. Each of the un-managed APs 105-*d*, 105-*e*, and 105-*f* may be independent and may serve the associated STAs 115 of a respective BSS, as further described with reference to FIGS. 7 and 8. The call flow 900, as described, may be an example of a polling procedure for multiple AP for determining participation for coordinated reuse over a TXOP. In such polling procedures, the AP 105-*d* may allocate resources (for example, sub-bands) of a spatial reuse poll frame for multiple un-managed APs 105 of the network.

The APs 105-*d*, 105-*e*, and 105-*f* may countdown selected timer values of a contention window range for access contention to a resource medium of the network. The AP 105-*d* may win the contention, and may identify and obtain a TXOP for DL data transmission over the wireless medium. Based on the identifying, the AP 105-*d* may perform the polling procedure for multiple AP for the one or more un-managed APs 105 that support coordinated reuse on the wireless medium (for example, APs 105-*e* or 105-*f*). The AP 105-*d* may transmit a spatial reuse poll frame 905 directed to the un-managed APs 105, as part of the polling procedure. The spatial reuse poll frame 905 may include the schedule information for the obtained TXOP, including the UL slot sizes and the durations, as well as the UL reuse information. The UL reuse information may include the BSSIDs of the un-managed APs 105 capable of coordinated reuse and an indication of a maximum allowed interference. In some examples, the AP 105-*d* may allocate a portion of the resource bandwidth spectrum of the wireless medium for each of the one or more un-managed APs 105. For example, the medium of the contention may span an 80 MHz operating bandwidth. The AP 105-*d* may allocate a first 40 MHz sub-band allocation of the wireless medium to the un-managed AP 105-*e* for the null packet exchange (such as, the null packet trigger transmission and the null packet data reception). The AP 105-*d* may then allocate a second 40 MHz sub-band allocation of the medium to the un-managed AP 105-*f* for the null packet exchange. The AP 105-*d* may provide an indication of the resource allocation as part of the spatial reuse poll frame 905.

The one or more un-managed APs 105, including APs 105-*e* and 105-*f* may receive spatial reuse poll frame 905 and transmit a null packet trigger frame 910 to managed STAs 115, as part of a HE MU PPDU in response to spatial reuse poll frame 905. For example, the AP 105-*e* may receive the spatial reuse poll frame 905 and may transmit a null packet trigger frame 910-*a* to the STAs 115 (for example, STA 115-*e*) of the supported BSS. Similarly, the AP 105-*f* may receive spatial reuse poll frame 905 and may transmit a null packet trigger frame 910-*b* to the STAs 115 (for example, STA 115-*f*) of the supported BSS. Each of the null packet trigger frames 910-*a* and 910-*b* may include an indication for the supported STAs 115 of the APs 105-*e* and 105-*f* to provide resource allocation for UL transmission within the provided sub-band allocations for the APs 105-*e* and 105-*f*. For example, the AP 105-*e* may receive a 40 MHz sub-band allocation of the operating bandwidth of the wireless medium for performing the null packet exchange with the managed STAs 115 of a supported BSS. The AP 105-*e* may indicate, within the common preamble of a null packet trigger frame 910-*a*, a resource allocation within the 40 MHz sub-band allocation for at least the STA 115-*e*. In some examples, the STA 115-*e* may be the only STA managed by the AP 105-*e* and may occupy the 40 MHz of the sub-band allocation. In other cases, the AP 105-*e* may manage multiple STAs 115, including the STA 115-*e*, and may provide a resource allocation (for example, 10 MHz, 20 MHz, etc.) for each managed STA 115 within the sub-band allocation. The AP 105-*f* may perform similar operations based on a resource sub-band allocation provided by the AP 105-*d* and the number of STAs managed by the AP 105-*f* over a supported BSS.

In response to reception of the null packet trigger frames 910, associated STAs 115 of supported BSSs for at least the AP 105-*e* or 105-*f* may perform null packet transmission 915 over the supported resource allocations provided in null packet trigger frames 910. In the case of multiple supported STAs 115 over the BSS for APs 105-*e* or 105-*f* the null packet transmissions may be carried as part of a HE TB PPDU format. The AP 105-*d* may directly measure interference associated with at least the null packet transmissions 915-*a* and 915-*b*. Due to the sub-band allocations provided to APs 105-*e* and 105-*f* via spatial reuse poll 905, the AP 105-*d* may differentiate the combined energy from the UL transmissions associated with the supported BSS associated with the AP 105-*e* and the supported BSS associated with the AP 105-*f*.

The AP 105-*d* may then determine, based on the measurement, whether the interference associated with the UL transmissions of the BSS of the AP 105-*e* and the UL transmissions of the BSS of the AP 105-*f* satisfies the one or more configured criteria of the AP 105-*d* for coordinated reuse. That is, the AP 105-*d* may determine whether the measured interference of the UL data traffic on the BSS of the AP 105-*e* and the BSS of the AP 105-*f* satisfies a configured transmit power threshold for acceptable interference by the OBSS STAs 115 of the BSS associated with the AP 105-*d*. In some examples, the AP 105-*d* may determine the measured interference of the null packet transmission 915-*a* exceeds the configured reuse criterion or criteria for participating in coordinated reuse over the TXOP. As a result, the AP 105-*d* may not select the AP 105-*e* for coordinated reuse. In other cases, the AP 105-*d* may determine the measured interference of the null packet transmission 915-*b* satisfies the configured reuse criterion or criteria for participating in coordinated reuse over the TXOP. The AP 105-*d* may then select the AP 105-*f* for synchronized UL transmission over the obtained TXOP.

Based on the selection, the AP 105-*d* provide an indication to the one or more un-managed APs 105 (for example, the AP 105-*f*) that were selected for synchronous UL transmission over the TXOP. In some examples, the indication may be provided as a spatial reuse trigger frame 920 directed to the one or more un-managed APs 105 that were selected. Following the indication, the AP 105-*d* and the one or more un-managed APs 105 that were selected, including at least the AP 105-*f*, may perform the UL signaling 925 (for example, 925-*a*, 925-*b*) over the TXOP based on the satisfaction of the one or more criteria for coordinated reuse. By performing spatial reuse of the resources during the TXOP and promoting synchronous UL transmission by the un-managed APs 105, the AP 105-*d* may reduce interference between the BSSs of the network and may improve total data throughput associated with the UL transmission to the served STAs 115. Additionally, in some examples, the AP 105-*d* may obtain a longer TXOP or may obtain increased access priority for resources of the wireless medium based on the number of un-managed APs of the OBSSs selected for coordinated reuse.

Figure 10:
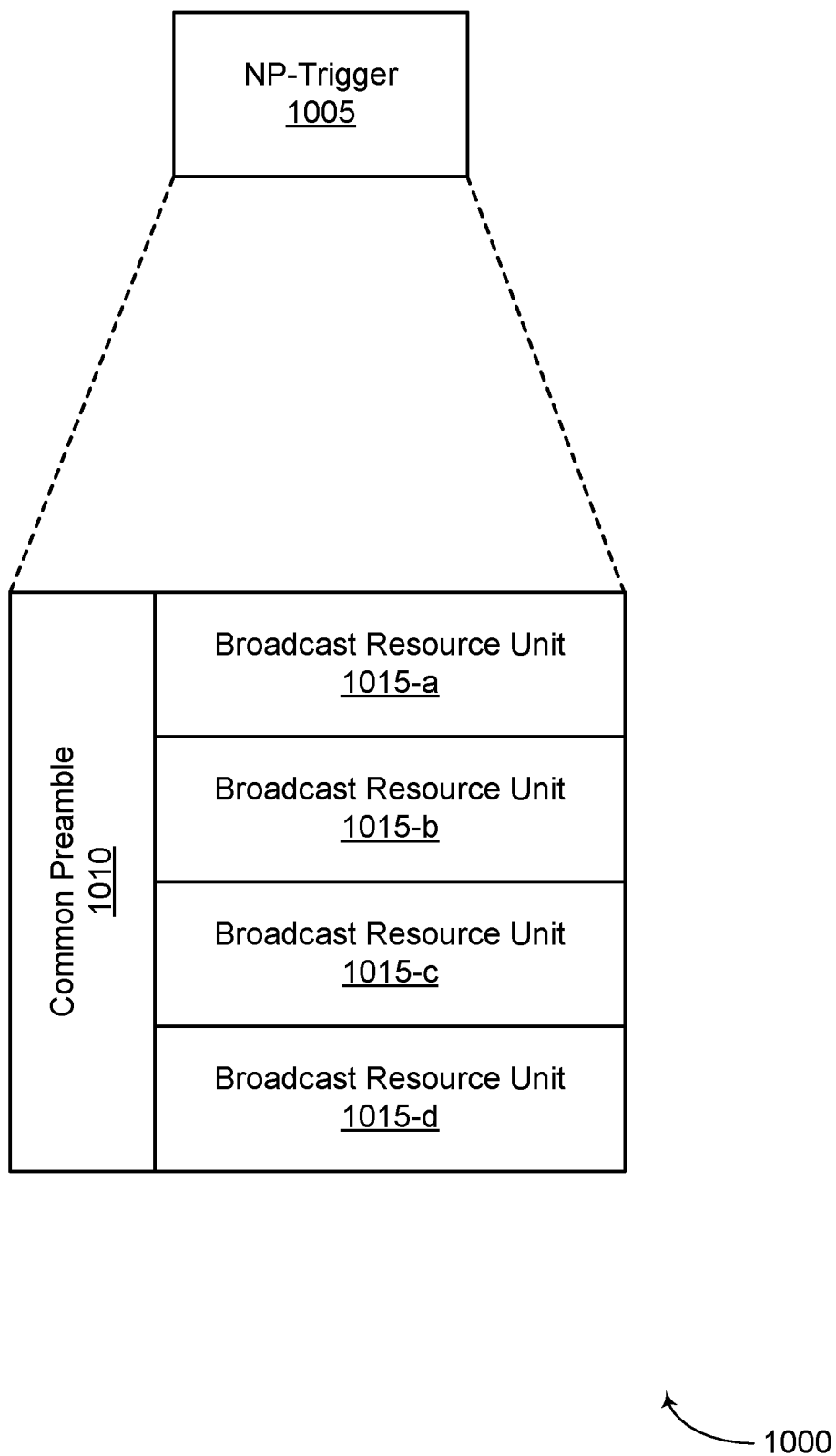
FIG. 10 illustrates an example of a null packet trigger frame structure that supports improved spatial reuse for WLAN networks in accordance with aspects of the present disclosure.

FIG. 10 illustrates an example of a null packet trigger frame structure 1000 that supports features for improved spatial reuse for WLAN networks. A null packet trigger frame 1005, as described, may be an example of aspects of a null packet trigger frame 810 or 910, described with reference to FIGS. 8 and 9. In some examples, the null packet trigger frame 1005 may be a multi-BSS PPDU which appears as a DL MU PPDU to the associated STAs of the BSSs. The null packet trigger frame 1005 may be implemented by one or more of the APs 105, described with reference to FIGS. 1-9.

The null packet trigger frame 1005 may contain a common preamble 1010 that spans the bandwidth of the null packet trigger frame 1005. The contents of the common preamble 1010 may be determined by an AP owner following winning the contention for a wireless medium and obtaining a TXOP. The common preamble 1010 may include one or more index values for identifying the allocated resource units 1015 for the STAs associated with a BSS of the network. In some examples, the common preamble 1010 may include the allocation information for performing the determination for coordinated reuse. For example, the common preamble 1010 may include the indication of one or more sub-band allocations for the un-managed APs of the network, as part of an HE MU PPDU.

The null packet trigger frame 1005 may further contain one or more resource units (for example, the broadcast resource units) 1015 encoded with a number (referred to as a color) for indicated inter-BSS detection. A bit within a SIG-A field of the null packet trigger frame 1005 (for example, via one or more reserved bits in the SIG-A field) may indicate an identification (for example, STA_ID field) in the SIG-B field that indicates a BSS color. In some examples, the broadcast resource unit 1015-*a* may be encoded with a first color for indicating a first BSS of the WLAN network. Additionally, the broadcast resource unit 1015-*b* may be encoded with a second color for indicating a second BSS. As described, one or more additional resource units 1015 may be encoded, including the broadcast resource unit 1015-*c* to a third color for indicating a third BSS and broadcast resource unit 1015-*d* to a fourth color for indicating a fourth BSS. Each of the one or more BSSs associated with the resource units 1015 of the null packet trigger frame 1005 may correspond to the OBSSs of the WLAN network. The formatting of the null packet trigger frame 1005 may aid in addressing the medium contention overhead due to the OBSS and may improve spatial reuse across network resources without significant reduction to a selected MCS due to interference.

Figure 11:
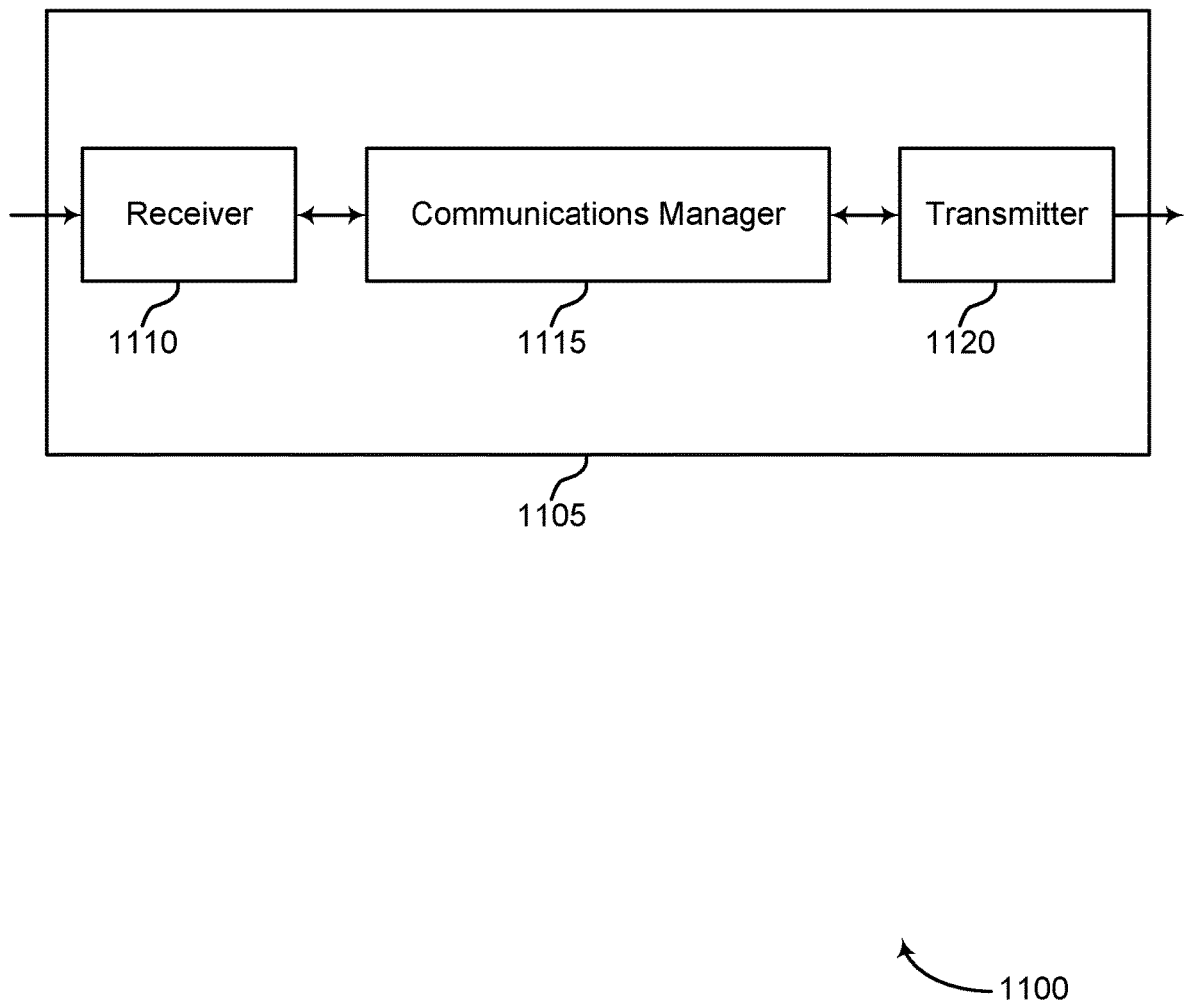
FIGS. 11 and 12 show block diagrams of devices that support improved spatial reuse for WLAN networks in accordance with aspects of the present disclosure.

FIG. 11 shows a block diagram 1100 of a device 1105 that supports improved spatial reuse for WLAN networks in accordance with aspects of the present disclosure. The device 1105 may be an example of aspects of an AP as described herein. The device 1105 may include a receiver 1110, a communications manager 1115, and a transmitter 1120. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to improved spatial reuse for WLAN networks, etc.). Information may be passed on to other components of the device. The receiver 1110 may be an example of aspects of the transceiver 1420 described with reference to FIG. 14. The receiver 1110 may utilize a single antenna or a set of antennas.

The communications manager 1115 may transmit, after winning contention for a wireless medium, a first poll to a STA served by the first access point, receive, from the STA, a first response to the first poll based on transmitting the first poll, receive, from a second access point of a set of access points, a second response including a measured signal strength indication of the first response based on transmitting the first poll, and select the second access point for coordinated reuse based on receiving the second response.

The communications manager 1115 may also transmit, after winning contention to a wireless medium, a first poll to a second access point of a set of access points, measure a signal strength indication sent by one or more STAs served by the second access point based on transmitting the first poll, and select the second access point for coordinated reuse based on measuring the signal strength indication.

The communications manager 1115 may also measure a signal strength indication of a first response sent by a STA to a second access point serving the STA, in which the first response is based on a first poll transmitted by the second access point, identify an indication to report the measuring of the signal strength indication of the first response sent by the STA based on the measuring, and transmit a second response to the second access point based on identifying the indication to report the measuring of the signal strength indication of the first response.

The communications manager 1115 may also receive, from a second access point of a set of access points, a first poll, transmit, to one or more STAs served by the first access point, a second poll based on receiving the first poll, and receive an indication from the second access point to participate in coordinated reuse over a TXOP based on transmitting the second poll. The communications manager 1115 may be an example of aspects of the communications manager 1410 described herein.

The communications manager 1115, or its sub-components, may be implemented in hardware, code (for example, software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. The actions performed by the communications manager 1115 as described herein may be implemented to realize one or more potential advantages. One example may allow an AP 105 to save energy consumption by efficiently coordinating with other APs 105 to operate in a reduced interference environment. Additionally or alternatively, the AP 105 may further synchronize UL/DL transmissions and increase reuse opportunities which may provide improved quality and reliability of service.

The transmitter 1120 may transmit signals generated by other components of the device. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
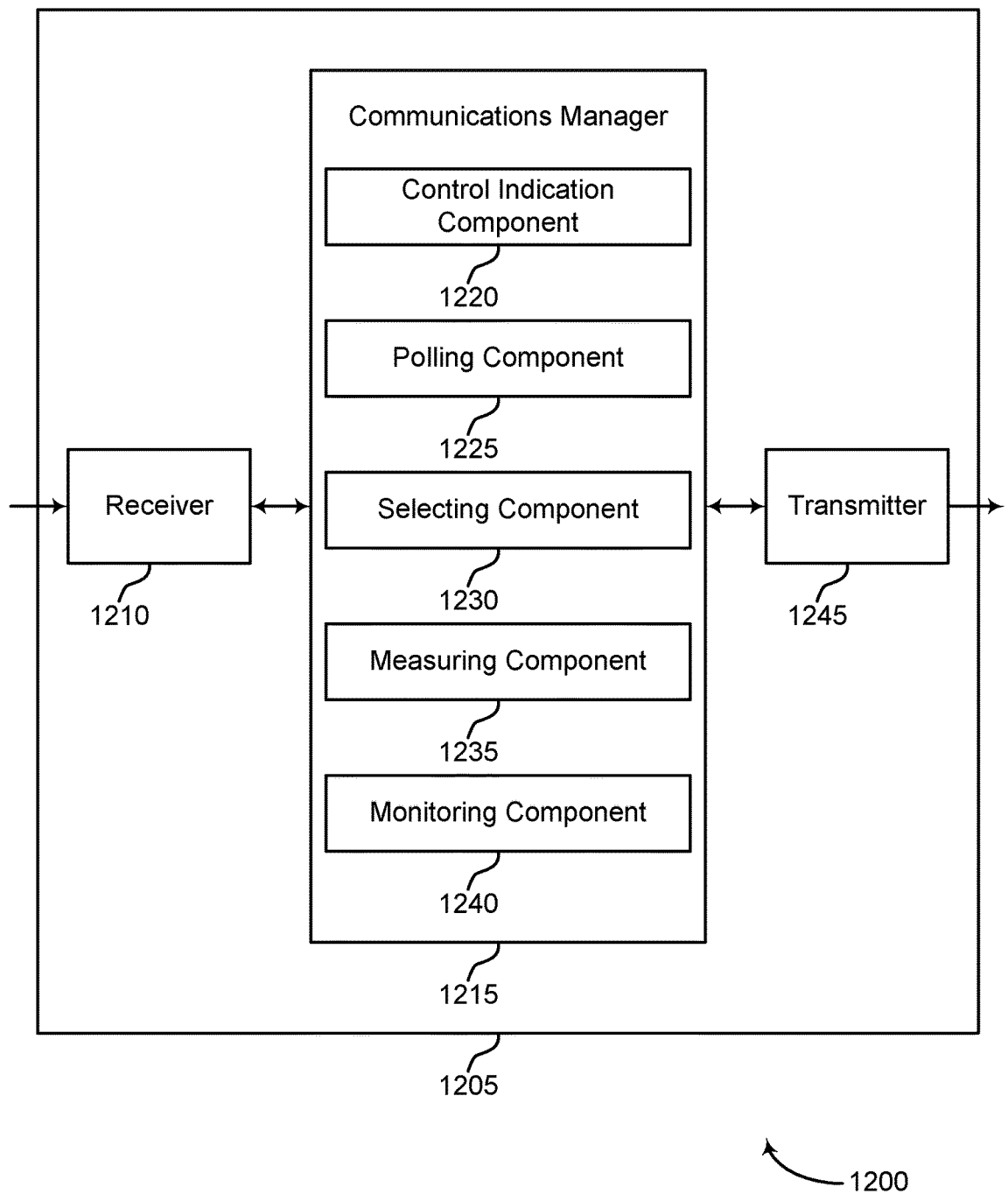

FIG. 12 shows a block diagram 1200 of a device 1205 that supports improved spatial reuse for WLAN networks in accordance with aspects of the present disclosure. The device 1205 may be an example of aspects of a device 1105 or an AP 105 as described herein. The device 1205 may include a receiver 1210, a communications manager 1215, and a transmitter 1250. The communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to improved spatial reuse for WLAN networks, etc.). Information may be passed on to other components of the device. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a control indication component 1220, a polling component 1225, a selection component 1230, a measurement component 1235, a STA management component 1240, and a monitoring component 1245. The communications manager 1215 may be an example of aspects of the communications manager 1410 described herein.

The control indication component 1220 may transmit, after winning contention for a wireless medium, a first poll to a STA served by the first access point and receive, from the STA, a first response to the first poll based on transmitting the first poll.

The polling component 1225 may receive, from a second access point of a set of access points, a second response including a measured signal strength indication of the first response based on transmitting the first poll. The polling component 1225 may transmit, after winning contention to a wireless medium, a first poll to a second access point of a set of access points. The polling component 1225 may transmit a second response to the second access point based on identifying the indication to report the measuring of the signal strength indication of the first response. The polling component 1225 may receive, from a second access point of a set of access points, a first poll and transmit, to one or more STAs served by the first access point, a second poll based on receiving the first poll.

The selection component 1230 may select the second access point for coordinated reuse based on receiving the second response. The selection component 1230 may select the second access point for coordinated reuse based on measuring the signal strength indication.

The measurement component 1235 may measure a signal strength indication sent by one or more STAs served by the second access point based on transmitting the first poll. The measurement component 1235 may measure a signal strength indication of a first response sent by a STA to a second access point serving the STA, in which the first response is based on a first poll transmitted by the second access point.

The monitoring component 1245 may identify an indication to report the measuring of the signal strength indication of the first response sent by the STA based on the measuring. The monitoring component 1245 may receive an indication from the second access point to participate in coordinated reuse over a TXOP based on transmitting the second poll.

The transmitter 1250 may transmit signals generated by other components of the device. In some examples, the transmitter 1250 may be collocated with a receiver 1210 in a transceiver module. For example, the transmitter 1250 may be an example of aspects of the transceiver 1420 described with reference to FIG. 14. The transmitter 1250 may utilize a single antenna or a set of antennas.

Figure 13:
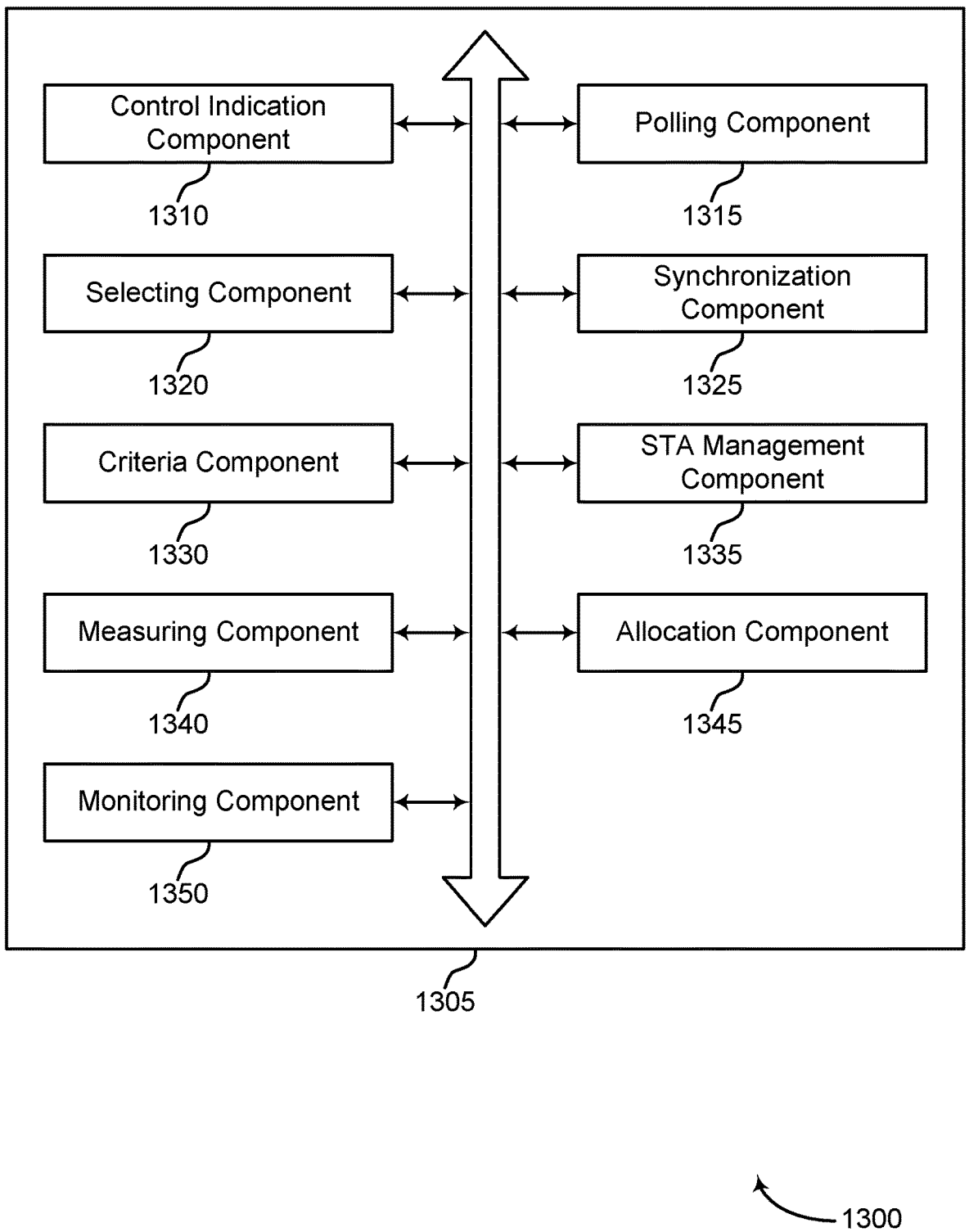
FIG. 13 shows a block diagram of a communications manager that supports improved spatial reuse for WLAN networks in accordance with aspects of the present disclosure.

FIG. 13 shows a block diagram 1300 of a communications manager 1305 that supports improved spatial reuse for WLAN networks in accordance with aspects of the present disclosure. The communications manager 1305 may be an example of aspects of a communications manager 1115, a communications manager 1215, or a communications manager 1410 described herein. The communications manager 1305 may include a control indication component 1310, a polling component 1315, a selecting component 1320, a synchronization component 1325, a criteria component 1330, a STA management component 1335, a measuring component 1340, an allocation component 1345, and a monitoring component 1350. Each of these modules may communicate, directly or indirectly, with one another (such as via one or more buses).

The control indication component 1310 may transmit, after winning contention for a wireless medium, a first poll containing a first message to a STA served by the first access point. In some examples, the control indication component 1310 may receive, from the STA, a first response to the first poll based on transmitting the first poll. In some examples, transmitting the first poll further includes transmitting the first poll to the set of access points. In some examples, the control indication component 1310 may receive, from the set of access points, a response to the first poll, in which the response is received after receiving the first response to the first poll by the STA.

In some examples, the control indication component 1310 may receive, from one or more access points of the set of access points, a response to the first poll, in which the response is based on an indication within the first response to provide reuse-feedback by one or more access points of the set of access points. In some examples, the indication is at least part of a preamble of the first response.

The polling component 1315 may receive, from a second access point of a set of access points, a second response including a measured signal strength indication of the first response based on transmitting the first poll.

In some examples, the polling component 1315 may transmit, after winning contention to a wireless medium, a first poll to a second access point of a set of access points. In some examples, the polling component 1315 may transmit a second response to the second access point based on identifying the indication to report the measuring of the signal strength indication of the first response. In some examples, the polling component 1315 may receive, from a second access point of a set of access points, a first poll. In some examples, the polling component 1315 may transmit, to one or more STAs served by the first access point, a second poll based on receiving the first poll. In some examples, the polling component 1315 may transmit, to the second access point, a second poll after receiving the first response from the STA, in which receiving the second response is based on transmitting the second poll.

In some examples, the polling component 1315 may transmit the second poll and receiving the second response is part of a polling procedure for the set of access points initiated by the first access point. In some examples, the polling component 1315 may transmit the second poll to one or more access points of the set of access points different than the second access point. In some examples, the polling component 1315 may determine, based on determining the criterion, that the one or more access points do not satisfy the criterion for coordinated reuse over the TXOP, in which transmitting the second poll to the second access point is based on determining that the one or more access points do not satisfy the criterion for coordinated reuse over the TXOP.

In some examples, transmitting the second poll to the second access point includes transmitting the second poll to a set of access points of the set of access points. In some examples, the polling component 1315 may receive, from a third access point of the set of access points, a response based on transmitting the second poll.

In some examples, the polling component 1315 may transmit, to a third access point of the set of access points, the second poll receiving the first response from the STA. In some examples, the polling component 1315 may receive, from the third access point, a response based on transmitting the second poll to the third access point. In some examples, the polling component 1315 may transmit the first poll and measuring the signal strength indication is part of a polling procedure for the set of access points initiated by the first access point.

In some examples, the polling component 1315 may transmit the first poll to one or more access points of the set of access points. In some examples, the polling component 1315 may transmit, to a third access point of the set of access points, the first poll. In some examples, the polling component 1315 may receive, from the second access point, a second poll that is transmitted after the first poll to the STA served by the first access point. In some examples, the polling component 1315 may receive the second poll is based on one or more access points of the set of access points not satisfying a criterion for coordinated reuse over a TXOP.

In some examples, the polling component 1315 may determine one or more measurement values including one or more of an RSSI measurement of the first response by the STA served by the first access point, a minimum DL transmit power to service one or more additional STAs by the second access point, BSR information, or BQR information, in which transmitting the SR response frame of the second response is based on determining the one or more measurement values.

In some examples, transmitting the second poll includes transmitting a null packet trigger frame to the one or more STAs served by the first access point. In some examples, transmitting the null packet trigger frame includes transmitting the null packet trigger frame in a high efficiency (HE) multi-user (MU) PPDU. In some examples, the second poll includes a spatial reuse (SR) poll frame. In some examples, the SR poll frame includes a trigger frame. In some examples, the SR poll frame includes one or more of schedule information for a TXOP or DL reuse information. In some examples, the schedule information includes DL slot sizes and durations for one or more DL slots of the TXOP. In some examples, the DL reuse information includes one or more of a maximum allowed interference for the first access point or BSSIDs of the set of access points.

In some examples, the second response includes an SR response frame. In some examples, the SR response frame of the second response includes one or more of an RSSI measurement of the first response by the STA served by the first access point, a minimum DL transmit power to service one or more additional STAs by the second access point, BSR information, or BQR information. In some examples, the SR response frame of the second response is included in a high efficiency (HE) TB PPDU.

In some examples, the first poll includes an SR poll frame. In some examples, the SR poll frame includes one or more of schedule information for a TXOP or UL reuse information. In some examples, the schedule information includes UL slot sizes and durations for one or more UL slots of the TXOP. In some examples, the UL reuse information includes one or more of a maximum allowed interference for the first access point or BSSIDs of the set of access points.

In some examples, the SR poll frame of the first poll includes a trigger frame. In some examples, the second poll includes an SR poll frame. In some examples, the first poll includes a MU-RTS frame. In some examples, the first response includes a CTS frame. In some examples, the first poll includes an enhanced CTS (e-CTS) frame. In some examples, the e-CTS frame of the first poll includes a HE preamble and one or more HE-SIG fields including an indication for identifying the set of access points.

In some examples, the second response includes an SR response frame. In some examples, the first poll includes an SR poll frame. In some examples, the null packet trigger frame includes one or more broadcast resource units (RUs) containing a BSS color mapping that is based on a bit indication in a field of the null packet trigger frame.

The selecting component 1320 may select the second access point for coordinated reuse based on receiving the second response. In some examples, the selecting component 1320 may select the second access point for coordinated reuse based on measuring the signal strength indication. In some examples, the selecting component 1320 may select the third access point for coordinated reuse based on the receiving the response from the third access point. In some examples, the selecting component 1320 may select the third access point for coordinated reuse based on the measuring. In some examples, the selecting component 1320 may select the third access point for coordinated reuse based on measuring the signal strength indication.

The measuring component 1340 may measure a signal strength indication sent by one or more STAs served by the second access point based on transmitting the first poll. In some examples, the measuring component 1340 may measure a signal strength indication of a first response sent by a STA to a second access point serving the STA, in which the first response is based on a first poll transmitted by the second access point. In some examples, the measuring component 1340 may measure a signal strength indication sent by one or more STAs served by the third access point based on the transmitting. In some examples, the measuring component 1340 may measure a signal strength indication sent by one or more STAs served by a third access point of the set of access points.

The monitoring component 1350 may identify an indication to report the measuring of the signal strength indication of the first response sent by the STA based on the measuring. In some examples, the monitoring component 1350 may receive an indication from the second access point to participate in coordinated reuse over a TXOP based on transmitting the second poll. In some examples, the monitoring component 1350 may receive an indication from the second access point to participate in coordinated reuse over a TXOP based on transmitting the second response. In some examples, receiving the first poll includes receiving an indication of a resource allocation within the first poll for a set of access points of the set of access points, in which transmitting the second poll is based on the indication of the resource allocation.

The synchronization component 1325 may perform synchronous DL signaling over a TXOP based on selecting the second access point. In some examples, performing synchronous DL signaling over the TXOP includes transmitting an indication for the second access point of the set of access points to perform the synchronous DL signaling. In some examples, the synchronization component 1325 may perform synchronous DL signaling over a TXOP with the second access point and the third access point based on selecting the second access point for coordinated reuse and selecting the third access point for coordinated reuse. In some examples, performing synchronous DL signaling over the TXOP includes multiplexing DL signaling of the second access point and DL signaling of the third access point over the TXOP, and in which the multiplexing includes one or more of time division multiplexing (TDM) or frequency division multiplexing (FDM) on slots or sub-bands of the TXOP.

In some examples, the synchronization component 1325 may perform synchronous UL signaling over a TXOP with the second access point based on selecting the second access point. In some examples, performing synchronous UL signaling over the TXOP includes transmitting an indication for the second access point of the set of access points to participate in the synchronous UL signaling.

In some examples, the synchronization component 1325 may perform synchronous UL signaling over a TXOP with the second access point and the third access point based on selecting the second access point and the third access point for coordinated reuse. In some examples, performing synchronous UL signaling over the TXOP includes allocating a first sub-band of the TXOP for UL signaling associated for the second access point and a second sub-band of the TXOP for UL signaling associated for the third access point.

In some examples, the synchronization component 1325 may perform synchronous DL signaling over the TXOP with the second access point based on receiving the indication from the second access point to participate in coordinated reuse over the TXOP.

In some examples, the synchronization component 1325 may perform synchronous UL signaling over the TXOP with the second access point based on receiving the indication from the second access point to participate in coordinated reuse over the TXOP. In some examples, the indication includes an SR start frame and an indication of maximum allowed transmission power for performing DL signaling over the TXOP. In some examples, the indication includes an SR start frame and an indication of maximum allowed transmission power for performing UL signaling over the TXOP.

The criteria component 1330 may determine a criterion for coordinated reuse over a TXOP with the second access point based on one or more of the second poll or the second response, in which selecting the second access point is based on determining the criterion. In some examples, the criteria component 1330 may determine that the second access point satisfies the criterion for coordinated reuse, in which selecting the second access point is based on determining that the second access point satisfies the criterion.

In some examples, the criteria component 1330 may identify a quantity of the set of access points. In some examples, the criteria component 1330 may determine a calculation for a back-off adjustment to the criterion based on identifying the quantity, in which determining the criterion is based on the determining the calculation.

In some examples, the criteria component 1330 may determine a first criterion for coordinated reuse associated with a first sub-channel of the wireless medium based on at least one of a transmit power requirement of the first sub-channel or a tolerance level associated with the first sub-channel.

In some examples, the criteria component 1330 may determine a second criterion for coordinated reuse associated with a second sub-channel of the wireless medium based on at least one of a transmit power requirement of the second sub-channel or a tolerance level associated with the second sub-channel, in which determining the criterion is based on determining the first criterion for the first sub-channel and the second criterion for the second sub-channel.

In some examples, the criteria component 1330 may determine a criterion for coordinated reuse over a TXOP with the second access point based at least in part the measuring, in which selecting the second access point is based on determining the criterion.

In some examples, the criteria component 1330 may determine that the second access point satisfies the criterion for coordinated reuse, in which selecting the second access point is based on determining that the second access point satisfies the criterion.

In some examples, the criteria component 1330 may determine, based on determining the criterion, that the one or more access points do not satisfy the criterion for coordinated reuse over the TXOP, in which transmitting the first poll to the second access point is based on determining that the one or more access points do not satisfy the criterion for coordinated reuse over the TXOP.

In some examples, the criterion for coordinated reuse includes a maximum allowed transmit power for the set of access points and is based on an SIR of the first access point to serve the STA at a modulation and coding scheme (MCS). The STA management component 1335 may perform a request-to-send RTS CTS procedure with the STA served by the first access point, in which the first poll is a MU-RTS frame. In some examples, the MU-RTS frame of the first poll includes one or more of information for the STA served by the first access point or information on one or more BSSIDs of the set of access points. In some examples, the first response includes a CTS frame.

The allocation component 1345 may allocate resources of the first poll for a set of access points of the set of access points. In some examples, the allocation component 1345 may transmit the first poll to the set of access points based on allocating the resources of the SR poll frame.

In some examples, the allocation component 1345 may determine contents of a preamble for a second poll by one or more access points of the set of access points based on the transmitting, in which measuring the signal strength indication is based on the contents of the preamble. In some examples, the second poll includes a null packet trigger frame. In some examples, the null packet trigger frame includes one or more broadcast resource units (RUs) containing a BSS color mapping, in which the BSS color mapping of the one or more broadcast RUs is based on a bit indication in a field of the null packet trigger frame.

Figure 14:
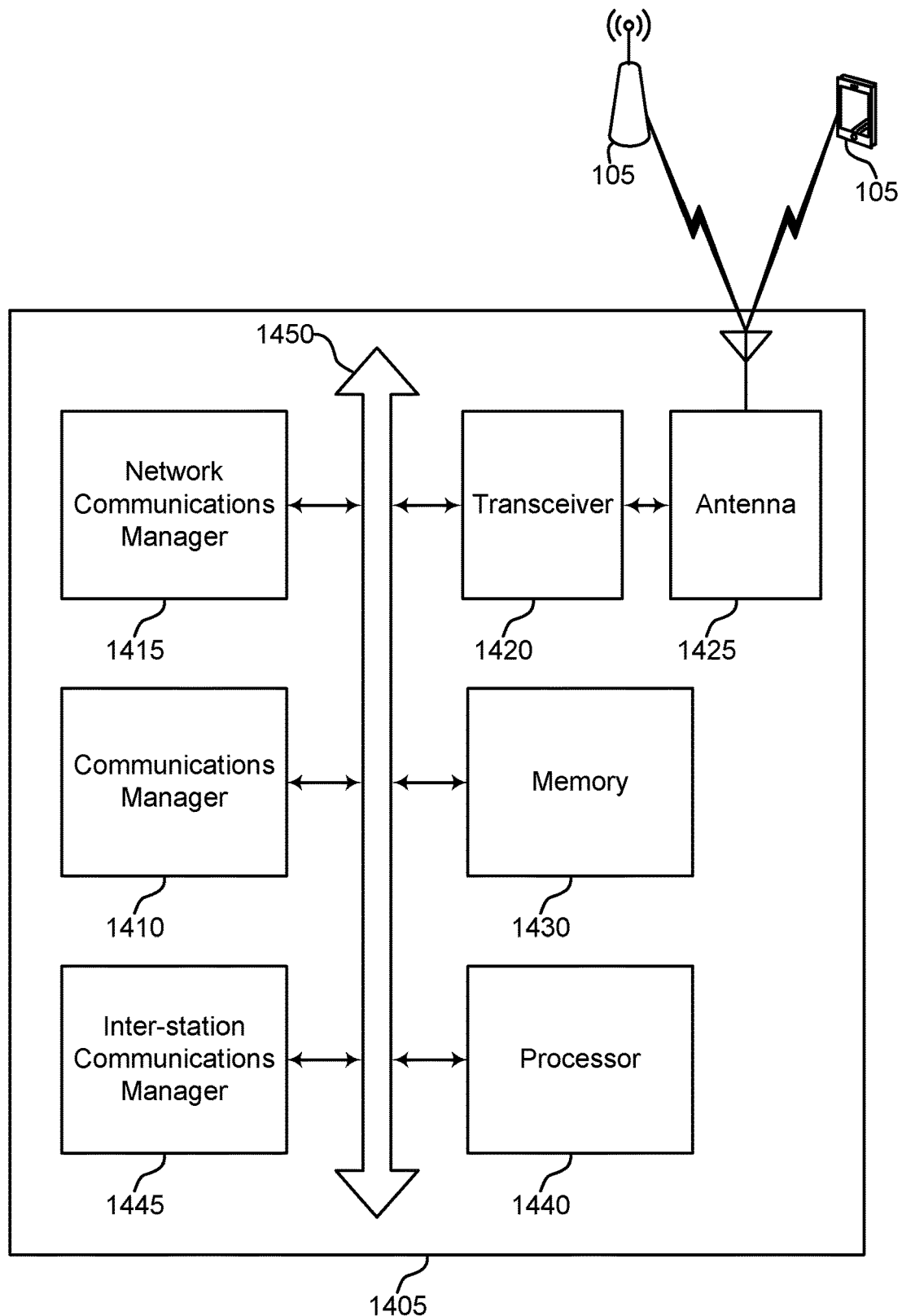
FIG. 14 shows a diagram of a system including a device that supports improved spatial reuse for WLAN networks in accordance with aspects of the present disclosure.

FIG. 14 shows a diagram of a system 1400 including a device 1405 that supports improved spatial reuse for WLAN networks in accordance with aspects of the present disclosure. The device 1405 may be an example of or include the components of device 1105, device 1205, or an AP as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (for example, bus 1450).

The communications manager 1410 may transmit, after winning contention for a wireless medium, a first poll to a STA served by the first access point, receive, from the STA, a first response to the first poll based on transmitting the first poll, receive, from a second access point of a set of access points, a second response including a measured signal strength indication of the first response based on transmitting the first poll, and select the second access point for coordinated reuse based on receiving the second response. The communications manager 1410 may also transmit, after winning contention to a wireless medium, a first poll to a second access point of a set of access points, measure a signal strength indication sent by one or more STAs served by the second access point based on transmitting the first poll, and select the second access point for coordinated reuse based on measuring the signal strength indication. The communications manager 1410 may also measure a signal strength indication of a first response sent by a STA to a second access point serving the STA, in which the first response is based on a first poll transmitted by the second access point, identify an indication to report the measuring of the signal strength indication of the first response sent by the STA based on the measuring, and transmit a second response to the second access point based on identifying the indication to report the measuring of the signal strength indication of the first response. The communications manager 1410 may also receive, from a second access point of a set of access points, a first poll, transmit, to one or more STAs served by the first access point, a second poll based on receiving the first poll, and receive an indication from the second access point to participate in coordinated reuse over a TXOP based on transmitting the second poll.

The network communications manager 1415 may manage communications with the core network (for example, via one or more wired backhaul links). For example, the network communications manager 1415 may manage the transfer of data communications for client devices, such as one or more STAs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some examples, the wireless device may include a single antenna 1425. However, in some examples, the device may have more than one antenna 1425, which may be capable of concurrently transmitting or receiving multiple wireless transmissions.

The memory 1430 may include RAM and ROM. The memory 1430 may store computer-readable, computer-executable code 14 35 including instructions that, when executed, cause the processor to perform various functions described herein. In some examples, the memory 1430 may contain, among other things, a basic input/basic output system (BIOS) which may control basic hardware or software operation such as the interaction with peripheral components or devices.

The processor 1440 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory array using a memory controller. In other cases, a memory controller may be integrated into processor 1440. The processor 1440 may be configured to execute computer-readable instructions stored in a memory to perform various functions (for example, functions or tasks supporting improved spatial reuse for WLAN networks).

The inter-station communications manager 1445 may manage communications with other APs 105, and may include a controller or scheduler for controlling communications with STAs 115 in cooperation with other APs 105. For example, the inter-station communications manager 1445 may coordinate scheduling for transmissions to STAs 115 for various interference mitigation techniques such as beamforming or joint transmission. In some examples, the inter-station communications manager 1445 may provide an X2 interface within an LTE/LTE-A wireless communication network technology to provide communication between APs 105.

Figure 15:
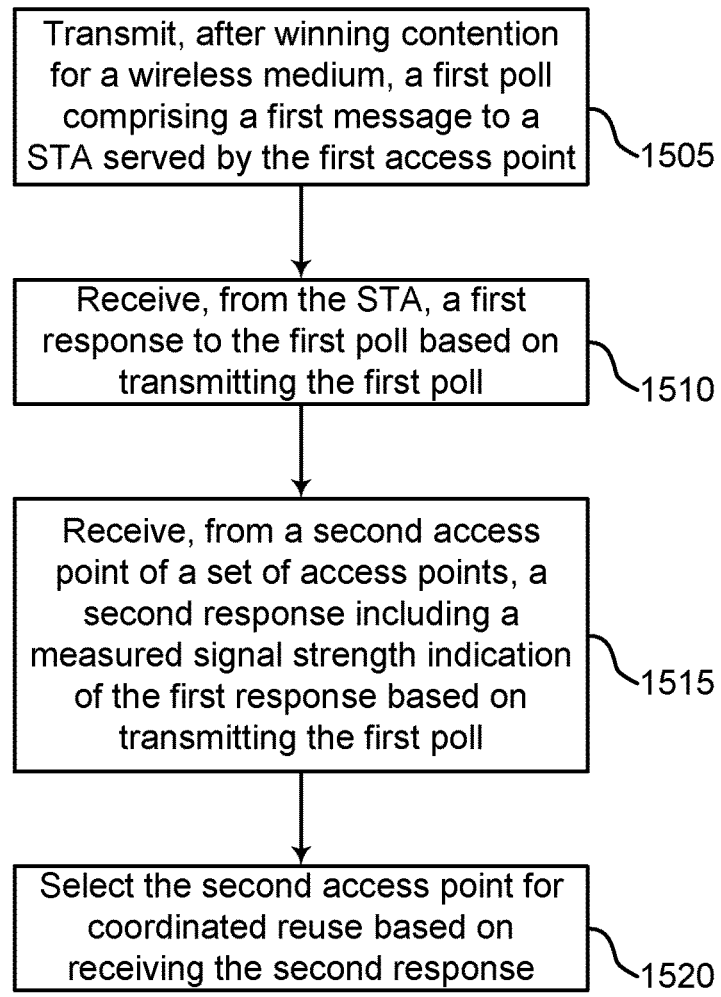
FIGS. 15 through 24 show flowcharts illustrating methods that support improved spatial reuse for WLAN networks in accordance with aspects of the present disclosure.

FIG. 15 shows a flowchart illustrating a method 1500 that supports improved spatial reuse for WLAN networks in accordance with aspects of the present disclosure. The operations of method 1500 may be implemented by an AP or its components as described herein. For example, the operations of method 1500 may be performed by a communications manager as described with reference to FIGS. 11 through 14. In some examples, an AP may execute a set of instructions to control the functional elements of the AP to perform the functions described below. Additionally or alternatively, an AP may perform aspects of the functions described below using special-purpose hardware.

At 1505, the AP may transmit, after winning contention for a wireless medium, a first poll including a first message to a STA served by the first access point. The operations of 1505 may be performed according to the methods described herein. In some examples, aspects of the operations of 1505 may be performed by a control indication component as described with reference to FIGS. 11 through 14.

At 1510, the AP may receive, from the STA, a first response to the first poll based on transmitting the first poll. The operations of 1510 may be performed according to the methods described herein. In some examples, aspects of the operations of 1510 may be performed by a control indication component as described with reference to FIGS. 11 through 14.

At 1515, the AP may receive, from a second access point of a set of access points, a second response including a measured signal strength indication of the first response based on transmitting the first poll. The operations of 1515 may be performed according to the methods described herein. In some examples, aspects of the operations of 1515 may be performed by a polling component as described with reference to FIGS. 11 through 14.

At 1520, the AP may select the second access point for coordinated reuse based on receiving the second response. The operations of 1520 may be performed according to the methods described herein. In some examples, aspects of the operations of 1520 may be performed by a selecting component as described with reference to FIGS. 11 through 14.

Figure 16:
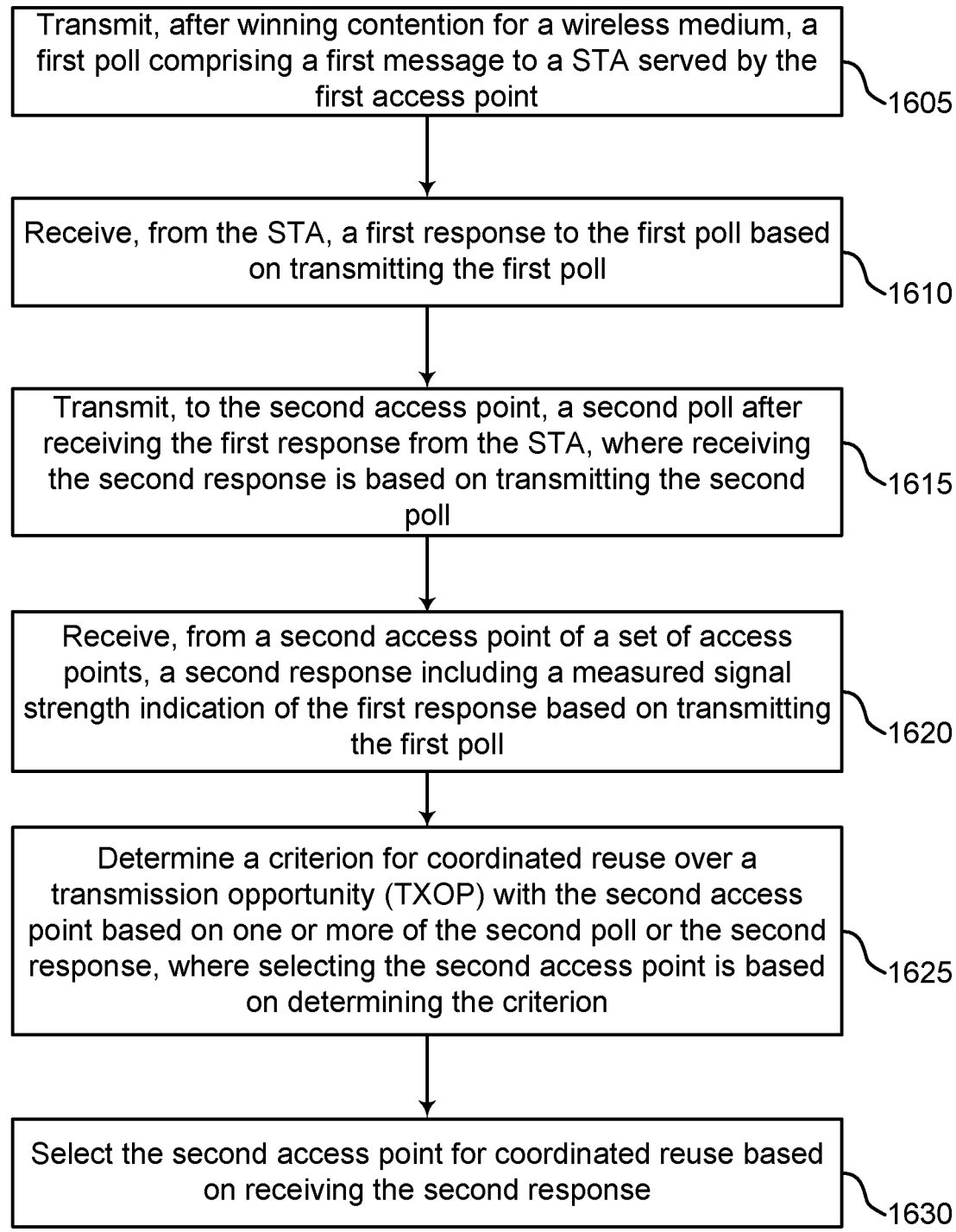

FIG. 16 shows a flowchart illustrating a method 1600 that supports improved spatial reuse for WLAN networks in accordance with aspects of the present disclosure. The operations of method 1600 may be implemented by an AP or its components as described herein. For example, the operations of method 1600 may be performed by a communications manager as described with reference to FIGS. 11 through 14. In some examples, an AP may execute a set of instructions to control the functional elements of the AP to perform the functions described below. Additionally or alternatively, an AP may perform aspects of the functions described below using special-purpose hardware.

At 1605, the AP may transmit, after winning contention for a wireless medium, a first poll including a first message to a STA served by the first access point. The operations of 1605 may be performed according to the methods described herein. In some examples, aspects of the operations of 1605 may be performed by a control indication component as described with reference to FIGS. 11 through 14.

At 1610, the AP may receive, from the STA, a first response to the first poll based on transmitting the first poll. The operations of 1610 may be performed according to the methods described herein. In some examples, aspects of the operations of 1610 may be performed by a control indication component as described with reference to FIGS. 11 through 14.

At 1615, the AP may transmit, to the second access point, a second poll after receiving the first response from the STA, in which receiving the second response is based on transmitting the second poll. The operations of 1615 may be performed according to the methods described herein. In some examples, aspects of the operations of 1615 may be performed by a polling component as described with reference to FIGS. 11 through 14.

At 1620, the AP may receive, from a second access point of a set of access points, a second response including a measured signal strength indication of the first response based on transmitting the first poll. The operations of 1620 may be performed according to the methods described herein. In some examples, aspects of the operations of 1620 may be performed by a polling component as described with reference to FIGS. 11 through 14.

At 1625, the AP may determine a criterion for coordinated reuse over a TXOP with the second access point based on one or more of the second poll or the second response, in which selecting the second access point is based on determining the criterion. The operations of 1625 may be performed according to the methods described herein. In some examples, aspects of the operations of 1625 may be performed by a criteria component as described with reference to FIGS. 11 through 14.

At 1630, the AP may select the second access point for coordinated reuse based on receiving the second response. The operations of 1630 may be performed according to the methods described herein. In some examples, aspects of the operations of 1630 may be performed by a selecting component as described with reference to FIGS. 11 through 14.

Figure 17:
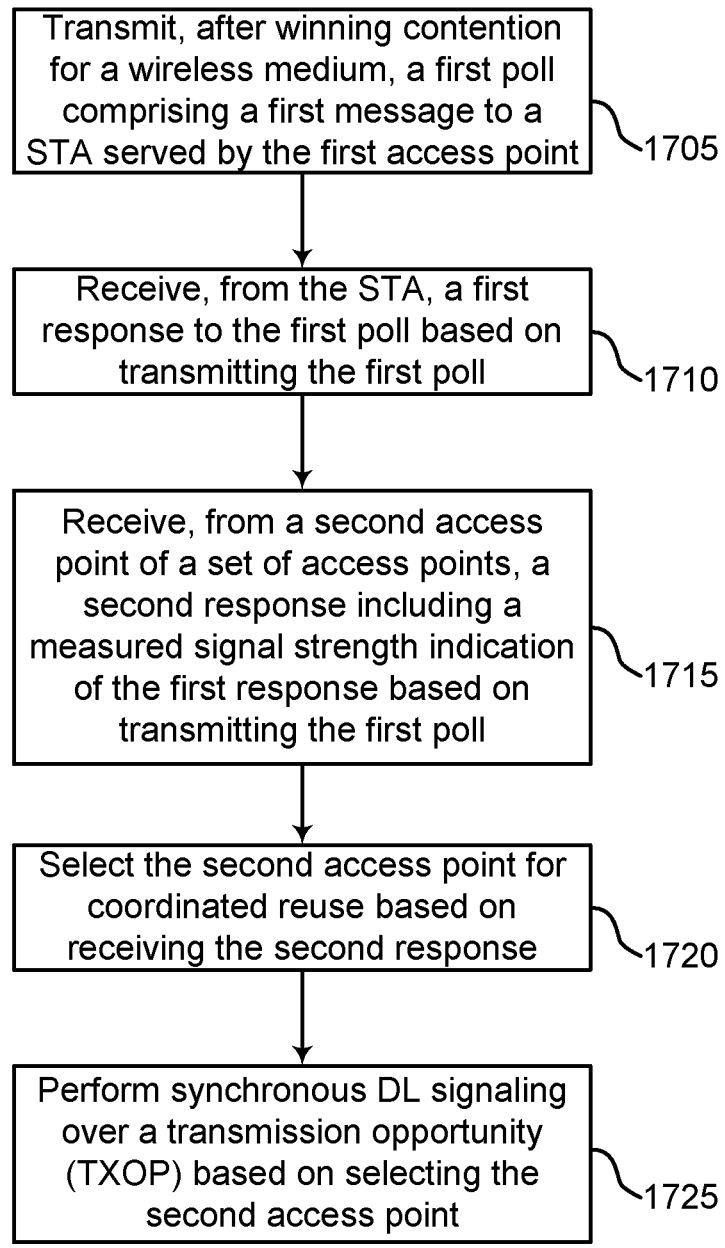

FIG. 17 shows a flowchart illustrating a method 1700 that supports improved spatial reuse for WLAN networks in accordance with aspects of the present disclosure. The operations of method 1700 may be implemented by an AP or its components as described herein. For example, the operations of method 1700 may be performed by a communications manager as described with reference to FIGS. 11 through 14. In some examples, an AP may execute a set of instructions to control the functional elements of the AP to perform the functions described below. Additionally or alternatively, an AP may perform aspects of the functions described below using special-purpose hardware.

At 1705, the AP may transmit, after winning contention for a wireless medium, a first poll including a first message to a STA served by the first access point. The operations of 1705 may be performed according to the methods described herein. In some examples, aspects of the operations of 1705 may be performed by a control indication component as described with reference to FIGS. 11 through 14.

At 1710, the AP may receive, from the STA, a first response to the first poll based on transmitting the first poll. The operations of 1710 may be performed according to the methods described herein. In some examples, aspects of the operations of 1710 may be performed by a control indication component as described with reference to FIGS. 11 through 14.

At 1715, the AP may receive, from a second access point of a set of access points, a second response including a measured signal strength indication of the first response based on transmitting the first poll. The operations of 1715 may be performed according to the methods described herein. In some examples, aspects of the operations of 1715 may be performed by a polling component as described with reference to FIGS. 11 through 14.

At 1720, the AP may select the second access point for coordinated reuse based on receiving the second response. The operations of 1720 may be performed according to the methods described herein. In some examples, aspects of the operations of 1720 may be performed by a selecting component as described with reference to FIGS. 11 through 14.

At 1725, the AP may perform synchronous DL signaling over a TXOP based on selecting the second access point. The operations of 1725 may be performed according to the methods described herein. In some examples, aspects of the operations of 1725 may be performed by a synchronization component as described with reference to FIGS. 11 through 14.

Figure 18:
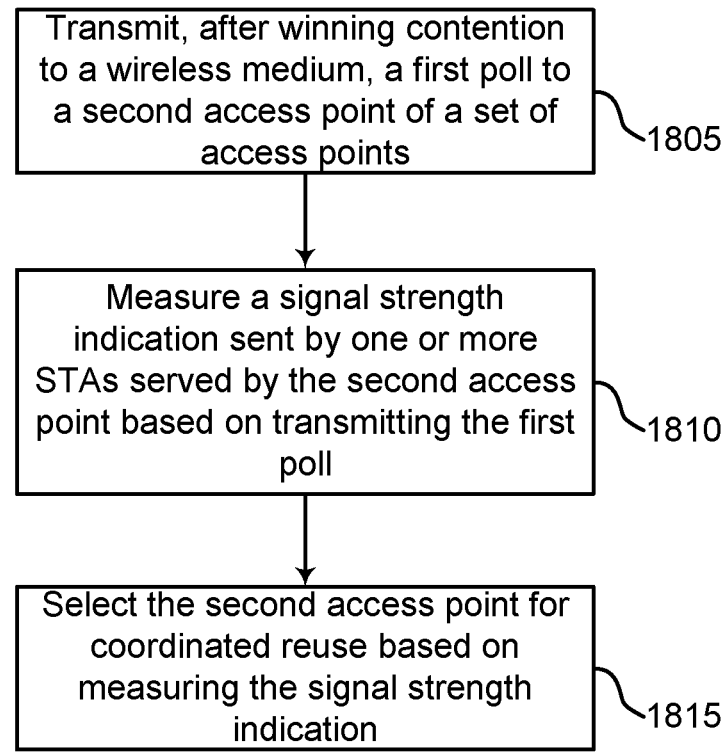

FIG. 18 shows a flowchart illustrating a method 1800 that supports improved spatial reuse for WLAN networks in accordance with aspects of the present disclosure. The operations of method 1800 may be implemented by an AP or its components as described herein. For example, the operations of method 1800 may be performed by a communications manager as described with reference to FIGS. 11 through 14. In some examples, an AP may execute a set of instructions to control the functional elements of the AP to perform the functions described below. Additionally or alternatively, an AP may perform aspects of the functions described below using special-purpose hardware.

At 1805, the AP may transmit, after winning contention to a wireless medium, a first poll to a second access point of a set of access points. The operations of 1805 may be performed according to the methods described herein. In some examples, aspects of the operations of 1805 may be performed by a polling component as described with reference to FIGS. 11 through 14.

At 1810, the AP may measure a signal strength indication sent by one or more STAs served by the second access point based on transmitting the first poll. The operations of 1810 may be performed according to the methods described herein. In some examples, aspects of the operations of 1810 may be performed by a measuring component as described with reference to FIGS. 11 through 14.

At 1815, the AP may select the second access point for coordinated reuse based on measuring the signal strength indication. The operations of 1815 may be performed according to the methods described herein. In some examples, aspects of the operations of 1815 may be performed by a selecting component as described with reference to FIGS. 11 through 14.

Figure 19:
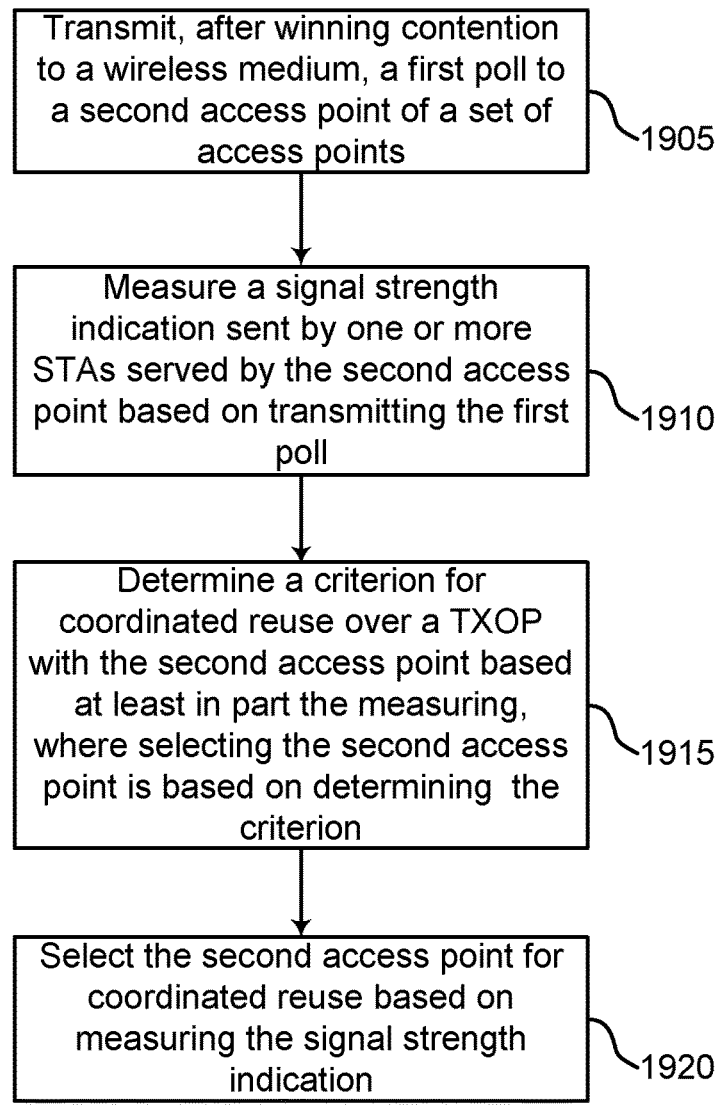

FIG. 19 shows a flowchart illustrating a method 1900 that supports improved spatial reuse for WLAN networks in accordance with aspects of the present disclosure. The operations of method 1900 may be implemented by an AP or its components as described herein. For example, the operations of method 1900 may be performed by a communications manager as described with reference to FIGS. 11 through 14. In some examples, an AP may execute a set of instructions to control the functional elements of the AP to perform the functions described below. Additionally or alternatively, an AP may perform aspects of the functions described below using special-purpose hardware.

At 1905, the AP may transmit, after winning contention to a wireless medium, a first poll to a second access point of a set of access points. The operations of 1905 may be performed according to the methods described herein. In some examples, aspects of the operations of 1905 may be performed by a polling component as described with reference to FIGS. 11 through 14.

At 1910, the AP may measure a signal strength indication sent by one or more STAs served by the second access point based on transmitting the first poll. The operations of 1910 may be performed according to the methods described herein. In some examples, aspects of the operations of 1910 may be performed by a measuring component as described with reference to FIGS. 11 through 14.

At 1915, the AP may determine a criterion for coordinated reuse over a TXOP with the second access point based at least in part the measuring, in which selecting the second access point is based on determining the criterion. The operations of 1915 may be performed according to the methods described herein. In some examples, aspects of the operations of 1915 may be performed by a criteria component as described with reference to FIGS. 11 through 14.

At 1920, the AP may select the second access point for coordinated reuse based on measuring the signal strength indication. The operations of 1920 may be performed according to the methods described herein. In some examples, aspects of the operations of 1920 may be performed by a selecting component as described with reference to FIGS. 11 through 14.

Figure 20:
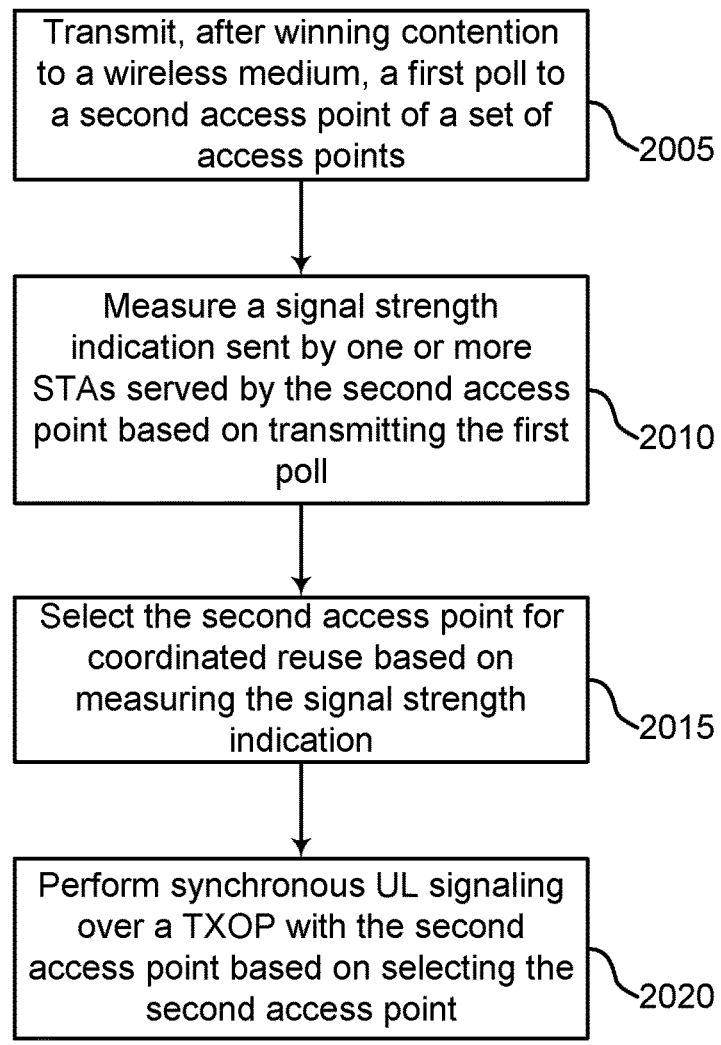

FIG. 20 shows a flowchart illustrating a method 2000 that supports improved spatial reuse for WLAN networks in accordance with aspects of the present disclosure. The operations of method 2000 may be implemented by an AP or its components as described herein. For example, the operations of method 2000 may be performed by a communications manager as described with reference to FIGS. 11 through 14. In some examples, an AP may execute a set of instructions to control the functional elements of the AP to perform the functions described below. Additionally or alternatively, an AP may perform aspects of the functions described below using special-purpose hardware.

At 2005, the AP may transmit, after winning contention to a wireless medium, a first poll to a second access point of a set of access points. The operations of 2005 may be performed according to the methods described herein. In some examples, aspects of the operations of 2005 may be performed by a polling component as described with reference to FIGS. 11 through 14.

At 2010, the AP may measure a signal strength indication sent by one or more STAs served by the second access point based on transmitting the first poll. The operations of 2010 may be performed according to the methods described herein. In some examples, aspects of the operations of 2010 may be performed by a measuring component as described with reference to FIGS. 11 through 14.

At 2015, the AP may select the second access point for coordinated reuse based on measuring the signal strength indication. The operations of 2015 may be performed according to the methods described herein. In some examples, aspects of the operations of 2015 may be performed by a selecting component as described with reference to FIGS. 11 through 14.

At 2020, the AP may perform synchronous UL signaling over a TXOP with the second access point based on selecting the second access point. The operations of 2020 may be performed according to the methods described herein. In some examples, aspects of the operations of 2020 may be performed by a synchronization component as described with reference to FIGS. 11 through 14.

Figure 21:
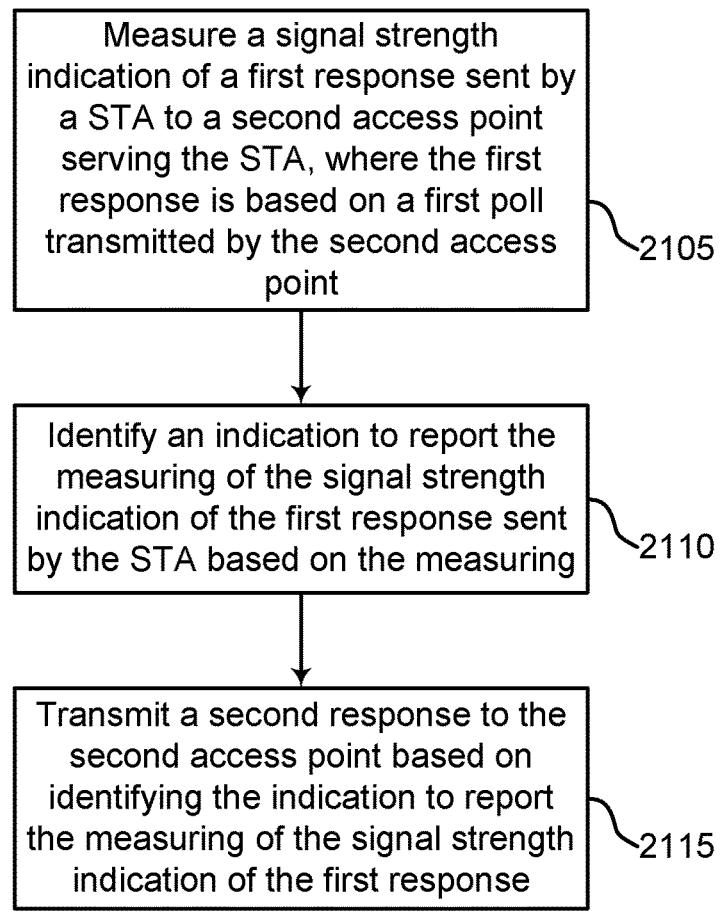

FIG. 21 shows a flowchart illustrating a method 2200 that supports improved spatial reuse for WLAN networks in accordance with aspects of the present disclosure. The operations of method 2200 may be implemented by an AP or its components as described herein. For example, the operations of method 2200 may be performed by a communications manager as described with reference to FIGS. 11 through 14. In some examples, an AP may execute a set of instructions to control the functional elements of the AP to perform the functions described below. Additionally or alternatively, an AP may perform aspects of the functions described below using special-purpose hardware.

At 2105, the AP may measure a signal strength indication of a first response sent by a STA to a second access point serving the STA, in which the first response is based on a first poll transmitted by the second access point. The operations of 2105 may be performed according to the methods described herein. In some examples, aspects of the operations of 2105 may be performed by a measuring component as described with reference to FIGS. 11 through 14.

At 2110, the AP may identify an indication to report the measuring of the signal strength indication of the first response sent by the STA based on the measuring. The operations of 2110 may be performed according to the methods described herein. In some examples, aspects of the operations of 2110 may be performed by a monitoring component as described with reference to FIGS. 11 through 14.

At 2115, the AP may transmit a second response to the second access point based on identifying the indication to report the measuring of the signal strength indication of the first response. The operations of 2115 may be performed according to the methods described herein. In some examples, aspects of the operations of 2115 may be performed by a polling component as described with reference to FIGS. 11 through 14.

Figure 22:
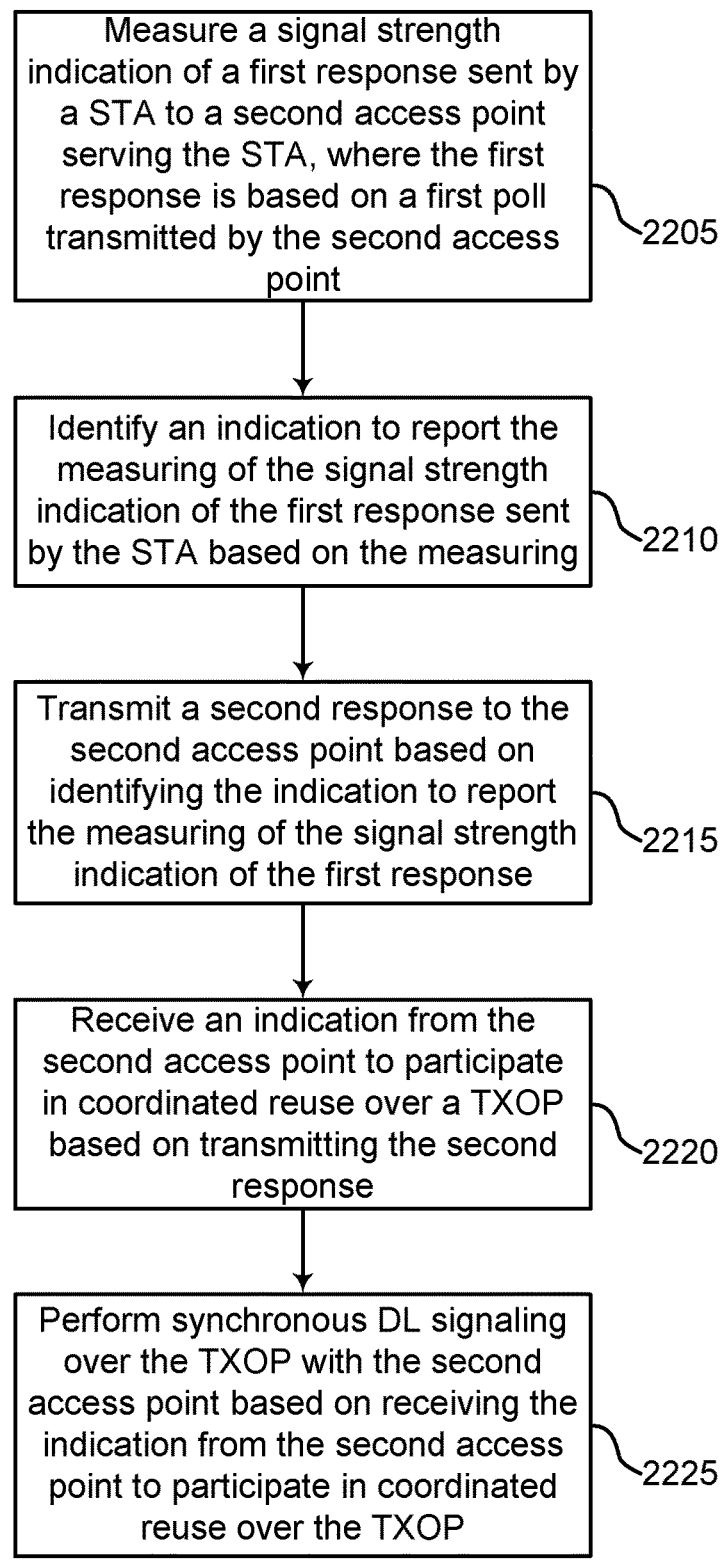

FIG. 22 shows a flowchart illustrating a method 2200 that supports improved spatial reuse for WLAN networks in accordance with aspects of the present disclosure. The operations of method 2200 may be implemented by an AP or its components as described herein. For example, the operations of method 2200 may be performed by a communications manager as described with reference to FIGS. 11 through 14. In some examples, an AP may execute a set of instructions to control the functional elements of the AP to perform the functions described below. Additionally or alternatively, an AP may perform aspects of the functions described below using special-purpose hardware.

At 2205, the AP may measure a signal strength indication of a first response sent by a STA to a second access point serving the STA, in which the first response is based on a first poll transmitted by the second access point. The operations of 2205 may be performed according to the methods described herein. In some examples, aspects of the operations of 2205 may be performed by a measuring component as described with reference to FIGS. 11 through 14.

At 2210, the AP may identify an indication to report the measuring of the signal strength indication of the first response sent by the STA based on the measuring. The operations of 2210 may be performed according to the methods described herein. In some examples, aspects of the operations of 2210 may be performed by a monitoring component as described with reference to FIGS. 11 through 14.

At 2215, the AP may transmit a second response to the second access point based on identifying the indication to report the measuring of the signal strength indication of the first response. The operations of 2215 may be performed according to the methods described herein. In some examples, aspects of the operations of 2215 may be performed by a polling component as described with reference to FIGS. 11 through 14.

At 2220, the AP may receive an indication from the second access point to participate in coordinated reuse over a TXOP based on transmitting the second response. The operations of 2220 may be performed according to the methods described herein. In some examples, aspects of the operations of 2220 may be performed by a monitoring component as described with reference to FIGS. 11 through 14.

At 2225, the AP may perform synchronous DL signaling over the TXOP with the second access point based on receiving the indication from the second access point to participate in coordinated reuse over the TXOP. The operations of 2225 may be performed according to the methods described herein. In some examples, aspects of the operations of 2225 may be performed by a synchronization component as described with reference to FIGS. 11 through 14.

Figure 23:
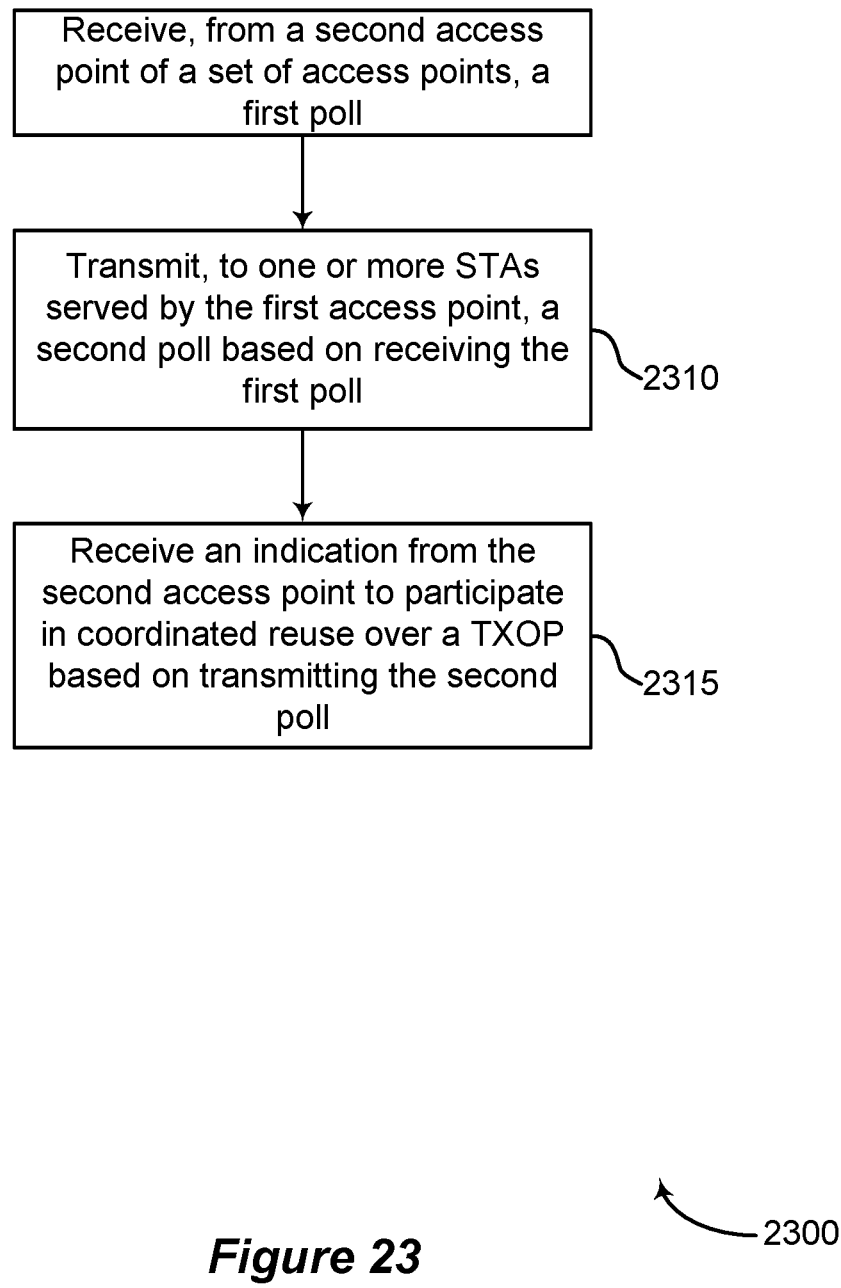

FIG. 23 shows a flowchart illustrating a method 2400 that supports improved spatial reuse for WLAN networks in accordance with aspects of the present disclosure. The operations of method 2400 may be implemented by an AP or its components as described herein. For example, the operations of method 2400 may be performed by a communications manager as described with reference to FIGS. 11 through 14. In some examples, an AP may execute a set of instructions to control the functional elements of the AP to perform the functions described below. Additionally or alternatively, an AP may perform aspects of the functions described below using special-purpose hardware.

At 2305, the AP may receive, from a second access point of a set of access points, a first poll. The operations of 2305 may be performed according to the methods described herein. In some examples, aspects of the operations of 2305 may be performed by a polling component as described with reference to FIGS. 11 through 14.

At 2310, the AP may transmit, to one or more STAs served by the first access point, a second poll based on receiving the first poll. The operations of 2310 may be performed according to the methods described herein. In some examples, aspects of the operations of 2310 may be performed by a polling component as described with reference to FIGS. 11 through 14.

At 2315, the AP may receive an indication from the second access point to participate in coordinated reuse over a TXOP based on transmitting the second poll. The operations of 2315 may be performed according to the methods described herein. In some examples, aspects of the operations of 2315 may be performed by a monitoring component as described with reference to FIGS. 11 through 14.

Figure 24:
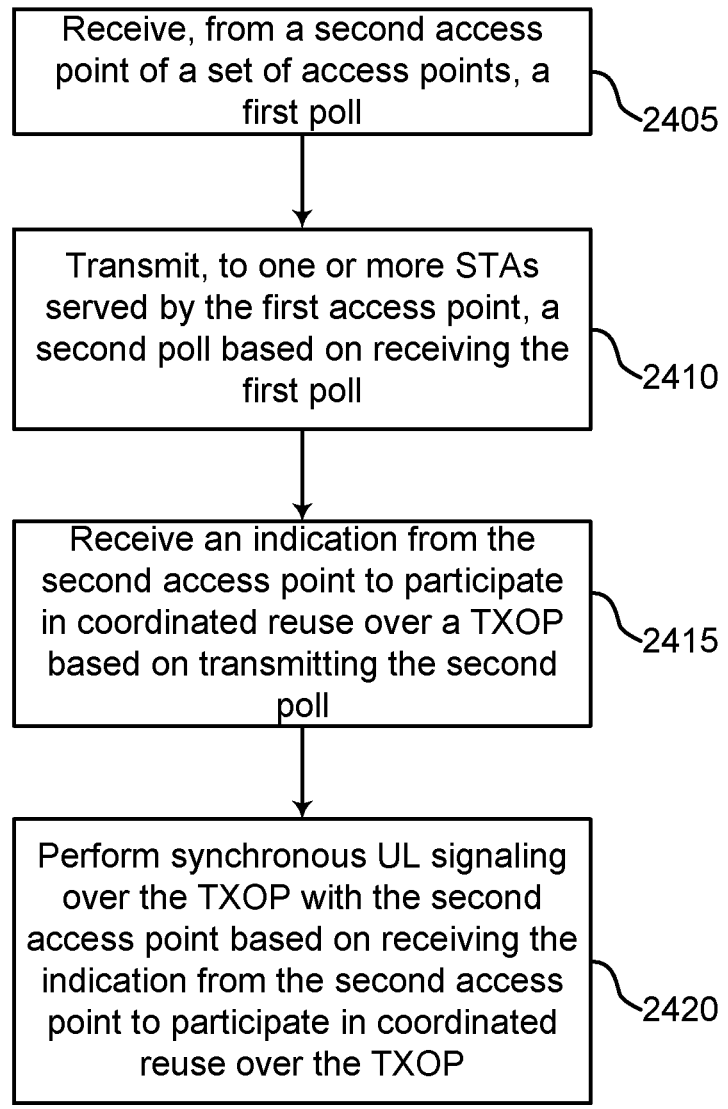

FIG. 24 shows a flowchart illustrating a method 2400 that supports improved spatial reuse for WLAN networks in accordance with aspects of the present disclosure. The operations of method 2400 may be implemented by an AP or its components as described herein. For example, the operations of method 2400 may be performed by a communications manager as described with reference to FIGS. 11 through 14. In some examples, an AP may execute a set of instructions to control the functional elements of the AP to perform the functions described below. Additionally or alternatively, an AP may perform aspects of the functions described below using special-purpose hardware.

At 2405, the AP may receive, from a second access point of a set of access points, a first poll. The operations of 2405 may be performed according to the methods described herein. In some examples, aspects of the operations of 2405 may be performed by a polling component as described with reference to FIGS. 11 through 14.

At 2410, the AP may transmit, to one or more STAs served by the first access point, a second poll based on receiving the first poll. The operations of 2410 may be performed according to the methods described herein. In some examples, aspects of the operations of 2410 may be performed by a polling component as described with reference to FIGS. 11 through 14.

At 2415, the AP may receive an indication from the second access point to participate in coordinated reuse over a TXOP based on transmitting the second poll. The operations of 2415 may be performed according to the methods described herein. In some examples, aspects of the operations of 2415 may be performed by a monitoring component as described with reference to FIGS. 11 through 14.

At 2420, the AP may perform synchronous UL signaling over the TXOP with the second access point based on receiving the indication from the second access point to participate in coordinated reuse over the TXOP. The operations of 2420 may be performed according to the methods described herein. In some examples, aspects of the operations of 2420 may be performed by a synchronization component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as GSM.

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by STAs 115 with service subscriptions with the network provider. A small cell may be associated with a lower-powered AP 105, as compared with a macro cell, and a small cell may operate in the same or different (for example, licensed, unlicensed, etc.) frequency bands as macro cells. Small cells may include pico cells, femto cells, and micro cells according to various examples. A pico cell, for example, may cover a small geographic area and may allow unrestricted access by STAs 115 with service subscriptions with the network provider. A femto cell may also cover a small geographic area (for example, a home) and may provide restricted access by STAs 115 having an association with the femto cell (for example, STAs 115 in a closed subscriber group (CSG), STAs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (for example, two, three, four, and the like) cells, and may also support communications using one or multiple component carriers.

The WLAN 100 or systems described herein may support synchronous or asynchronous operation. For synchronous operation, the APs 105 may have similar frame timing, and transmissions from different APs 105 may be approximately aligned in time. For asynchronous operation, the APs 105 may have different frame timing, and transmissions from different APs 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (such as, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be readily apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first access point, comprising:
    transmitting, after winning contention for a wireless medium, a first poll comprising a first message to a station (STA) served by the first access point, the first message comprising an indication for the STA to transmit a first response to a set of access points, the first poll further comprising a request for a measured signal strength indication of the first response transmitted by the STA;
    receiving, from the STA, the first response to the first poll based at least in part on transmitting the first poll;
    transmitting, to a second access point, a second poll after receiving the first response from the STA;
    receiving, from the second access point of the set of access points, a second response comprising the measured signal strength indication of the first response based at least in part on transmitting the first poll, wherein receiving the second response is based at least in part on transmitting the second poll; and
    selecting the second access point for coordinated reuse based at least in part on receiving the second response.

2. The method of claim 1, further comprising performing synchronous DL signaling over a transmission opportunity (TXOP) based at least in part on selecting the second access point.

3. The method of claim 2, wherein performing the synchronous DL signaling over the TXOP comprises transmitting an indication for the second access point of the set of access points to perform the synchronous DL signaling.

4. The method of claim 2, wherein the measured signal strength indication comprises a spatial reuse start frame and an indication of maximum allowed transmission power for performing DL signaling over the TXOP.

5. The method of claim 1, further comprising determining a criterion for coordinated reuse over a transmission opportunity (TXOP) with the second access point based at least in part on one or more of the second poll or the second response, wherein selecting the second access point is based at least in part on determining the criterion.

6. The method of claim 5, further comprising determining that the second access point satisfies the criterion for coordinated reuse, wherein selecting the second access point is based at least in part on determining that the second access point satisfies the criterion.

7. The method of claim 5, wherein the criterion for coordinated reuse comprises a maximum allowed transmit power for the set of access points and is based at least in part on a signal-to-interference ratio (SIR) of the first access point to serve the STA at a modulation and coding scheme (MCS).

8. The method of claim 5, further comprising:
identifying a quantity of the set of access points; and
determining a calculation for a back-off adjustment to the criterion based at least in part on identifying the quantity, wherein determining the criterion is based at least in part on the determining the calculation.

9. The method of claim 5, further comprising:
determining a first criterion for coordinated reuse associated with a first sub-channel of the wireless medium based at least in part on at least one of a transmit power requirement of the first sub-channel or a tolerance level associated with the first sub-channel; and
determining a second criterion for coordinated reuse associated with a second sub-channel of the wireless medium based at least in part on at least one of a transmit power requirement of the second sub-channel or a tolerance level associated with the second sub-channel, wherein determining the criterion is based at least in part on determining the first criterion for the first sub-channel and the second criterion for the second sub-channel.

10. The method of claim 1, wherein transmitting the second poll and receiving the second response is part of a polling procedure for the set of access points initiated by the first access point.

11. The method of claim 1, wherein transmitting the second poll to the second access point further comprises:
transmitting the second poll to one or more access points of the set of access points different than the second access point, the method further comprising;
receiving, from the one or more access points, a response based at least in part on the transmitting; and
determining a criterion for coordinated reuse over a TXOP with the one or more access points based at least in part on receiving the response from the one or more access points.

12. The method of claim 11, further comprising determining, based at least in part on determining the criterion, that the one or more access points do not satisfy the criterion for coordinated reuse over the TXOP, wherein transmitting the second poll to the second access point is based at least in part on determining that the one or more access points do not satisfy the criterion for coordinated reuse over the TXOP.

13. The method of claim 1, wherein transmitting the second poll to the second access point comprises transmitting the second poll to a plurality of access points of the set of access points, the method further comprising:
receiving, from a third access point of the set of access points, a response based at least in part on transmitting the second poll; and
selecting the third access point for coordinated reuse based at least in part on the receiving the response from the third access point.

14. The method of claim 1, wherein the second poll comprises a spatial reuse (SR) poll frame that comprises a trigger frame.

15. The method of claim 14, wherein the SR poll frame comprises one or more of schedule information for a TXOP or DL reuse information.

16. The method of claim 15, wherein the schedule information comprises DL slot sizes and durations for one or more DL slots of the TXOP.

17. The method of claim 15, wherein the DL reuse information comprises one or more of a maximum allowed interference for the first access point or basic service set (BSS) identifiers (BSSIDs) of the set of access points.

18. The method of claim 1, further comprising:
transmitting, to a third access point of the set of access points, the second poll after receiving the first response from the STA;
receiving, from the third access point, a response based at least in part on transmitting the second poll to the third access point; and
selecting the third access point for coordinated reuse based at least in part on the receiving the response from the third access point.

19. The method of claim 18, further comprising performing synchronous DL signaling over a TXOP with the second access point and the third access point based at least in part on selecting the second access point for coordinated reuse and selecting the third access point for coordinated reuse, wherein performing the synchronous DL signaling over the TXOP comprises multiplexing DL signaling of the second access point and DL signaling of the third access point over the TXOP, and wherein the multiplexing comprises one or more of time division multiplexing (TDM) or frequency division multiplexing (FDM) on slots or sub-bands of the TXOP.

20. The method of claim 1, wherein the second response comprises an SR response frame.

21. The method of claim 20, wherein the SR response frame of the second response comprises one or more of a received signal strength indication (RSSI) measurement of the first response by the STA served by the first access point, a DL transmit power that satisfies a threshold to service one or more additional STAs by the second access point, buffer status report (BSR) information, or bandwidth query report (BQR) information.

22. The method of claim 20, wherein the SR response frame of the second response is included in a high efficiency (HE) trigger-based (TB) physical layer protocol data unit (PPDU).

23. The method of claim 1, further comprising receiving, from one or more of the set of access points, a response to the first poll, wherein the response is based at least in part on an indication within the first response to provide reuse-feedback by one or more of the set of access points, wherein the indication is at least part of a preamble of the first response.

24. The method of claim 1, further comprising performing a request-to-send (RTS) clear-to-send (CTS) procedure with the STA served by the first access point, wherein the first poll comprises an enhanced or modified RTS frame.

25. The method of claim 24, wherein the first poll comprises a multi-user (MU) RTS (MU-RTS) frame.

26. The method of claim 25, wherein the MU-RTS frame of the first poll comprises one or more of information for the STA served by the first access point or information on one or more BSSIDs of the set of access points.

27. The method of claim 1, further comprising performing a request-to-send (RTS) clear-to-send (CTS) procedure with the STA served by the first access point, wherein the first poll comprises an enhanced CTS (e-CTS) frame.

28. The method of claim 27, wherein the e-CTS frame of the first poll comprises an HE preamble and one or more HE-SIG fields that include an indication for identifying one or more access points of the set of access points for providing an RSSI measurement of the e-CTS frame of the first poll.

29. A method for wireless communication at a first access point, comprising:
   transmitting, after winning contention for a wireless medium, a first poll comprising a first message to a station (STA) served by the first access point, the first message comprising an indication for the STA to transmit a first response to a set of access points, the first poll further comprising a request for a measured signal strength indication of the first response transmitted by the STA;
   transmitting a second message to the set of access points;
   receiving, from the STA, the first response to the first poll based at least in part on transmitting the first poll;
   receiving, from the set of access points, a response to the first poll, wherein the response is received after receiving the first response to the first poll by the STA;
   receiving, from a second access point of the set of access points, a second response comprising the measured signal strength indication of the first response based at least in part on transmitting the first poll; and
   selecting the second access point for coordinated reuse based at least in part on receiving the second response.

30. The method of claim 29, further comprising performing synchronous DL signaling over a transmission opportunity (TXOP) based at least in part on selecting the second access point.

31. The method of claim 30, wherein performing the synchronous DL signaling over the TXOP comprises transmitting an indication for the second access point of the set of access points to perform the synchronous DL signaling.

32. The method of claim 30, wherein the measured signal strength indication comprises a spatial reuse start frame and an indication of maximum allowed transmission power for performing DL signaling over the TXOP.

33. The method of claim 29, wherein the second response comprises an SR response frame.

34. The method of claim 33, wherein the SR response frame of the second response comprises one or more of a received signal strength indication (RSSI) measurement of the first response by the STA served by the first access point, a DL transmit power that satisfies a threshold to service one or more additional STAs by the second access point, buffer status report (BSR) information, or bandwidth query report (BQR) information.

35. The method of claim 33, wherein the SR response frame of the second response is included in a high efficiency (HE) trigger-based (TB) physical layer protocol data unit (PPDU).

36. The method of claim 29, wherein the response is based at least in part on an indication within the first response to provide reuse-feedback by the set of access points, wherein the indication is at least part of a preamble of the first response.

37. The method of claim 29, further comprising performing a request-to-send (RTS) clear-to-send (CTS) procedure with the STA served by the first access point, wherein the first poll comprises an enhanced or modified RTS frame.

38. The method of claim 37, wherein the first poll comprises a multi-user (MU) RTS (MU-RTS) frame.

39. The method of claim 38, wherein the MU-RTS frame of the first poll comprises one or more of information for the STA served by the first access point or information on one or more BSSIDs of the set of access points.

40. The method of claim 29, further comprising performing a request-to-send (RTS) clear-to-send (CTS) procedure with the STA served by the first access point, wherein the first poll comprises an enhanced CTS (e-CTS) frame.

41. The method of claim 40, wherein the e-CTS frame of the first poll comprises an HE preamble and one or more HE-SIG fields that include an indication for identifying one or more access points of the set of access points for providing an RSSI measurement of the e-CTS frame of the first poll.

42. A method for wireless communication at a first access point, comprising:
   determining a signal strength indication of a first response sent by a STA in response to a first poll transmitted by a second access point serving the STA;
   receiving, from the second access point, a second poll that is transmitted after the first response sent by the STA served by the first access point based at least in part on one or more access points of a set of access points not satisfying a criterion for coordinated reuse over a TXOP;
   identifying an indication to report the measuring of the signal strength indication of the first response sent by the STA based at least in part on the measuring; and
   transmitting a second response to the second access point based at least in part on identifying the indication to report the measuring of the signal strength indication of the first response.

43. The method of claim 42, further comprising receiving an indication from the second access point to participate in coordinated reuse over the TXOP based at least in part on transmitting the second response; and
   performing synchronous DL signaling over the TXOP with the second access point based at least in part on receiving the indication from the second access point to participate in coordinated reuse over the TXOP.

44. The method of claim 42, wherein the second response comprises an SR response frame, the method further comprising determining one or more measurement values comprising one or more of an RSSI measurement of the first response by the STA served by the first access point, a DL transmit power that satisfies a threshold to service one or more additional STAs by the second access point, BSR information, or BQR information, wherein transmitting the SR response frame of the second response is based at least in part on determining the one or more measurement values.

45. A method for wireless communication at a first access point, comprising:
   receiving, from a second access point of a set of access points, a first poll comprising an indication of a resource allocation within the first poll for a plurality of access points of the set of access points;
   transmitting, to one or more STAs served by the first access point, a second poll based at least in part on the resource allocation; and
   receiving an indication from the second access point to participate in coordinated reuse over a TXOP based at least in part on transmitting the second poll.

46. The method of claim 45, further comprising performing synchronous UL signaling over the TXOP with the second access point based at least in part on receiving the indication from the second access point to participate in coordinated reuse over the TXOP.

47. The method of claim 45, wherein transmitting the second poll comprises transmitting a null packet trigger frame to the one or more STAs served by the first access point.

* * * * *